(12) United States Patent
Harvey

(10) Patent No.: US 12,353,597 B2
(45) Date of Patent: Jul. 8, 2025

(54) COMPUTING SYSTEMS GENERATING AND USING HYPERGRAPHS AND LINKED HYPERGRAPHS FOR PROCESSING DATA AND AS A BASIS FOR USER ENGAGEMENT WITH THE PROCESSED DATA

(71) Applicant: Bennet Harvey, Mill Valley, CA (US)

(72) Inventor: Bennet Harvey, Mill Valley, CA (US)

( * ) Notice: Subject to any disclaimer, the term of this patent is extended or adjusted under 35 U.S.C. 154(b) by 294 days.

(21) Appl. No.: 18/122,079

(22) Filed: Mar. 15, 2023

(65) Prior Publication Data

US 2023/0297720 A1 Sep. 21, 2023

Related U.S. Application Data

(60) Provisional application No. 63/320,446, filed on Mar. 16, 2022.

(51) Int. Cl.
| | |
|---|---|
| *G06F 21/62* | (2013.01) |
| *G06F 40/205* | (2020.01) |
| *G06F 40/295* | (2020.01) |
| *G06T 11/20* | (2006.01) |
| *G06F 40/30* | (2020.01) |

(52) U.S. Cl.
CPC ........ *G06F 21/6254* (2013.01); *G06F 40/205* (2020.01); *G06F 40/295* (2020.01); *G06T 11/206* (2013.01); *G06F 40/30* (2020.01); *G06T 2200/24* (2013.01)

(58) Field of Classification Search
CPC .. G06F 21/6254; G06F 40/205; G06F 40/295; G06F 40/30; G06T 11/206; G06T 2200/24

See application file for complete search history.

(56) References Cited

U.S. PATENT DOCUMENTS

| | | |
|---|---|---|
| 9,830,388 B2 | 11/2017 | Andress et al. |
| 10,771,524 B1 | 9/2020 | Long et al. |
| 11,630,652 B2 | 4/2023 | Richardson |
| 11,630,815 B2 | 4/2023 | Ares et al. |
| 11,630,866 B2 | 4/2023 | El Kaed et al. |
| 11,630,917 B2 * | 4/2023 | Fox ................ H04W 12/02 726/28 |
| 11,631,016 B2 | 4/2023 | Acharya et al. |

(Continued)

OTHER PUBLICATIONS

Menezes, Telmo, and Camille Roth. "Semantic hypergraphs." arXiv preprint arXiv:1908.10784 (2019).

(Continued)

*Primary Examiner* — Frantz B Jean
(74) *Attorney, Agent, or Firm* — Edlavitch Law PLLC

(57) ABSTRACT

Disclosed herein are technologies (including computing systems) for data processing and enhancement as well as for user engagement with the enhanced and processed data. Specifically, in some examples, a computing system is included for development and control of a contextual hypergraph system. The contextual hypergraph system is a product of the combination of two or more hypergraphs of structured data linked together via one or more contexts. And, various operations for user engagement with the contextual hypergraph system are available to users and disclosed herein. Also, data on the users can be structured in a hypergraph and that hypergraph can be a basis for a contextual hypergraph of the contextual hypergraph system. Also, in some embodiments, the users of the contextual hypergraph system are anonymous. And, processes for maintaining anonymity are also disclosed herein.

20 Claims, 46 Drawing Sheets

(56) References Cited

U.S. PATENT DOCUMENTS

| | | | |
|---|---|---|---|
| 11,631,078 B2 | 4/2023 | Johnson et al. | |
| 11,631,104 B1* | 4/2023 | Marko | G06Q 30/0275 |
| | | | 705/14.42 |
| 11,631,110 B2 | 4/2023 | Peppel | |
| 11,631,151 B2 | 4/2023 | Cella | |
| 11,632,240 B2 | 4/2023 | Wang et al. | |
| 11,632,349 B2 | 4/2023 | Wolfe et al. | |
| 2020/0293312 A1* | 9/2020 | Shwartz | G06F 8/77 |
| 2020/0293949 A1* | 9/2020 | Sanchez | G06N 5/02 |
| 2020/0293950 A1 | 9/2020 | Sanchez | |
| 2020/0296070 A1 | 9/2020 | Volach | |
| 2023/0114266 A1 | 4/2023 | Clark | |

OTHER PUBLICATIONS

Gabora, L., & Aerts, D. (2002). Contextualizing concepts using a mathematical generalization of the quantum formalism. Journal of Experimental and Theoretical Artificial Intelligence, 14(4), 327-358.

Abstract of "Psychology and social networks: a dynamic network theory perspective", James D Westaby, Danielle L Pfaff, Nicholas Redding. Am Psychol. Apr. 2014;69(3):269-84. doi: 10.1037/a0036106.

Jae-Wook Ahn, Catherine Plaisant, and Ben Shneiderman, "A Task Taxonomy of Network Evolution Analysis", IEEE Trans Vis Comput Graph. Mar. 2014;20(3):365-76. doi: 10.1109/TVCG.2013.238.

Claudio Garola, "Kolmogorovian versus non-Kolmogorovian probabilities in contextual theories", arXiv:1911.02481 [quant-ph].

Christian Richthammer, Michael Netter, Moritz Riesner, Johannes Sänger and Günther Pernul, "Taxonomy of social network data types", Richthammer et al. EURASIP Journal on Information Security 2014, 2014:11, http://jis.eurasipjournals.com/content/2014/1/11.

* cited by examiner

500 gathering within a reference computing system, by a computing system, processed articles and other types of content and data elements extracted from a history of published news and academic articles
502

↓ generating, by the computing system, a news hypergraph based at least on the gathering of the processed articles and other types of content and data elements extracted from the history
504

↓ applying, by the computing system, hypergraph network topology mapping to the processed articles and other types of content and data elements extracted from the history
506

↓ baseline mapping iterations that includes conducting, by the computing system, first passes of use of the known network topology mapping tools at creation of two independent data sets
508

↓ applying, by the computing system, hypergraph refinement processes to refine and document variables defining nodes and edges of the news hypergraph and the citizens hypergraph
510

↓ performing, by the computing system, additional mapping iterations
512

↓ providing, by the computing system, a user interface showing states of the news and citizens hypergraphs
514

↓ applying, by the computing system, the known network topology mapping tools to a union of the news and citizens hypergraphs
516

↓ positioning, by the computing system, the news and citizens hypergraphs relative to known anchor points in a multidimensional data landscape using the hypergraph positioning processes
518

↓ running, by the computing system, known news statistical analytics on results of the context hypergraph process
520

Method 1800 providing, by the computing system, a user interface for integrating, by a journalist, a modular and textual narrative data story for each topic based on (1) manual research and identification of seed policies, positions, phrases and schools of thought (wherein such information can be used for input into machine learning processes and models), (2) any one or more of the analytics provided by the computing system or an external system, and (3) results of data modeling, wherein the data story (e.g., described in method 1800) is viewable through a user interface of the computing system and configured to be used by the computing system to govern machine learning systems of the computing system as well as calibrate the machine learning systems

2302 generating, by the computing system, mapping conditions that map generated sets of modular components for the data story to a set of fields of the data story within a content database
2304 generating, by the computing system, a user profile source code that is renderable by a web browser to render a corresponding graphical representation of the data story based on the data story and the mapping conditions
2306

FIG. 25

COMPUTING SYSTEMS GENERATING AND USING HYPERGRAPHS AND LINKED HYPERGRAPHS FOR PROCESSING DATA AND AS A BASIS FOR USER ENGAGEMENT WITH THE PROCESSED DATA

CROSS-REFERENCE TO RELATED APPLICATIONS

The present application claims the benefit of priority from U.S. Provisional Patent Application No. 63/320,446, filed on Mar. 16, 2022, and entitled "COMPUTING SYSTEM FOR NEWS TOPIC CONTENT PROCESSING AND ENHANCEMENT AS WELL AS FOR USER ENGAGEMENT WITH THE NEWS PROCESSING AND ENHANCEMENT", the entire disclosure of which application is hereby incorporated herein by reference.

TECHNICAL FIELD

The present disclosure relates to computing systems for data processing and enhancement as well as for user engagement with the processed and enhanced data. Specifically, the present disclosure relates to computing systems that leverage hypergraphs and the combination or linking of hypergraphs to process data and enhance it for user engagement with the processed and enhanced data.

BACKGROUND

The processing of textual data and natural language processing (NLP) may have started with the work of Alan Turing in the 1950s. Alan Turing is often associated with the Turing test, a test of a machine's ability to exhibit intelligent behavior equivalent to a human. The test includes the evaluation of natural language conversations between a human and a machine designed to generate human-like responses. For the machine to perform such a function, NLP became necessary and a child of the information age. Currently, NLP is an evolving technology related to artificial intelligence (AI), and the research and development of NLP fall within the greater disciplines of computer science and computer engineering.

One technology that has been utilized to improve upon NLP is the hypergraph. For example, one group of researchers discussed the use of a semantic hypergraph, a knowledge representation model that is intrinsically recursive and accommodates the natural hierarchical richness of natural language (See Menezes, Telmo, and Camille Roth. "Semantic hypergraphs." arXiv preprint arXiv:1908.10784 (2019)). Besides hypergraphs used with NLP, many use cases can benefit from leveraging hypergraphs; however, the use of hypergraphs within NLP can be powerful. One of the use cases that can benefit greatly from the use of hypergraphs in NLP is news content processing. However, many other use cases that require the processing and enhancement of large bodies of data (such as use cases related to traffic control, automated driving, weather prediction and warning systems, financial analysis, drug discovery, etc.) can benefit from the use of multi-dimensional hypergraphs which exploit lower-level NLP and related machine learning systems.

Referring back to the news content processing use cases, broadcast online journalism and news has become prolific and provides sharing of news content at levels beyond that of printed media.

Digital media offers the potential to target specific content to individual readers. The targeting may have been motivated by federal regulation which allowed for the buying and selling of personally identifiable information (PII) to present advertising embedded in online content.

With digitized news and content production as well as dissemination and redistribution, users of the Internet can comment on content and interact with content, such as by commenting on individual posts or becoming publishers by starting discussion boards or blogs to discuss content. Before the Internet, a spontaneous discussion between readers worldwide was practically impossible, and it is possibly the introduction of free-flowing thoughts and conversations on published content that has made digital journalism and news so prolific (for better or for worst).

To a great extent, users (whether actual people or artificial intelligence) add to the narrative of journalism and news content (which in some cases may add to the confusion about what is valid). Also, online news and discussion create an opportunity for niche audiences to express opinions; however, in some cases such audiences can express unvalidated interpretations of information, expanding options to receive free speech, but eroding the credibility of digital media.

Sources of online journalism and news can provide much more expedient, efficient, and even more accurate reporting of news in many cases than that of print counterparts. This gives society real-time views of events as they occur. However, views of news online have become daunting and parsing such a massive amount of information effectively is one of the great challenges society faces. In addition, the great volume and speed in which news content is posted online affect the accuracy of reporting and redistribution of the news to an extent that can greatly exceed that of print journalism.

Before the emergence of digital journalism, the printing process took much more time, permitting the discovery and correction of errors. Although, resources required for the printing process of the news made for limited voices in publication, redistribution, and discussion of the news. Thus, the accuracy or fairness of print or online news is still up for debate.

Without entering the ongoing debate over the accuracy of print versus digital news content, it is clear that there are great advantages with digital journalism and the evolution of technologies for online discussions of the news. And, there is no doubt, that society may be just at the very beginning of the evolution of technologies for publishing, redistributing, and engagement of digital journalism and news content.

A functioning democracy may require that people have trustworthy information at their disposal. However, this may not be the case with advertising-motivated news media. An alternative medium for news that is motivated by other forces than ads may need to emerge. A news media redefined and distinguished from other media by the trustworthiness of its information may be needed along with its commitment to the best interests of a functioning democracy over advertising motives.

In short, there are many technical problems (as well as ethical problems) to be solved and new technical solutions to be developed in technical fields related to news topic content processing and enhancement as well as for user engagement with the news processing and enhancement.

Although many technologies have evolved over at least the past thirty years to improve news topic content processing and enhancement as well as for user engagement with the news processing and enhancement, there is still limited functionality to be improved upon.

In addition to news content processing use cases, there is much room for improvement in data processing and enhancement as well as technologies for user engagement with the processed and enhanced data. This is especially the case with use cases related to the processing and enhancement of information associated with big data. Big data primarily refers to data sets that are too large or complex to be dealt with by traditional data-processing application software. For example, there is much room for improvement in data processing and enhancement as well as technologies for user engagement with the processed and enhanced data associated with news and social media systems, targeted marketing systems, traffic control systems, automated driving systems, weather prediction and warning systems, financial analysis systems, drug discovery systems, etc.

Although many technologies have evolved over at least the past thirty years to improve data processing and enhancement related to big data and information systems as well as for user engagement with the processing and enhancement of big data and information systems, there is still much to be improved upon and many technical problems to be solved. For example, big data analysis challenges include capturing data, data storage, data analysis, search, sharing, transfer, visualization, querying, updating, and information privacy.

SUMMARY

Disclosed herein are technologies (including computing systems) for data processing and enhancement as well as for user engagement with the processed and enhanced data. In some examples, the technologies are based on human governance methods architected to minimize bias. Some embodiments disclosed herein relate to computing systems that leverage hypergraphs (such as multi-dimensional hypergraphs) and the combination or linking of hypergraphs to process data and enhance it for user engagement with the processed and enhanced data. In short, disclosed herein are computing systems for generating and using hypergraphs and linked hypergraphs for processing data and as a basis for user engagement with the processed data (such as in any contextual domain supported by the system's processed data).

For instance, in some examples, a computing system is included for the development and control of a contextual hypergraph system (which is a system with multiple hypergraphs linked to each other according to contextual criteria). In some examples, the contextual hypergraph system is a product of the combination of two or more hypergraphs of structured data linked together via one or more contexts (e.g., contexts representing a citizen, a household, a company, an industry, a government agency, or any other entity). And, with some embodiments, various operations for user engagement with the contextual hypergraph system are available to users (which can give the user full control of their contextual navigation within any data set).

Also, data on users can be structured in a hypergraph and that hypergraph can be a basis for a contextual hypergraph of the larger multi-dimensional contextual hypergraph system. For example, in some embodiments, the users are represented by a citizen hypergraph including nodes related to the roles of citizens, journalists, academics, and data scientists, so that an integrated context hypergraph can be generated to form a new experience of news and civic engagement to reinforce the role of journalism electronically (such as online via one or more websites or mobile applications).

The contextual navigation of multi-dimensional hypergraph information can be provided to users in many interface scenarios including mobile apps, web apps, augmented reality (AR) devices, virtual reality (VP) devices, and any interface which can present visual representations of content and data.

Also, in some embodiments, the users of the contextual hypergraph system are anonymous. And, processes for maintaining anonymity are also disclosed herein. In some examples, a citizen-centric hypergraph is generated to protect the individual citizen's anonymity. It should not be possible for the system to expose a citizen's identity, which should therefore make the contextual hypergraph system trustworthy to a citizen using it.

Although many of the examples disclosed herein relate to use cases corresponding to news content and journalism as well as civic engagement with such content, other use cases and applications can utilize the technologies disclosed herein. For example, many other use cases that require the processing and enhancement of large bodies of data (such as use cases related to traffic control, automated driving, weather prediction and warning systems, financial analysis, drug discovery, etc.) can benefit from the use of hypergraphs as well as the contextual hypergraph system. Such use cases that require the processing and enhancement of large bodies of data can also benefit from the technologies disclosed herein for data processing and enhancement and for user engagement with the processed and enhanced data. Also, the use cases that require the processing and enhancement of large bodies of data can benefit from the computing systems disclosed herein that leverage hypergraphs and the combination or linking of hypergraphs to process data and enhance it for user engagement with the processed and enhanced data. In short, such use cases can benefit from the computing systems disclosed herein that generate and use hypergraphs and linked hypergraphs for processing data and as a basis for user engagement with the processed data.

The computing systems and technologies disclosed herein can also provide specific technical solutions to at least overcome the technical problems mentioned in the background section and other parts of the application as well as other technical problems not described herein but recognized by those skilled in the art, such as technical solutions to overcome technical problems in the processing and enhancement of data retrieved from sources of big data (e.g., sources of data for news and social media systems, targeted marketing systems, traffic control systems, automated driving systems, weather prediction and warning systems, financial analysis systems, drug discovery systems, fresh water distribution systems, etc.).

Additionally, disclosed herein are more generic methods for hypergraph development and management in general as well as for anonymized user engagement with multidimensional hypergraphs through websites and mobile applications more specifically with data services that manage complex information (such as complex information arranged in hypergraphs), whether or not that information includes news content or other types of content such as content related to any big data application.

With respect to some embodiments, disclosed herein are computerized methods for generating and using hypergraphs and linked hypergraphs (such as multi-dimensional hypergraphs) for processing data and as a basis for user engagement with the processed data, as well as a non-transitory computer-readable storage medium for carrying out technical operations of the computerized methods. The non-transitory computer-readable storage medium has tangibly stored thereon, or tangibly encoded thereon, computer-readable instructions that when executed by one or more devices (e.g., one or more personal computers or servers) cause at least one processor to perform a method for generating and using hypergraphs and linked hypergraphs for processing data and as a basis for user engagement with the processed data.

With respect to some embodiments, a system is provided that includes at least one computing device configured to generate and use hypergraphs and linked hypergraphs (such as multi-dimensional hypergraphs) for processing data and as a basis for user engagement with the processed data. And, with respect to some embodiments, a method is provided to be performed by at least one computing device. In some example embodiments, computer program code can be executed by at least one processor of one or more computing devices to implement functionality in accordance with at least some embodiments disclosed herein; and the computer program code being at least a part of or stored in a non-transitory computer-readable medium.

For example, some embodiments can include a method (such as method 4500 shown in FIG. 45), implemented by a computing system (such as computing system 200 shown in FIG. 2), for data processing and enhancement as well as for user engagement with the processed and enhanced data by leveraging the use of hypergraphs and combined hypergraphs (such as multi-dimensional hypergraphs) as well as anonymized user engagement with such hypergraphs. In some examples, the method can be combined with any one or more of the methods disclosed herein. The method can start with retrieving, by a primary computing system (such as the computing system 200), information from a plurality of information sources (e.g., see step 4502 of method 4500). The information can be related to the user and to any content or context the user may be experiencing in real-time. The method can continue with storing, by the primary computing system, the information into a staging computing system (which can be a remote computing system) connected to the primary computing system over a communications network (e.g., see step 4504 of method 4500). Subsequent to the storing of the information in the staging computing system, the method can continue with extracting, by the primary computing system, component elements of content from the stored information based on a set of extraction conditions (e.g., see step 4506 of method 4500). In some examples, the extraction includes using NLP and other types of data-processing models to identify insights and connections in text of the information. In some of such examples, the NLP and the models are enhanced by machine learning which can be employed to identify patterns of relevance within hypergraphs or multidimensional hypergraphs.

Also, the method can continue with applying, by the primary computing system, a machine learning system to the extracted component elements to preprocess the extracted component elements for integration with the multidimensional hypergraph (e.g., see step 4508 of method 4500). Furthermore, the method can continue with generating, by the primary computing system, a hypergraph (e.g., see hypergraph 4511 shown in FIG. 45) by at least interlinking and organizing the preprocessed component elements or a derivative thereof as nodes in the hypergraph (e.g., see step 4510 of method 4500). The method can also include generating, by the primary computing system, an anonymous user profile for engaging anonymously with user interfaces provided by the primary computing system for interacting with the hypergraph (e.g., see step 4512 of method 4500). In some embodiments, generating the anonymous user profile includes retrieving, by the primary computing system, user profile information associated with an anonymous individual user through user input into a form running on a web browser. And, in some examples, the user input is received via an interview provided by the form and based on a query that locates an anonymized record of the anonymous individual user.

Also, the method can include applying, by the primary computing system, hypergraph network topology mapping to information components of the generated hypergraph (e.g., see step 4514 of method 4500). The information components include nodes and edges of the hypergraph. And, the application of the hypergraph network topology mapping can include generating a first separate hypergraph (e.g., see hypergraph 4517*a* shown in FIG. 45) based on iterating over the generated hypergraph according to a first criteria and generating a second separate hypergraph (e.g., see hypergraph 4517*b*) based on iterating over the generated hypergraph according to a second criteria (e.g., see step 4516). Further, the method can include applying, by the primary computing system, network topology mapping functions to link parts of the first separate hypergraph and the second separate hypergraph to generate a third separate hypergraph (e.g., see hypergraph 4519) based on the linked parts (e.g., see step 4518).

Moreover, with respect to the news content use cases, for example, some embodiments can include a method related to news topic content processing and enhancement for dynamic hypergraph analytics (such as while a person is reading the news). For example, in the method, the first separate hypergraph can include a news hypergraph generated based on news-based criteria included in the first criteria, and the second separate hypergraph can include a citizens hypergraph generated based on citizens-based criteria included in the second criteria. And, in some of such embodiments and others, the third hypergraph can include a context hypergraph based on the linking of the first and the second separate hypergraphs and context-based criteria (and in some examples, creating the multidimensional contextually personalized citizen civic engagement news experience).

In some embodiments of a more generic method (such as method 4500 shown in FIG. 45), the computing system retrieves the information via online feeds (such as RSS feeds), application programming interfaces (API), data entry, or the like. Also, in some embodiments, the staging computing system is implemented at least in part by a data lake or any other system or repository of data stored in its natural/raw format, usually made up of object blobs or files. A blob is a binary large object that is a collection of binary data stored as a single entity.

Also, in some of such embodiments, the extraction of the components elements can include using other tools such as a sign-up, sign-in, and access control to web and mobile apps, which can provide a layer of security to the extraction of the component elements (such as an encryption layer to the extraction process, e.g., application layer and/or transport layer security).

An example benefit of a contextually-relevant system is its trustworthiness for its users. Therefore the user must be completely confident the system presents zero risk to their identity and reputation. Therefore, the methods for sign-up, sign-in, and access control to web and mobile apps, which provide a layer of security to the user's login and other personally identifiable information in the advertising targeting-based economic model (such as an encryption layer to the extraction process, e.g., application layer and/or transport layer security) are unnecessary in a completely anonymized environment. The absence of such identity protection methods in an anonymized environment makes it clear the user has zero identity risk and can therefore safely share intimate details in an anonymized environment.

In some embodiments, the method further includes applying, by the computing system, a machine learning system to the component elements to preprocess the component elements, and using, by the computing system, the pre-processed component elements as input for dynamic hypergraph analytics. In some embodiments, the application of the machine learning system includes translating a first taxonomy extracted from the component elements to a second taxonomy (e.g., a second taxonomy designed to support the operation of the hypergraph). In some embodiments, the application of the machine learning system includes parsing metadata in the component elements. In some embodiments, the application of the machine learning system includes interlinking and organizing the component elements or a derivative thereof as nodes in a graph or a hypergraph. The nodes of the graph or hypergraph can be interconnected by multiple dimensions of edges representing nature and strength of connections (e.g., the specific values for which are defined and adjusted by governance processes or the user.

In some embodiments, each of the nodes of the graph or hypergraph includes at least one computing device and the graph or hypergraph is implemented as a computer network and the graph or hypergraph is representative of a network topology of the computer network. In some of such embodiments and others, the method further includes storing, by the computing system, the component elements in a database system. The database system can include a NoSQL database system and can be included within the staging computing system.

Some embodiments can include a method that includes gathering within a reference computing system, by a computing system, processed information components extracted from information of various sources. Such a method can also include generating, by the computing system, a hypergraph based at least on the gathering of the processed information components.

In some embodiments that pertain to news topic content processing and enhancement for dynamic hypergraph analytics, the method can further include gathering, by the computing system, within the database system (or a reference computing system), processed articles and other types of content and data elements extracted from the information (or from the component elements). Also, such a method can further include generating a news hypergraph based at least on gathered articles merged with other types of content and data elements relevant to the contents of the article. Such embodiments can also relate to news and citizens hypergraph development and management.

In some embodiments, the more generic method can further include applying, by the computing system, known network topology mapping functions to link parts of the two separate hypergraphs to generate a third hypergraph based on the linked parts. When the method is applied to news and citizens hypergraph development and management, the tools can be used to link the citizens hypergraph and the news hypergraph to generate a context hypergraph based on the linking and context-based criteria (e.g., see FIG. 5). In some embodiments, the method (whether generically applied or applied to news and citizens hypergraph development and management) can further include generating and storing, by the computing system, statistical information for presentation via a GUI based on the generated hypergraphs (e.g., see FIG. 6). The storage of the statistical information can occur within the database system.

Also, in some embodiments, the method (whether generically applied or applied to news and citizens hypergraph development and management) can further include providing, via a UI, the statistical information with or without a representation of the hypergraphs. For example, the methods can further include displaying, via a GUI, the statistical information (such as statistical information for describing the nodes within the hypergraph, the edges between nodes, and the relative relationships between nodes via edges) with or without a graphical representation of the hypergraphs. And, in some embodiments, the method can further include providing, by the computing system, a dimensions user interface for manually changing assumptions defining dimensions of the hypergraphs such as the values weighting edges within the hypergraph, or across hypergraphs in a multidimensional hypergraph.

In some embodiments, the method (whether generically applied or applied to news and citizens hypergraph development and management) can further include providing a process for generating an anonymous user profile for engaging anonymously with the dimensions user interface and other user interfaces provided by the computing system disclosed herein (e.g., see method 2100 shown in FIG. 21). Such a process can include the following steps in some examples. The process can include step (a) for retrieving, by a computing system, user profile information associated with an anonymous individual user through user input into a form running on a web browser. The form is provided by the computing system prior to initial retrieval of the anonymous user profile information. And, the user input is received via an artificial intelligence enhanced query narrowing interview provided by the form in which the query ultimately locates the user's anonymized record without ever requiring a username, password, or personally-identifiable information. And, in some cases, the linkage of the user to their anonymized record is accomplished without use of cookies, machine or browser identification numbers, or any other artifact which could link the anonymized record to a specific individual's identity, though a user's browser or the website may use cookies for other purposes, such as maintaining a session.

The process can also include step (b) for associating, by the computing system, the retrieved anonymous user profile information using the retrieved unique, non-personally identifiable information from the user and linking it to a progressively shorter list of anonymized user records until the user's specific unique record is found and confirmed.

The process can also include step (c) for storing in a database, by a database system of the computing system, the retrieved anonymous user profile information requested by the system through the AI-enhanced interview to ensure the ability to identify the user's record uniquely.

The process can also include step (d) for storing in a database, by a database system of the computing system, additional profile information variables acquired from the user by the computing system as part of the system's functions and services on behalf of the user and linked to the AI-enhanced interview questions and responses. In some cases, when the computing system cannot uniquely identify the user via the AI-enhanced interview questions and responses (for example, because another user has created matching responses to the AI-enhanced interview questions), the computing system can additionally employ the other profile information related to providing the application's functions and services to complete the identification of the individual user. Also, when, in some cases, the computing system cannot uniquely identify the user, the system can offer the user unclaimed records (such as unclaimed records generic to the user's geography, demographics, and other variables) from which the user may select the closest fit to their specific profile, and claim the record as their own for future interactions with the system.

The process can also include step (e) for sending to the web browser, by the computing system, the stored anonymous user profile information, functions and services to be viewed by the user via the form running on the web browser.

These and other important aspects of the invention are described more fully in the detailed description below. The invention is not limited to the particular assemblies, apparatuses, methods, and systems disclosed herein. Other embodiments can be used and changes to the described embodiments can be made without departing from the scope of the claims that follow the detailed description.

BRIEF DESCRIPTION OF THE DRAWINGS

The present disclosure will be understood more fully from the detailed description given below and from the accompanying drawings of various example embodiments of the disclosure.

FIGS. 3 to 30 illustrate example methods of the technologies disclosed herein, in accordance with some embodiments of the present disclosure.

DETAILED DESCRIPTION

Figure 1:
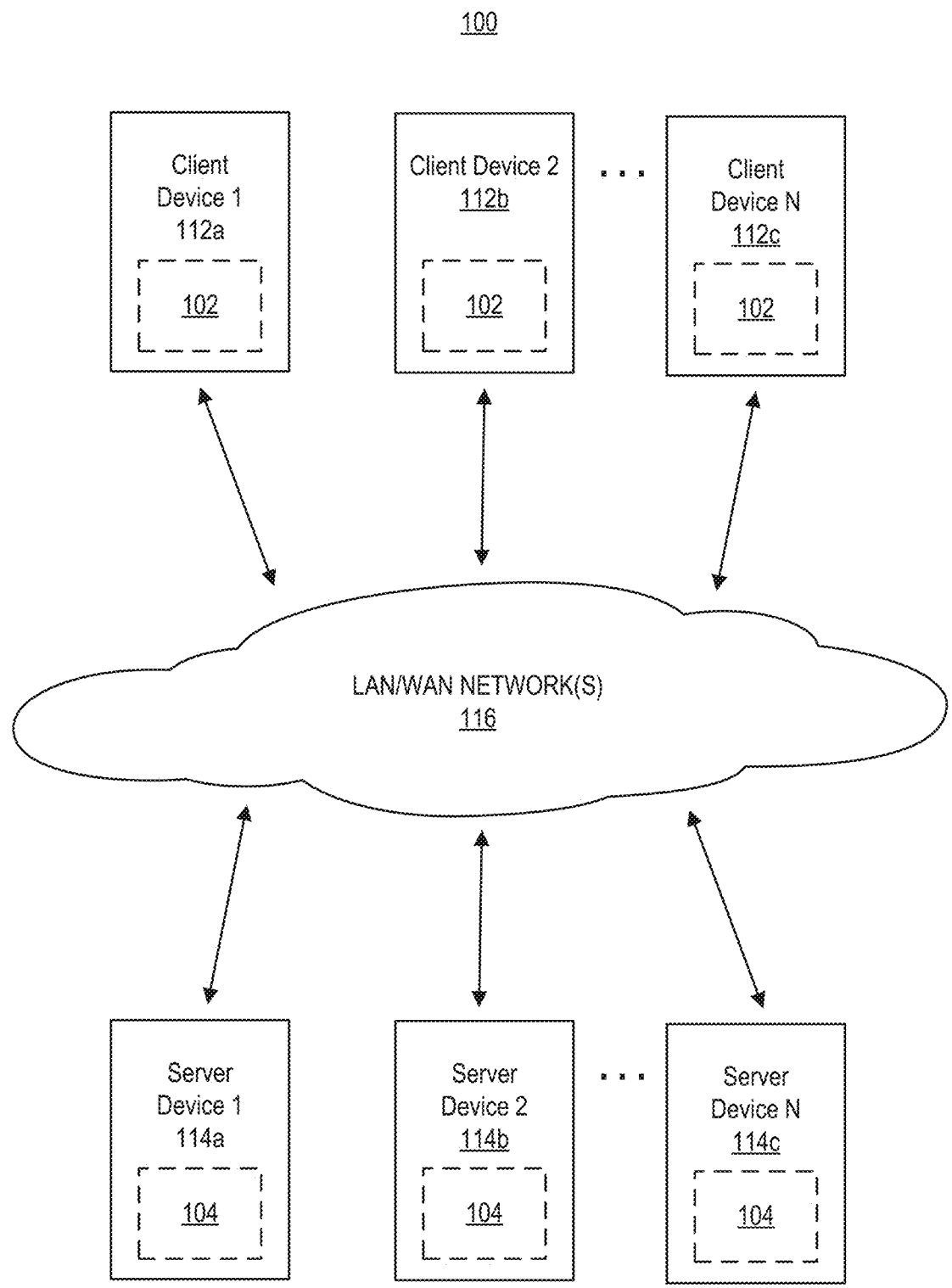
FIG. 1 illustrates an example computer network to implement technologies disclosed herein, in accordance with some embodiments of the present disclosure.

The present disclosure will be understood more fully from the detailed description given below and from the accompanying drawings of various example embodiments of the disclosure.

Disclosed herein are technologies (including computing systems) for data processing and enhancement as well as for user engagement with the processed and enhanced data. Specifically, some embodiments disclosed herein relate to computing systems that leverage hypergraphs and the combination or linking of hypergraphs to process data and enhance it for user engagement with the processed and enhanced data. In short, disclosed herein are computing systems for generating and using hypergraphs and linked hypergraphs for processing data and as a basis for user engagement with the processed data.

With respect to one of many applications of the technologies disclosed herein, described in this detailed description are technologies (including a computing system) for news topic content processing and enhancement as well as for user engagement with the news processing and enhancement. Also, regarding the news content application of the technologies, disclosed herein are variations of a computing system for development and control of a dynamic news and civic affairs contextual hypergraph system, and operations of the hypergraph system available to users. In some examples, the users are represented by a citizen hypergraph including nodes related to citizens, journalists, academics, and data scientists, so that an integrated context hypergraph can be generated to form a new experience of news and civic engagement to reinforce the role of journalism, electronically (such as online via one or more websites or mobile applications).

Additionally, disclosed herein are more generic methods for hypergraph development and management in general as well as for anonymized user engagement with websites and more specifically with websites that manage hypergraphs of information, whether or not that information includes news content.

Although many of the examples disclosed herein relate to use cases corresponding to news content and journalism as well as civic engagement with such content, other use cases and applications can utilize the technologies disclosed herein. For example, many other use cases that require the processing and enhancement of large bodies of data (such as use cases related to traffic control, automated driving, weather prediction and warning systems, financial analysis, drug discovery, etc.) can benefit from the use of hypergraphs as well as the contextual hypergraph system. Such use cases that require the processing and enhancement of large bodies of data can also benefit from the technologies disclosed herein for data processing and enhancement and for user engagement with the processed and enhanced data. Also, the use cases that require the processing and enhancement of large bodies of data can benefit from the computing systems disclosed herein that leverage hypergraphs and the combination or linking of hypergraphs to process data and enhance it for user engagement with the processed and enhanced data. In short, such use cases can benefit from the computing systems disclosed herein that generate and use hypergraphs and linked hypergraphs for processing data and as a basis for user engagement with the processed data.

Regarding the aforementioned hypergraphs as well as any other hypergraph mentioned herein, it is to be understood that a hypergraph is a graph in which an edge of the graph can join any number of vertices. In contrast, in an ordinary graph, an edge connects exactly two vertices.

FIG. 1 illustrates an example computer network 100 to implement technologies and some of the computing systems disclosed herein, in accordance with some embodiments of the present disclosure. Some of the computing systems disclosed herein as well as the network 100 include a system frontend 102 and a system backend 104, as shown in FIG. 1. The computer network 100 can implement any of the methods, operations, modules, engines, or other types of components of the systems disclosed herein. The computer network 100 is shown including client devices (e.g., see client devices 112a, 112b, and 112c). As shown, the system frontend 102 can be hosted and executed on the client devices of the computer network 100. The computer network 100 is also shown including server devices (e.g., see server devices 114a, 114b, and 114c). As shown, the system backend 104 can be hosted and executed on the server devices of the computer network 100.

Also, the computer network 100 is shown including one or more LAN/WAN networks 116 which is shown communicatively coupling the server devices hosting the system backend 104 and the client devices hosting the system frontend 102. The LAN/WAN network(s) 116 can include one or more local area networks (LAN(s)) or one or more wide area networks (WAN(s)). The LAN/WAN network(s) 116 can include the Internet or any other type of interconnected communications network. The LAN/WAN network(s) 116 can also include a single computer network or a telecommunications network. More specifically, the LAN/WAN network(s) 116 can include a local area network (LAN) such as a private computer network that connects computers in small physical areas, a wide area network (WAN) to connect computers located in different geographical locations, or a metropolitan area network (MAN)—also known as a middle area network—to connect computers in a geographic area larger than that covered by a large LAN but smaller than the area covered by a WAN.

At least each shown component of the computer network 100 can be or include a computer system which can include memory that can include media. The media can include or be volatile memory components, non-volatile memory components, or a combination of such. In general, each of the computer systems can include a host system that uses the memory. For example, the host system can write data to the memory and read data from the memory. The host system can be a computing device such as a desktop computer, laptop computer, network server, mobile device, or such computing device that includes a memory and a processing device. The host system can include or be coupled to the memory so that the host system can read data from or write data to the memory. The host system can be coupled to the memory via a physical host interface. The physical host interface can provide an interface for passing control, address, data, and other signals between the memory and the host system.

Figure 2:
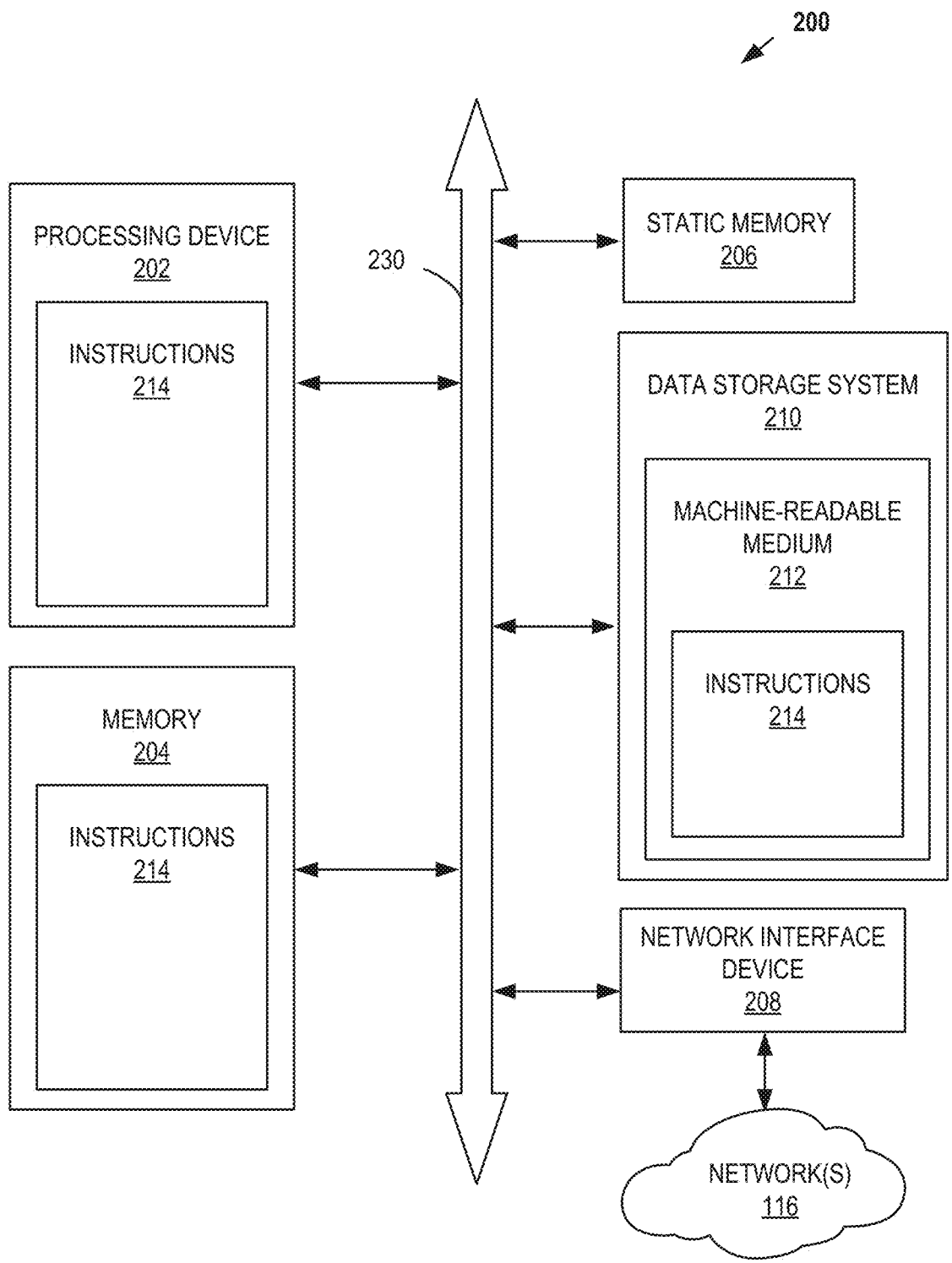
FIG. 2 illustrates is a block diagram of example aspects of an example computing system, in accordance with some embodiments of the present disclosure.

FIG. 2 illustrates is a block diagram of example aspects of an example computing system 200, in accordance with some embodiments of the present disclosure. FIG. 2 illustrates parts of the computing system 200 within which a set of instructions, for causing a machine of the computing system 200 to perform any one or more of the methodologies discussed herein can be executed (such as any one or more of methods 300, 400, 500, 600, 700, 800, 900, 1000, 1100, 1200, 1300, 1400, 1500, 1600, 1700, 1800, 1900, 2000, 2100, 2200, 2300, 2400, 2500, 2600, 2700, 2800, 3000, 4500, 4600, and 4700). In some embodiments, the computing system 200 can correspond to a host system that includes, is coupled to, or utilizes memory or can be used to perform the operations of a controller (e.g., to execute an operating system to perform operations corresponding to any one of the client or server devices shown in FIG. 1). In alternative embodiments, the machine can be connected (e.g., networked) to other machines in a LAN, an intranet, an extranet, or the Internet. The machine can operate in the capacity of a server or a client machine in client-server network environment, as a peer machine in a peer-to-peer (or distributed) network environment, or as a server or a client machine in a cloud computing infrastructure or environment. The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein (such as any one or more of methods 300, 400, 500, 600, 700, 800, 900, 1000, 1100, 1200, 1300, 1400, 1500, 1600, 1700, 1800, 1900, 2000, 2100, 2200, 2300, 2400, 2500, 2600, 2700, 2800, 3000, 4500, 4600, and 4700).

The computing system 200 includes a processing device 202, a main memory 204 (e.g., read-only memory (ROM), flash memory, dynamic random-access memory (DRAM), etc.), a static memory 206 (e.g., flash memory, static random-access memory (SRAM), etc.), and a data storage system 210, which communicate with each other via a bus 230. The processing device 202 represents one or more general-purpose processing devices such as a microprocessor, a central processing unit, or the like. More particularly, the processing device can be a microprocessor or a processor implementing other instruction sets, or processors implementing a combination of instruction sets. The processing device 202 can also be one or more special-purpose processing devices such as an application specific integrated circuit (ASIC), a field programmable gate array (FPGA), a digital signal processor (DSP), network processor, or the like. The processing device 202 is configured to execute instructions 214 for performing the operations discussed herein. The computing system 200 can further include a network interface device 208 to communicate over the LAN/WAN network(s) 116 of FIG. 1. The data storage system 210 can include a machine-readable storage medium 212 (also known as a computer-readable medium) on which is stored one or more sets of instructions 214 or software embodying any one or more of the methodologies or functions disclosed herein (such as any one or more of methods 300, 400, 500, 600, 700, 800, 900, 1000, 1100, 1200, 1300, 1400, 1500, 1600, 1700, 1800, 1900, 2000, 2100, 2200, 2300, 2400, 2500, 2600, 2700, 2800, 3000, 4500, 4600, and 4700). The instructions 214 can also reside, completely or at least partially, within the main memory 204 or within the processing device 202 during execution thereof by the computing system 200, the main memory 204 and the processing device 202 also constituting machine-readable storage media.

In some embodiments, the instructions 214 include instructions to implement functionality corresponding to the client devices and server devices shown in FIG. 1 (e.g., see system frontend 102 and system backend 104 shown in FIG. 1). While the machine-readable storage medium 212 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

In some embodiments, the instructions 214 include instructions to implement functionality corresponding to artificial intelligence (AI) or machine learning disclosed herein. For the purposes of this disclosure, artificial intelligence includes any form of intelligence implemented by a machine, such as a computing system (e.g., see computing system 200). In some embodiments, AI disclosed herein includes machine learning. In some embodiments, AI disclosed herein includes search and mathematical optimization, formal logic, artificial neural networks (ANNs), methods based on statistics or probability, or any combination thereof. In some embodiments, machine learning disclosed herein includes supervised learning or unsupervised learning.

Figure 3:
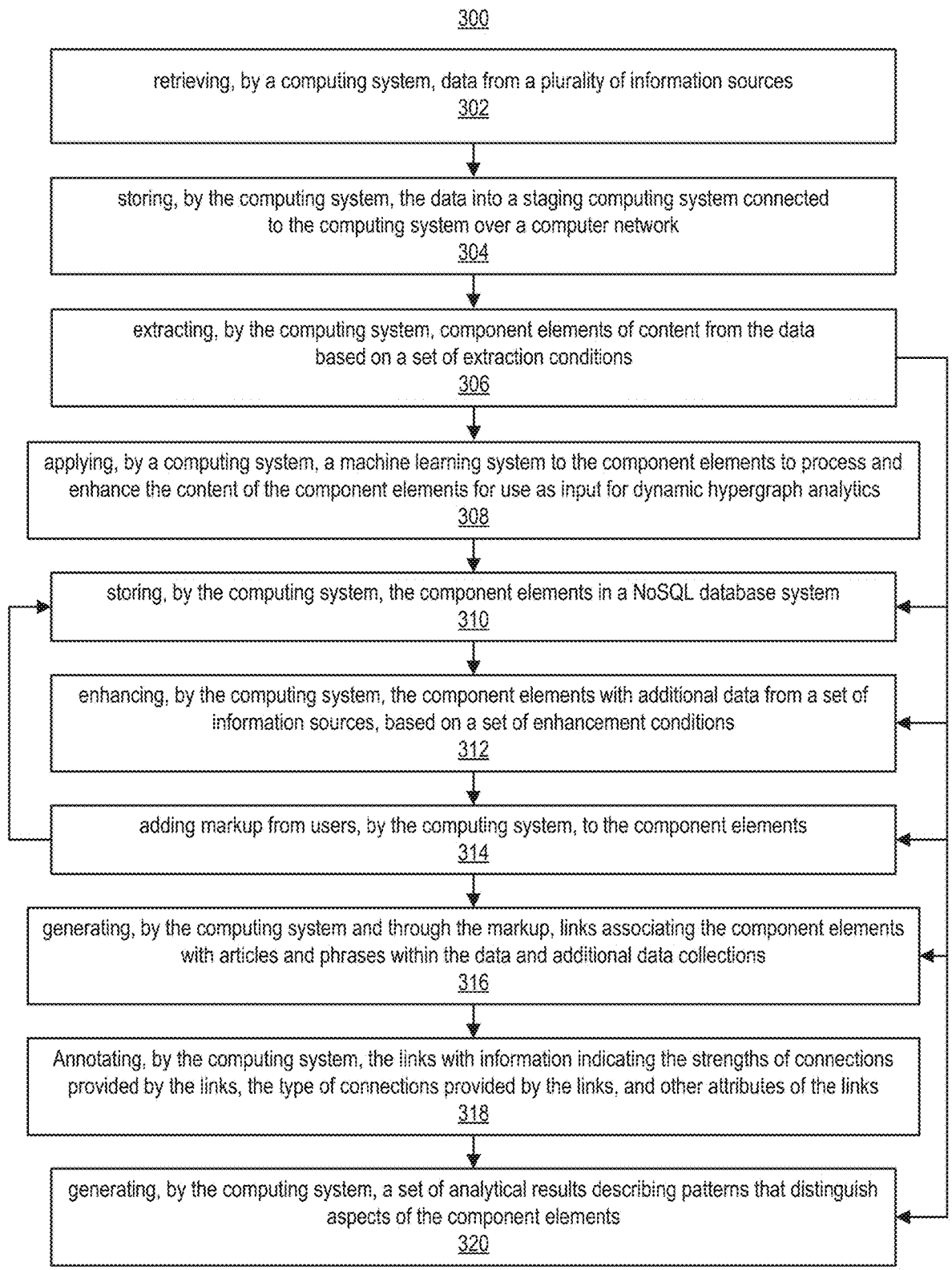

FIG. 3 shows a method 300, implemented by a computing system (such as the computing system 200), for news topic content processing and enhancement, in which the output of the method is useable as input for dynamic hypergraph analytics. In some examples, method 300 can be combined with any one or more of the methods disclosed herein. Although aspects of method 300 relate to the processing and enhancement of news information, it is to be understood that the technologies disclosed by the method 300 can be applied to other applications and implemented for other purposes such as applications related to big data (e.g., applications for social media systems, targeted marketing systems, traffic control systems, automated driving systems, weather prediction and warning systems, financial analysis systems, drug discovery systems, etc.).

The method includes, at step 302, retrieving, by a computing system (such as the computing system 200), a history of published news and academic articles from a plurality of information sources via online feeds (such as RSS feeds, e.g., RDF Site Summary or Really Simple Syndication feeds), application programming interfaces (APIs), data entry and other methods. In a more generic application of step 302, the computing system retrieves data from a plurality of information sources via online feeds, APIs, data entry, and other methods. The computing system of method 300 includes a least one server-side computing device.

The method 300 also includes, at step 304, storing, by the computing system, the history into a staging computing system (such as a staging computing system implemented at least in part by a data lake or any other system or repository of data stored in its natural/raw format, usually made up of object blobs or files, wherein a blob is a binary large object that is a collection of binary data stored as a single entity). In a more generic application of step 304, the computing system stores the data from the plurality of information sources in a staging computing system. The staging computing system is connected to the computing system over a computer network.

The method also includes, at step 306, extracting, by the computing system, component elements of content from the history. Or, in a more generic use case, extracting, by the system, component elements from the data that is from the plurality of information sources. The extraction is based on a set of extraction conditions using tools such as natural-language processing (NLP) services and artificial intelligence models that use machine learning to identify insights, correlations, or connections in text. The tools can also include a sign-up, sign-in, and access control to web and mobile apps, which can provide a layer of security to the extraction of the component elements (such as an encryption layer to the extraction process, e.g., application layer or transport layer security).

As shown in FIG. 3, the method 300 also includes, at step 308, applying, by the computing system, a machine learning system to the component elements to improve the efficiency of processing and enhancement of the content of the component elements for use as input for dynamic hypergraph analytics. In such examples, the application of the machine learning system can include translating a first taxonomy extracted from the component elements to a second taxonomy or multiple taxonomies based on a lookup table (such as translating an International Press Telecommunications Council (IPTC) taxonomy within the component elements in news content processing use cases). Also, in some examples, the application of the machine learning system includes parsing content from metadata in the component elements.

Also, the application of the machine learning system can include extracting entities, events, and places from content in the component elements. Also, in some examples, the application of the machine learning system includes enhancing content or metadata in the component elements using content enrichment processes based on artificial intelligence, machine learning, or data the computing system acquires from a database management system or external information sources (such as marketing and business information sources or any other types of data sources, e.g., big data sources for news and social media systems, targeted marketing systems, traffic control systems, automated driving systems, weather prediction and warning systems, financial analysis systems, drug discovery systems, etc.), or based on one or more sets of enhancement conditions. Also, with respect to news content use cases, in some examples, the application of the machine learning system includes interlinking and organizing articles, publishers, phrases, and extracted and enhanced component elements as nodes in a graph interconnected by multiple dimensions of edges representing nature and strength of connections as defined by governance processes disclosed herein. Alternatively, in more generic examples, the application of the machine learning system includes interlinking and organizing aspects of the retrieved data and extracted and enhanced component elements derived from the retrieved data as nodes in a graph interconnected by multiple dimensions of edges representing nature and strength of connections as defined by governance processes such as the governance processes disclosed herein.

In some examples, whether or not being applied to news content, each of the nodes of the hypergraph includes at least one computing device and the graph is implemented as a computer network, and the graph is representative of a network topology of the computer network. Also, in some examples, the application of the machine learning system includes: managing sensitivity, performance and bias of components of the machine learning system; and producing statistics regarding performance of the components the machine learning system for presentation in a governance dashboard for editor review and interaction with the statistics.

As shown in FIG. 3, the method 300 also includes, at step 310, storing, by the computing system, the component elements in a NoSQL database system (e.g., a managed, serverless, key-value NoSQL database system designed to run high-performance applications, or a document data model that maps to how developers think and code with a unified query API. etc.) within the staging computing system. Also, the method 300 includes, at step 312, enhancing, by the computing system, the component elements with additional data from a set of information sources, based on a set of enhancement conditions. Also, the method 300 includes, at step 314, adding markup or additional data from users, by the computing system, to the component elements. The markup can include metadata determined or selected from a managed set of choices that include a set of markup conditions. And, the markup or additional data can be received from a user interface with interactive tools for marking up the component elements. In some embodiments, the method 300 or other methods disclosed herein can further include providing a process for retrieving anonymous user profile information or generating an anonymous user profile for engaging anonymously with the user interface as well as other user interfaces disclosed herein (e.g., see FIGS. 21 and 28 and related text herein).

Also, the method 300 includes at step 316, generating, by the computing system and through the markup or the additional data, links associating the component elements with articles and phrases within the history and additional data collections; and at step 318, the method also includes annotating, by the computing system, the links with information indicating the strengths of connections provided by the links, the type of connections provided by the links, and other attributes of the links. In some more generic embodiments of the method 300, step 316 includes generating, by the computing system and through the markup or the additional data, links associating the component elements with other aspects of the retrieved data and additional data collections, and step 318 includes annotating or tagging, by the computing system, the links with information indicating the strengths of connections provided by the links, the type of connections provided by the links, and other attributes of the links. As shown, the method 300 further includes, at step 320, generating, by the computing system, a set of analytical results describing patterns that distinguish aspects of the component elements.

With respect to news content use cases of the method 300, in some examples, the aspects of the component elements include groups of articles sharing common phrases, data references, entity mentions and other information related to textual content. Also, in some examples, the aspects of the component elements include groups of phrases within and across articles, and uses of phrases by journalists or quoted entities. Also, in some examples, the aspects of the component elements include groups of extracted entities enhanced with data retrieved from external sources, by the computing system, and clustered by common demographics, beliefs, motives, influence, career paths, political alignment, geography, policy positions, or a combination thereof.

In some examples, such as more generic use cases, the aspects of the component elements include groups of extracted entities enhanced with or without data retrieved from external sources, by the computing system, and clustered by common attributes or parameters or a combination thereof. Further, in some examples, analytics calculate parameters of individual records which define the groupings of records and assign those parameters to the groupings as weights and other variables. Also, in some examples, weighting of parameters defining each group or cluster is calculated through linear regression (e.g., the linear regression implemented using applications that have mapping functionality). The applications that provide linear regression can also plot latitude and longitude coordinates and connect to spatial files to display custom geography. Geocoding of the system allows for administrative places (country, state/province, county/district), postal codes, US Congressional Districts, US CBSA/MSA, Area Codes, Airports, and European Union statistical areas (NUTS codes) to be mapped automatically via some embodiments of the method. Geographies can be grouped to create custom territories or custom geocoding used to extend existing geographic roles in the applications (such as marketing and business information applications or any other types of applications, e.g., big data applications for news and social media systems, targeted marketing systems, traffic control systems, automated driving systems, weather prediction and warning systems, financial analysis systems, drug discovery systems, etc.).

Figure 4:
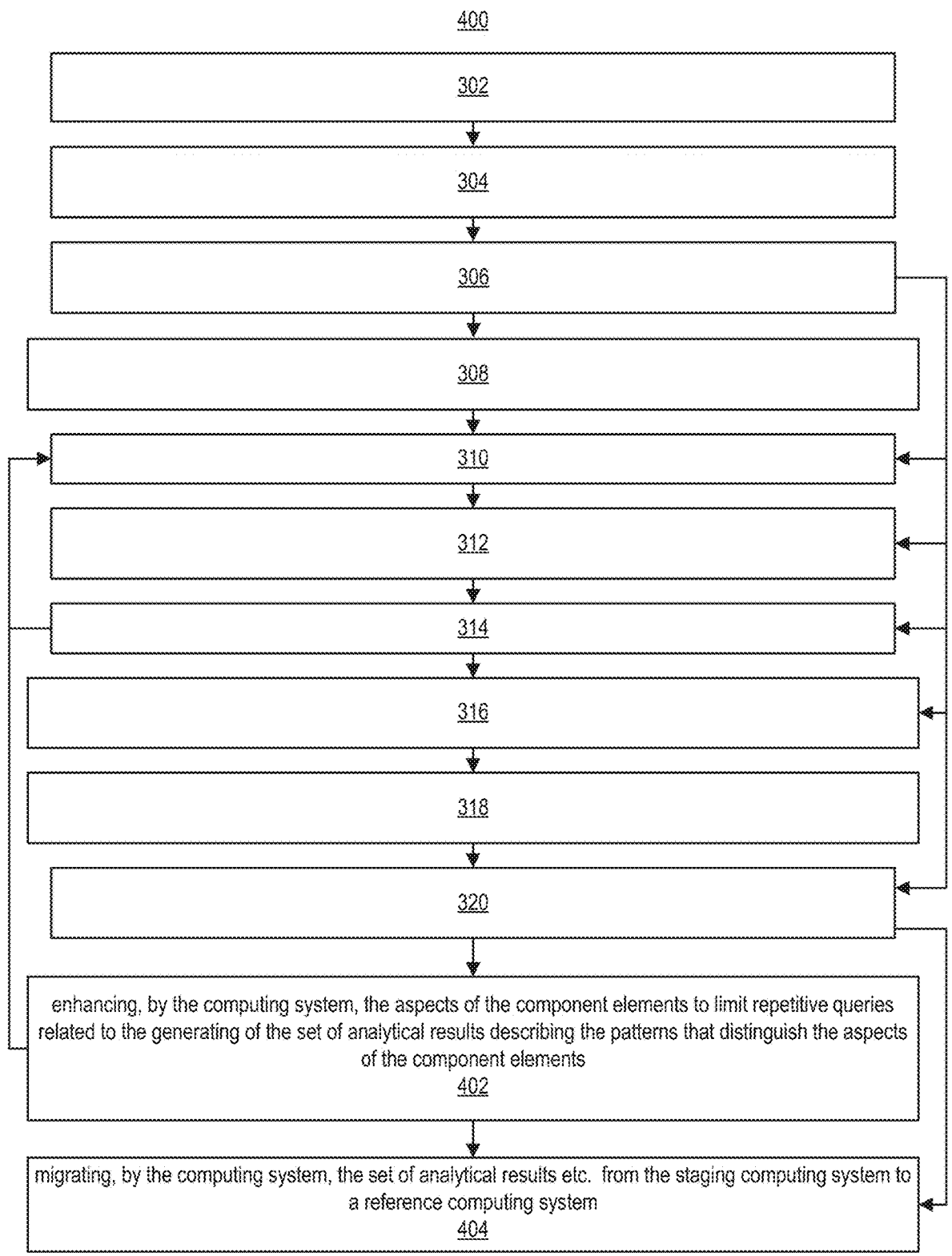

FIG. 4 shows a method 400 implemented by a computing system (such as the computing system 200) for news topic content processing and enhancement, in which the output of the method is useable as input for dynamic hypergraph analytics. In some examples, method 400 can be combined with any one or more of the methods disclosed herein. Although aspects of method 400 are described as for news topic content processing and enhancement, it is to be understood that the technologies disclosed by the method 400 can be applied to other applications and implemented for other purposes, such as for applications related to big data (e.g., applications for social media systems, targeted marketing systems, traffic control systems, automated driving systems, weather prediction and warning systems, financial analysis systems, drug discovery systems, etc.).

The method 400 includes the steps of method 300 and includes, at step 402, enhancing, by the computing system, the aspects of the component elements (such as enhancing articles and entity records with data about group and cluster relationships between articles and entity records) to limit repetitive queries related to the generating of the set of analytical results describing the patterns that distinguish the aspects of the component elements. Method 400 includes, at step 404, migrating, by the computing system, the set of analytical results, marked-up articles or other types of data, or extracted and enhanced elements from articles or other types of data from the staging computing system to a second NoSQL instance or system (or also referred to herein as a reference computing system). The reference computing system can include a NoSQL system that supports key-value and document data structure or other data item data structures. Production analytics of the computing system can be performed by the reference computing system.

FIG. 5 shows a method 500 for news and citizens hypergraph development and management, implemented by a computing system (such as the computing system 200). In some examples, method 500 can be combined with any one or more of the methods disclosed herein. Although aspects of method 500 are described as for news and citizens hypergraph development and management, it is to be understood that the technologies disclosed by the method 500 can be applied to other applications and implemented for other purposes, such as for hypergraph development and management of other types of applications related to big data (e.g., applications for social media systems, targeted marketing systems, traffic control systems, automated driving systems, weather prediction and warning systems, financial analysis systems, drug discovery systems, etc.).

Method 500 includes, at step 502, gathering within the reference computing system, by the computing system, processed articles and other types of content and data elements extracted from the history of published news and academic articles. Method 500 includes, at step 504, generating a news hypergraph based at least on the gathering of the processed articles and other types of content and data elements extracted from the history. In some embodiments, to enhance integrity of statistical processes applied to the news hypergraph, the news hypergraph is generated independent of end-user interactions with the computing system to avoid comingling of information across the news hypergraph and a citizens hypergraph. The comingling of information across the hypergraphs can cause self-reinforcing feedback loops, sources of false positives and statistics issues. As shown, method 500 includes, at step 506, applying hypergraph network topology mapping (such as by using known computer and hypergraph network topology mapping tools) to the processed articles and other types of content and data elements extracted from the history.

Also, the method 500 includes, at step 508, baseline mapping iterations that includes conducting, by the computing system, first passes of use of the known network topology mapping tools at creation of two independent data sets. In some examples, the first independent data set includes a first pass news hypergraph that is generated by a first pass of hypergraph positioning processes on the news hypergraph, and a second independent data set includes a first pass citizens hypergraph that is generated by a first pass of the hypergraph positioning processes or a first pass of second hypergraph positioning processes on the citizens hypergraph.

Also, the method 500 includes, at step 510, applying, by the computing system, hypergraph refinement processes to refine and document variables defining nodes and edges of the news hypergraph and the citizens hypergraph. Also, the method includes, at step 512, performing, by the computing system, additional mapping iterations (i.e., N+1 mapping iterations) that include conducting additional passes on the two independent hypergraphs using the known network topology mapping tools to update the two independent hypergraphs based on the refinements made to variables defining the news hypergraph and the citizens hypergraph. Also, the method 500 includes, at step 514, providing, by the computing system, a user interface showing states of the news and citizens hypergraphs, such that a governing board of users can use the interface to determine if the hypergraphs are stable in latest iterations of the hypergraphs. In some embodiments, the method 500 can further include providing a process for retrieving anonymous user profile information or generating an anonymous user profile for engaging anonymously with the user interface (e.g., see FIGS. 21 and 28 and related text herein).

Also, in some examples, methods, such as method 500, include a governance decision point at which editors approve respective states of the news and citizens hypergraphs, and thereby trigger a context hypergraph process to merge the news and citizens hypergraphs into an integrated context hypergraph (i.e., the context hypergraph). As shown, the method 500 includes, at step 516, applying the known network topology mapping tools to a union of the news and citizens hypergraphs in further generation of the context hypergraph. Also, the method 500 includes, at step 518, positioning the context hypergraph relative to known anchor points in a multidimensional data landscape using the hypergraph positioning processes. Also, the method 500 includes, at step 520, running, by the computing system, known news statistical analytics on results of the context hypergraph process. The results of the context hypergraph process enhance key variables of the context hypergraph.

Figure 6:
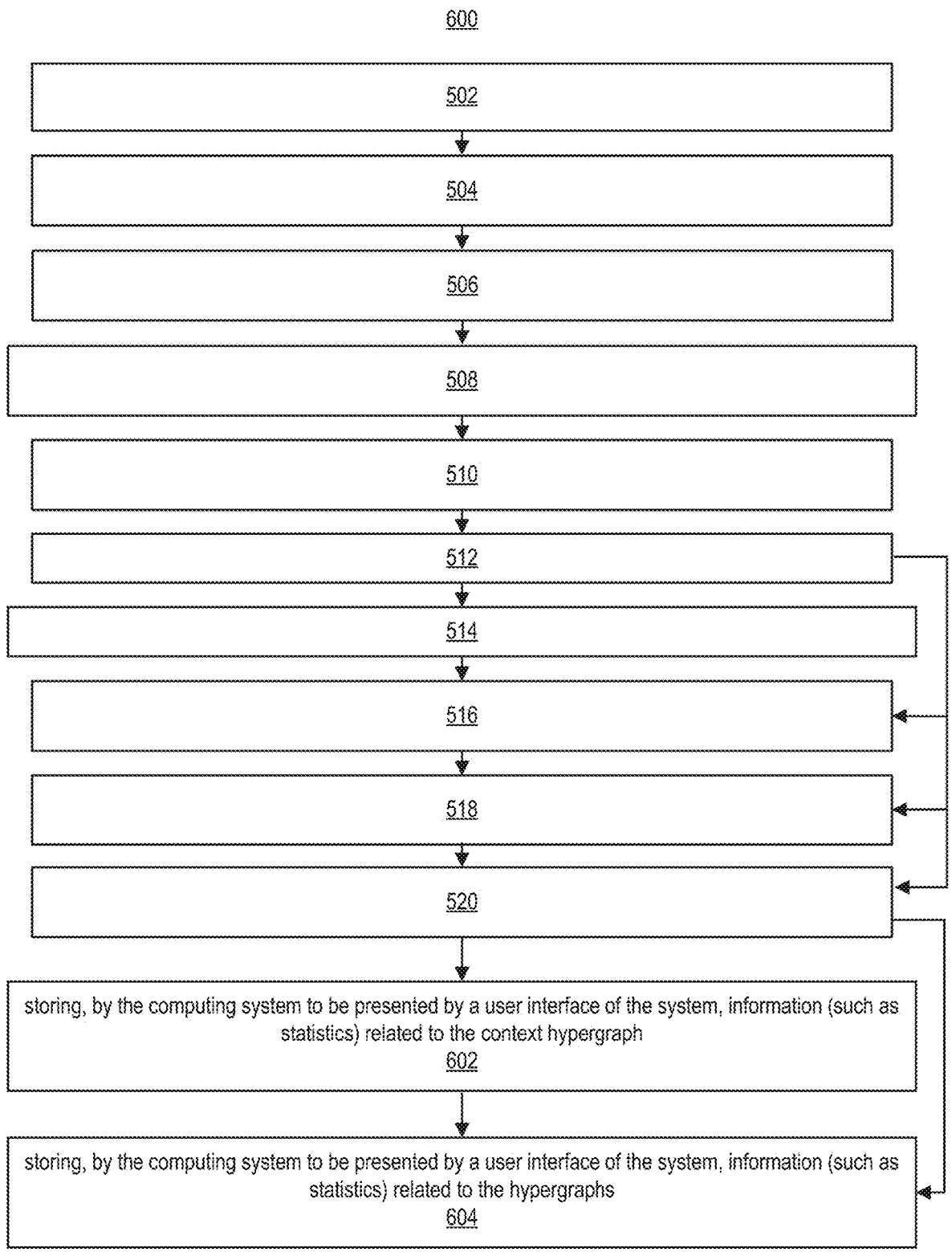

FIG. 6 shows a method 600 for news and citizens hypergraph development and management, implemented by a computing system (such as the computing system 200). In some examples, method 600 can be combined with any one or more of the methods disclosed herein. Although aspects of method 600 are described as for news and citizens hypergraph development and management, it is to be understood that the technologies disclosed by the method 500 can be applied to other applications and implemented for other purposes, such as for hypergraph development and management of other types of applications related to big data (e.g., applications for social media systems, targeted marketing systems, traffic control systems, automated driving systems, weather prediction and warning systems, financial analysis systems, drug discovery systems, etc.).

The method 600 includes the steps of method 500 and includes, at step 602, storing, by a database of the reference computing system, information (such as statistics) related to the context hypergraph to be presented by a user interface of the computing system. Also, the method 600 includes, at step 604, storing, by the computing system to be presented by a user interface of the system, information (such as statistics) related to the hypergraphs for access by editors in governing the context hypergraph and the other hypergraphs mentioned here. In some embodiments, the method 600 can further include providing a process for retrieving anonymous user profile information or generating an anonymous user profile for engaging anonymously with the user interface (e.g., see FIGS. 21 and 28 and related text herein).

Figure 7:
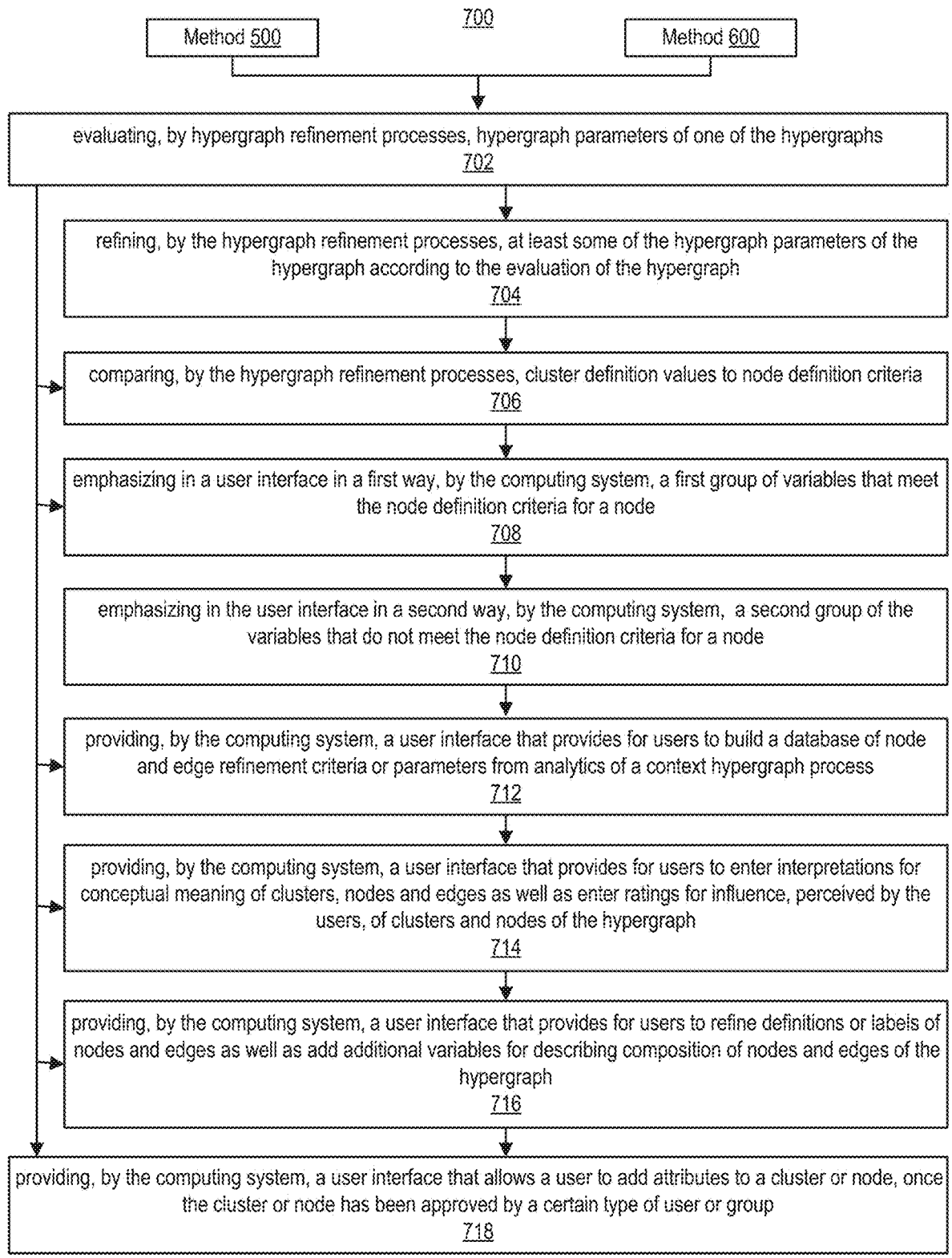

FIG. 7 shows a method 700 for hypergraph refinement tools and processes, implemented by a computing system (such as the computing system 200). In some examples, method 700 can be combined with any one or more of the methods disclosed herein. For example, as shown, the results of method 500 or method 600 can be used by step 702. Also, although aspects of method 700 can be applied to the processing and enhancement of news information, it is to be understood that the technologies disclosed by the method 700 can also be applied to other applications and implemented for other purposes, such as applications related to big data (e.g., applications for social media systems, targeted marketing systems, traffic control systems, automated driving systems, weather prediction and warning systems, financial analysis systems, drug discovery systems, etc.).

Method 700 includes, at step 702, evaluating, by hypergraph refinement processes of a computing system (such as the computing system 200), hypergraph parameters of a hypergraph. The hypergraph parameters can include nodes, respective metadata of the nodes, respective positions of the nodes in the hypergraph, edges connecting the nodes, respective metadata of the edges, respective positions of the edges in the hypergraph, and respective weights defining influence of each node and edge over each other mathematically. Also, the method includes, at step 704, refining, by hypergraph refinement processes, at least some of the hypergraph parameters of the hypergraph according to the evaluation of the hypergraph. As shown, the method 700 includes, at step 706, comparing, by hypergraph refinement processes of the computing system, cluster definition values to node definition criteria. The cluster definition values and node definition criteria can be inputted through a user interface by users granted permission to adjust such values and criteria. The cluster definition values can include cluster size, density, variance, relevance, influence, and other measures of clusters. The node definition criteria can include threshold values of cluster size, density, variance, relevance, influence, and other measures to qualify a cluster as a node. Also, in some examples, a cluster defined by its respective cluster definition values has cumulative influence over members of the cluster. Also, in some examples, if the cluster decreases in influence, the members of the cluster decrease in their influence according to a member influence algorithm.

As shown, the method 700 also includes, at step 708, emphasizing in a user interface in a first way, by the computing system, a first group of variables that meet the node definition criteria for a node; and, at step 710, emphasizing in the user interface in a second way, by the computing system, a second group of the variables that do not meet the node definition criteria for a node. In some examples, the variables include a cluster position confidence score. In some examples, the variables include a cluster density score. In some examples, the variables include a cluster size score which represents an index of the proportionate volume of records in the cluster or node, relative to the respective population. In some examples, the variables include a cluster variance score which represents a measure of the largest network distance between two records inside the cluster or node, represented in standard deviations from the mean. In some examples, the variables include a cluster relevance score which represents an index of the network distance of the node or cluster to a known reference point (e.g., policy position) in the hypergraph, as well as a rating of the conceptual relevance of the cluster or node to the topic space (e.g., an editor rating). In some examples, the variables include a cluster influence score which represents an index of the combined influence of the records within the cluster or node relative to the population. Also, in some examples, the variables include a conceptual meaning and relevance of a node, defined through user input (e.g., editor input). In some examples, the variables include a conceptual meaning and relevance of an edge, defined through user input. In some examples, the variables include a node influence score that represents an extent to which the node is additive or disruptive to patterns in surrounding parts of the hypergraph.

As shown, the method 700 also includes, at step 712, providing, by the computing system, a user interface that provides for users (e.g., editors) to build a database (such as a NoSQL database) of node and edge refinement criteria or parameters from analytics of a context hypergraph process (i.e., the process that generates the context hypergraph disclosed herein). In some examples, the node and edge refinement criteria or parameters include variables and values that qualify clusters as nodes, variables, and values that define edges as links between nodes of the hypergraph. Further, as shown, the method 700 includes, at step 714, providing, by the computing system, a user interface that provides for users to enter interpretations for conceptual meaning of clusters, nodes, and edges as well as enter ratings for influence, perceived by the users, of clusters and nodes of the hypergraph.

Also, the method 700 includes, at step 716, providing, by the computing system, a user interface that provides for users to refine definitions or labels of nodes and edges as well as add additional variables for describing the composition of nodes and edges of the hypergraph. In some examples, the additional variables include at least one of a trust score, an influence score, a strength of relationship, a length of relationship, and a dimensionality of alignments between nodes.

Also, as shown, the method 700 includes, at step 718, providing, by the computing system, a user interface that allows a user to add attributes to a cluster or node, once the cluster or node has been approved by a certain type of user or group (e.g., one or more editors). In some examples, the attributes of a cluster or node include at least one of (1) a name of the cluster or node, (2) metadata that describes a conceptual meaning of the cluster or node's mathematical positioning in the hypergraph, (3) component variables that are indexed in an article reference database (which is a NoSQL database in some embodiments), and (4) member records (which in some embodiments are updated with a NoSQL data model).

Figure 8:
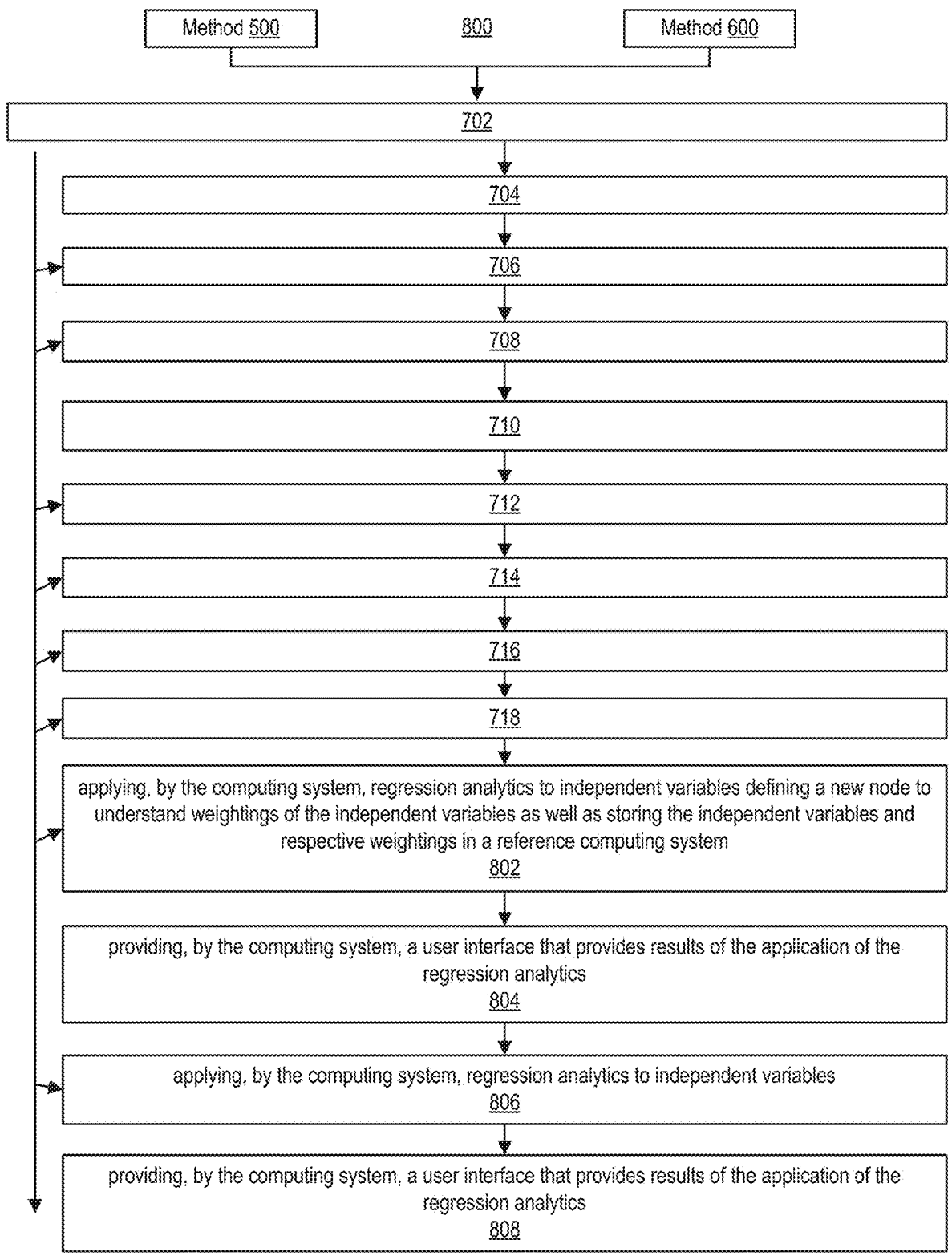

FIG. 8 shows a method 800 for hypergraph refinement tools and processes, implemented by a computing system (such as the computing system 200). In some examples, method 800 can be combined with any one or more of the methods disclosed herein. For example, as shown, the results of method 500 or method 600 can be used by step 702. The method 800 also includes the steps of method 700. Also, although aspects of method 800 can be applied to the processing and enhancement of news information, it is to be understood that the technologies disclosed by the method 800 can also be applied to other applications and implemented for other purposes, such as applications related to big data (e.g., applications for social media systems, targeted marketing systems, traffic control systems, automated driving systems, weather prediction and warning systems, financial analysis systems, drug discovery systems, etc.).

Method 800 further includes, at step 802, applying, by the computing system, regression analytics to independent variables defining a new node to understand weightings of the independent variables as well as storing the independent variables and respective weightings and resulting dependent variables and confidence scores in a reference computing system (which can include a reference database); and, at step 804, providing, by the computing system, a user interface that provides results of the application of the regression analytics. In some examples, such as in news content processing use cases, the independent variables for nodes include at least one of: (1) entities which include (a) informal groups sharing common demographics, (b) formal groups, or (c) personal politics, (2) events bringing together groups, (3) places where groups gather, (4) schools of thought groups share, (5) motives groups share, and (6) influence (such as groups influenced by specific entities or (b) entities or groups influential over entities or groups).

Also, method 800 includes, at step 806, applying, by the computing system, regression analytics to independent variables defining edges between nodes to understand weightings of variables defining edges as well as storing the independent variables and respective weightings in a reference computing system (which can include a reference database); and, at step 808, providing, by the computing system, a user interface that provides results of the application of the regression analytics. In some examples, such as in news content processing use cases, the independent variables for edges include at least one of: (1) familial relationship, (2) employer relationship, (3) extra-curricular relationship, (4) influence, (5) motives, (6) schools of thought, (7) geography, (8) political party affiliations, and (9) reading history.

Figure 9:
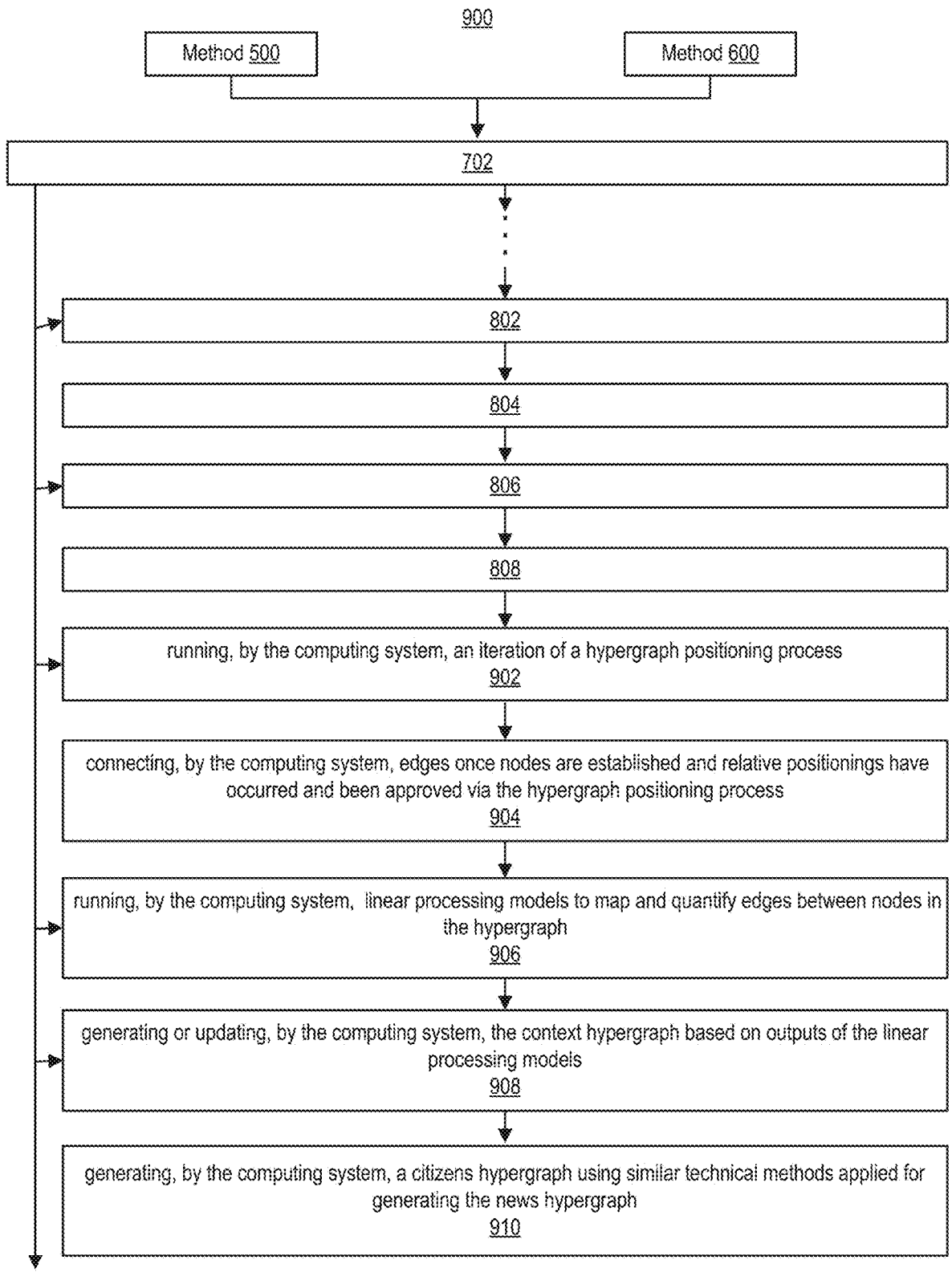

FIG. 9 shows a method 900 for hypergraph refinement tools and processes, implemented by a computing system (such as the computing system 200). In some examples, method 900 can be combined with any one or more of the methods disclosed herein. For example, as shown, the results of method 500 or method 600 can be used by step 902. The method 900 also includes the steps of methods 700 and 800. Also, although aspects of method 900 can be applied to the processing and enhancement of news information, it is to be understood that the technologies disclosed by the method 900 can also be applied to other applications and implemented for other purposes, such as applications related to big data (e.g., applications for social media systems, targeted marketing systems, traffic control systems, automated driving systems, weather prediction and warning systems, financial analysis systems, drug discovery systems, etc.).

Furthermore, at step 902, the method 900 includes running, by the computing system, an iteration of a hypergraph positioning process. Method 900 also includes, at step 904, connecting, by the computing system, edges once nodes are established and relative positionings have occurred and been approved via the hypergraph positioning process. The approval of such positionings occurs through user interface inputs into a network topology processing tool which produces a baseline map for positions of nodes and edges in the hypergraph.

The method 900 also includes, at step 906, running, by the computing system, linear processing models (such as models found in applications that provide linear programming, integer programming, nonlinear programming, stochastic programming and global optimization) to map and quantify edges between nodes in the hypergraph (which in some embodiments, such as in news content processing use cases, the edges represent pathways of influence in society, e.g., media spending on the influence of audiences and influence on audiences without evidence of media spending on influence). The method 900 also includes, at step 908, generating or updating, by the computing system, the context hypergraph based on outputs of the linear processing models. In some examples, such as in news content processing use cases, the context hypergraph can include nodes that represent citizen profiles (which, in some embodiments, citizen profiles are individual citizen-owned and maintained records and provide enhancement to the database of node and edge refinement criteria or parameters). At step 910, the method 900 includes generating, by the computing system, a citizens hypergraph using similar technical methods applied for generating the news hypergraph. In some examples, such as in news content processing use cases, within the generating of the citizens hypergraph, the context hypergraph uses NLP tools to make interpretations of language used to identify newsmaker entities' positions on policies, and the citizens hypergraph uses citizen answers to direct questions presented in contextual surveys to understand the citizen's beliefs explicitly. In some examples, such as in news content processing use cases, within the generating of the citizens hypergraph, tracking reading behavior through a newsreader provides tracking of each citizen's exposure to articles, mentions, phrases, and newsmakers, and citizen reading behavior (e.g., phrase and communications strategy consumption) is used as input for the generation of the citizens hypergraph.

Figure 10:
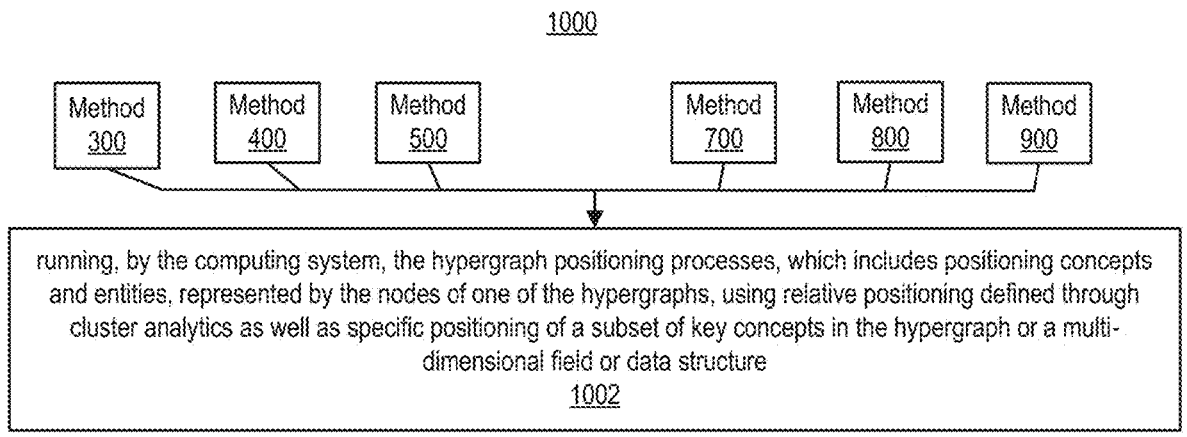

FIG. 10 shows a method 1000 for hypergraph positioning processes, implemented by a computing system (such as the computing system 200). In some examples, method 1000 can be combined with any one or more of the methods disclosed herein. For example, the results of methods 300, 400, 500, 700, 800, and 900 can be used by the method 1000. Also, although aspects of method 1000 can be applied to the processing and enhancement of news information, it is to be understood that the technologies disclosed by the method 1000 can also be applied to other applications and implemented for other purposes, such as applications related to big data (e.g., applications for social media systems, targeted marketing systems, traffic control systems, automated driving systems, weather prediction and warning systems, financial analysis systems, drug discovery systems, etc.).

Method 1000 includes, at step 1002, running, by the computing system, the hypergraph positioning processes, which includes positioning concepts and entities, represented by the nodes of one of the hypergraphs, using relative positioning defined through cluster analytics as well as specific positioning of a subset of key concepts in the hypergraph or a multi-dimensional field or data structure. In some examples, such as in news content processing use cases, the hypergraph is a news hypergraph that is generated based on articles and the entities, events, and places mentioned in news coverage. In some examples, the news hypergraph cross-links phrases and words in articles with extracted records of entities, events, and places. In some examples, the news hypergraph feeds a multi-publisher citizen newsreader portion of a topic-based user interface of the computing system, combined with publisher and journalist analytics, mapping of schools of thought, exposure of communications strategies, and policy proposals portions of the user interface. In some examples, the hypergraph is a citizens hypergraph that is generated based on member-owned records built by citizen members of the computing system based on the members' context, beliefs, and behaviors that are merged with news database entity records to finalize the generation of the citizens hypergraph.

In some examples of the method 1000, such as in news content processing use cases, the computing system uses the citizens hypergraph to query patterns of citizen beliefs and actions individually and in groups. In some examples, the citizens hypergraph feeds citizen point of views and action opportunities portions of a user interface of the computing system. In some examples, the citizens hypergraph includes citizen beliefs represented by a selection of profile data of citizen members of the computing system, and the citizen beliefs include positions on policies, schools of thought subscribed to, votes, donations, volunteering, as well as motives derived from individuals' career paths, individuals' investments, and individuals' family positional histories. In some examples, the citizens hypergraph is generated and maintained to be independent of the news hypergraph.

In some examples of the method 1000, such as in news content processing use cases, newsmaker entities have respective nodes in the news hypergraph and the citizens hypergraph, and newsmaker entities have additional privileges beyond the privileges of other types of entities in the hypergraphs. In some examples, the hypergraph is a context hypergraph that is generated based on integration of the news and citizens hypergraphs. In some examples, the context hypergraph through its nodes quantifies and profiles a citizen's context to aid users in understanding their influencers, engaging in civic responsibilities, profile building, belief documentation, influence calculations, motive calculations, policy alignment, voting, donating, volunteering, and running for office. In some examples, the context hypergraph feeds higher-level analytics and processors of the computing system as well as influencers portions of a user interface of the computing system.

In some examples of the method 1000, such as in news content processing use cases, the news hypergraph uses NLP tools like sentiment analysis to make interpretations of language to identify newsmaker entities' positions on policies. In some examples, positive sentiment in a politician's mention of a specific policy will set the politician's position on the policy to pro with a link back to a corresponding phrase in the article. In some examples, citizen observations and results of studies of a citizen are applied to clusters or nodes associated with the citizen. In some examples, group observations and results of studies of a cluster or node are applied to individuals associated with the cluster or node, and a conflict arises between a citizen observation or result of a study of the citizen and a group observation or a result of a study of the group, the citizen observation or result takes precedence when such information is retrieved by the computing system.

Figure 11:
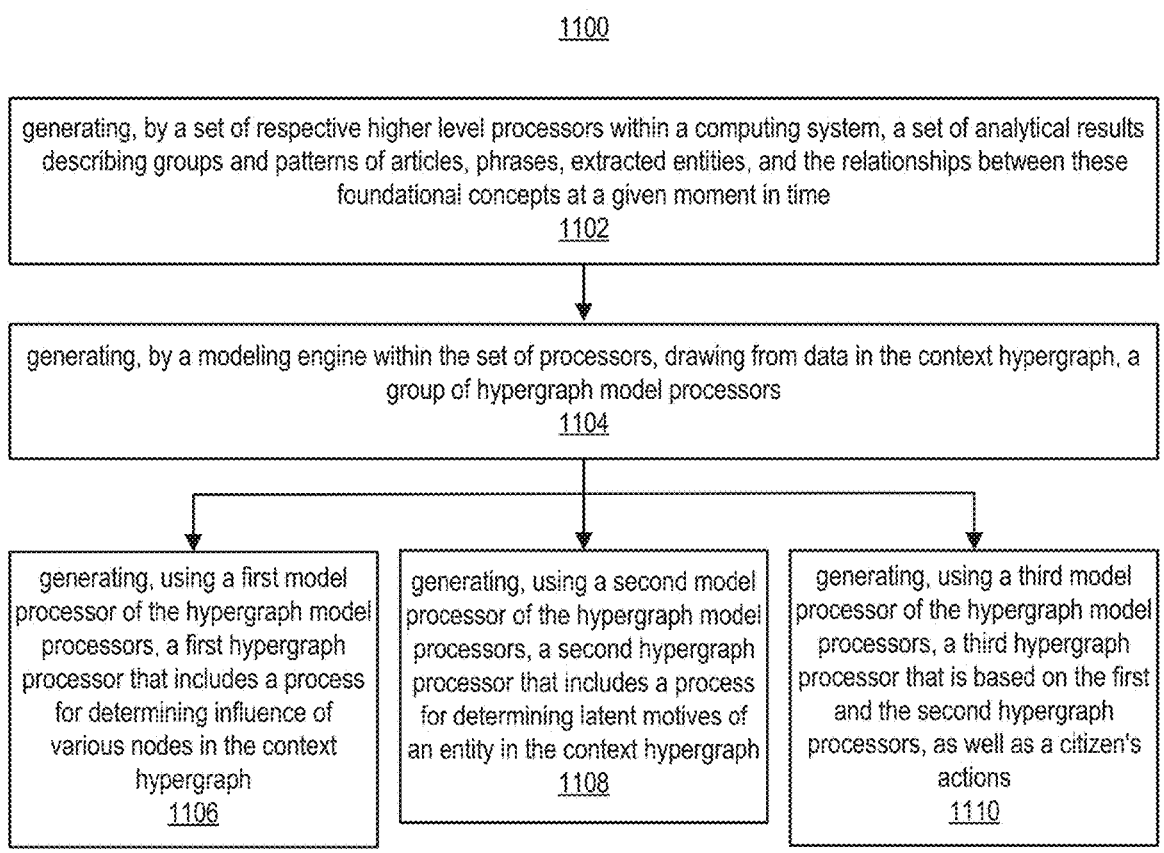

FIG. 11 shows a method 1100 for hypergraph model processors, implemented by a computing system (such as the computing system 200). In some examples, method 1100 can be combined with any one or more of the methods disclosed herein. Also, although aspects of method 1100 can be applied to the processing and enhancement of news information, it is to be understood that the technologies disclosed by the method 1100 can also be applied to other applications and implemented for other purposes, such as applications related to big data (e.g., applications for social media systems, targeted marketing systems, traffic control systems, automated driving systems, weather prediction and warning systems, financial analysis systems, drug discovery systems, etc.).

Method 1100 includes, at step 1102, generating, by a set of respective higher level processors within a computing system (such as the computing system 200), a set of analytical results describing groups and patterns of items in the hypergraph (such as articles, phrases, extracted entities, and the relationships between these foundational concepts at a given moment in time). The higher level processors are implemented by a high-level, general-purpose programming language in some embodiments.

The method also includes, at step 1104, generating, by a modeling engine within the set of processors of the computing system, a group of hypergraph model processors drawing from data in the context hypergraph; and, at step 1106, generating, using a first model processor of the hypergraph model processors, a first hypergraph processor that includes a process for determining influence of various nodes in the context hypergraph, and the dimensions of the determined influence including influence, reach or frequency. In some examples, such as in news content processing use cases, inputs to the first model processor can include career path, income, investments, media exposure, social media influence, donations, voting, etc. The method 1100 also includes, at step 1108, generating, using a second model processor of the hypergraph model processors, a second hypergraph processor that includes a process for determining latent motives of an entity in the context hypergraph, based on hypergraph variables of the context hypergraph. In some embodiments, such as in news content processing use cases, the motives can include career path, income, wealth, investments, political registration, positions on policies, etc. And, at step 1110, the method 1100 also includes generating, using a third model processor of the hypergraph model processors, a third hypergraph processor that is based on the first and the second hypergraph processors, as well as certain actions (such as citizen's actions in news content processing use cases), used as input for the third model processor. The third processor can calculate an entity's bias in action based on records of actions, in addition to outputs of the first and second hypergraph processors regarding the entity's motives and influence, and in addition to variables about the entity's positions on policies from the context hypergraph. In some examples, such as in news content processing use cases, the bias in action can include quotes, votes, donations, volunteering, and running for office.

In some examples, such as in news content processing use cases, the citizens hypergraph feeds citizen action opportunities portions of a user interface of the computing system, and records citizen intended or actual actions and outcomes. Also, in some examples, the news hypergraph cross-links phrases and words in articles with extracted records of entities, events, and places, according to a hypergraph development and management process which generates and updates a news hypergraph, and consequently, such elements are cross-linked in the context hypergraph in some embodiments. In some examples, the news hypergraph feeds a multi-publisher newsreader portion of a user interface of the computing system, presenting publisher and journalist analytics, schools of thought, communications strategies, and policy proposals portions of the user interface. In some examples, the hypergraph development and management process, based on extractions from news content, builds and enhances entity profiles as nodes forming the citizen hypergraph, and consequently, such elements are enhanced in the context hypergraph in some embodiments.

In some examples of the method 1100, such as in news content processing use cases, the computing system uses a newsreader user interface to query patterns of citizen beliefs and actions individually and in groups, according to the hypergraph development and management process which is configured to generate and update a citizens hypergraph, and consequently, update the context hypergraph in some embodiments. In some examples, the citizens hypergraph includes citizen beliefs represented by a selection of profile data of citizen members of the computing system, and the citizen beliefs include survey responses, positions on policies, schools of thought subscribed to, votes, donations, volunteering, as well as motives derived from individuals' career paths, individuals' investments, and individuals' family positional histories. In some examples, the second model processor is used by the computing system in combination with a user interface that allows citizen users to build their profiles starting from baseline assumptions within the citizens hypergraph.

In some examples of the method 1100, such as in news content processing use cases, the citizens hypergraph is generated and maintained to be independent of the news hypergraph. In some examples, newsmaker entities have respective nodes in the news hypergraph and the citizens hypergraph, and newsmaker entities have additional privileges and restrictions beyond privileges of other types of entities in the hypergraphs. In some examples, the context hypergraph through its nodes quantifies and profiles a citizen's context for profile building, belief documentation, influence calculations, motive calculations, policy alignment, voting, donating, volunteering, and running for office, according to the hypergraph development and management process which is configured to generate and update a context hypergraph. In some examples, the context hypergraph feeds higher-level analytics and processors of the computing system as well as influencers portions of a user interface of the computing system.

In some examples of the method 1100, such as in news content processing use cases, any one or more of the models includes an economic influence sub-model. Also, a basis of the economic influence model assumes money moves between entities at market advertising rates to estimate the media-equivalent budgets behind broadcast phrase clusters or messaging strategies. And, the money is a basis for weighting of edges of hypergraphs generated based at least in part on the economic influence model.

In some examples of the method 1100, such as in news content processing use cases, any one or more of the models (such as the hypergraph development and management process being a basis for generating citizens hypergraphs) generates citizen entities as nodes in the citizen hypergraph. In some examples, each one of the entities is generated to have influence based on at least one of: (1) a model for the proportion of national GDP for which they are accountable through their job(s), (2) their career path and level, and (3) their media and social media exposure and sentiment as well as based on an influence sub-model of one or more of the models (such as economic influence sub-model, media influence sub-model and social media influence sub-model). In some examples, each one of the entities is generated to have motives based on motive sub-models of their career path, investments and wealth, and reputation.

In some examples of the method 1100, such as in news content processing use cases, each one of the entities is generated to have media influence based on the dollar value of media they earn, own, or acquire to broadcast their schools of thought and policy positions as well as based on a media influence sub-model of the overall influence model, and the motives model and sub-models. In some examples, the media influence is transformable to estimate proportions of media-equivalent budget used by influencers to target specific citizen groups or a specific citizen based on one or more of the models (such as the second model processor associated with motive, or the first model processor based on influence). In some examples, the media influence is useable as input in one or more of the higher level models (such as the second model processor associated with motives, or the third model processor which calculates an entity's likely bias in action) to estimate the sources and uses of dark money that is used to buy media in support of communications strategies. In some examples, the media influence sub-model is useable as input in one or more of the models (such as the second model processor associated with motive and the third model processor which measures bias in action) to estimate the costs and pathways for influencers to reach different audiences with specific messages.

In some examples of the method 1100, such as in news content processing use cases, the citizen user interface presents citizen members with a list of the influencers, pathways, and with specific messages used to target them in a given time period. In some examples, each one of the entities is generated to have belief influence based on a belief influence sub-model of one or more of the models (such as the second model processor associated with being a basis for generating citizens hypergraphs). In some examples, the belief influence model includes conditions, for entities, which are a basis for generating their motives based on their beliefs as inputs for the conditions. In some examples, the belief influence model includes conditions, for entities, which are a basis for generating their policy beliefs based on their beliefs as inputs for the conditions. In some examples, the belief influence model includes conditions, for entities, that are a basis for generating their schools of thought based on their beliefs as inputs (e.g., via surveys) for the conditions. The schools of thought include schools of thought to which they subscribe and the phrases used to communicate the schools of thought (which in some embodiments relates to reversed model conditions where such schools of thought are useable as input to generate phrase maps that reveal motives behind media budgets using those phrases). In some examples, the belief influence model includes conditions, for entities, that are a basis for generating dimensions representing their influence over specific topics and the strength of their influence over individuals and clusters of individuals.

In some examples of the method 1100, such as in news content processing use cases, each one of the entities is generated to have action opportunities based on an action opportunity sub-model of one or more of the models (such as the first model processor associated with the citizen's influence). In some examples, for entities, the method includes generating, by the computing system, a cluster of various analytical results describing a user's past actions and current action opportunities that include, for policies, action opportunities such as voting, donating, volunteering, and campaigning as well as include, for events, action opportunities such as sponsoring, participating or attending, and outcomes. In some examples of the method 1100, each one of the entities is generated to have at least one policy position based on policy positioning sub-process of one or more of the hypergraph positioning processes, which is part of the hypergraph development and management process. In some examples, for entities, the method includes generating, by the computing system, a cluster of a politician entity's supporters and opponents as well as funders and beneficiaries.

In some examples of the method 1100, such as in news content processing use cases, each one of the entities is generated to have a best interest based on a best interest sub-model of one or more of the models (such as the second model processor associated with motives). In some examples, for entities, the method includes running, by the computing system, analytics revealing an entity's best interest within the context of current policy options. In some examples, for entities, the method includes running, by the computing system, analytics providing an entity's historical analytics of the impact of past policy changes relevant to the entity's best interests. In some examples, for entities, the method includes running, by the computing system, analytics providing analysis of how policy proposals align with the beliefs of an entity, and groups of entities sharing a common belief or interest. In some examples, for entities, the method includes running, by the computing system, consistency checks which include measurement of beliefs as well as best interests for when an entity's beliefs conflict with its best interests or actions (e.g., specifically as it relates to voting and policy opportunities).

Figure 12:
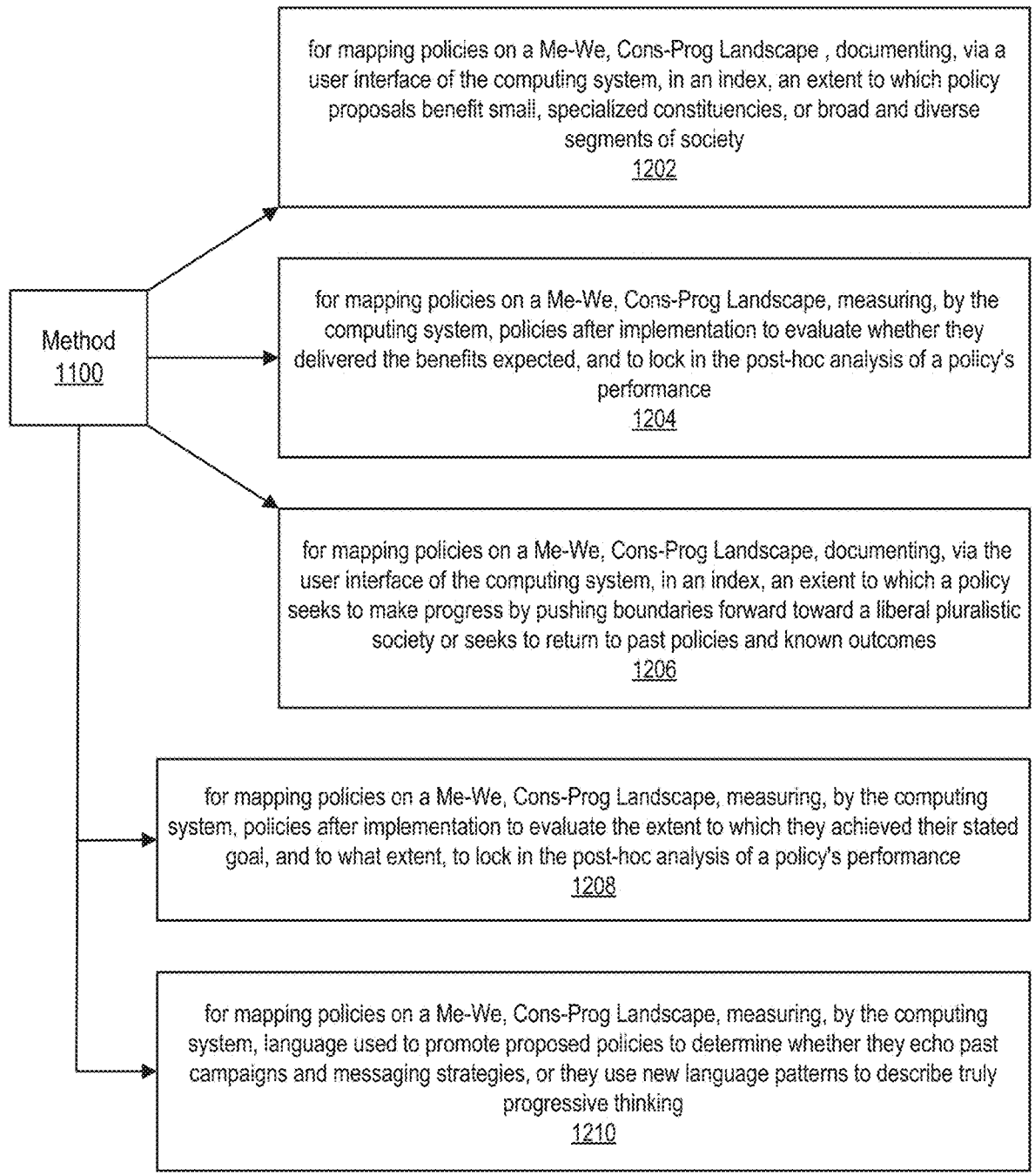

FIG. 12 shows a method 1200 for hypergraph model processors, implemented by a computing system (such as the computing system 200). In some examples, method 1200 can be combined with any one or more of the methods disclosed herein (such as method 1100, as shown). Also, although aspects of method 1200 relate to the processing and enhancement of news information, it is to be understood that the technologies disclosed by the method 1200 can also be applied to other applications and implemented for other purposes, such as applications related to big data (e.g., applications for social media systems, targeted marketing systems, traffic control systems, automated driving systems, weather prediction and warning systems, financial analysis systems, drug discovery systems, etc.).

Method 1200 includes, at step 1202, for mapping policies on a we-me and conservative-progressive landscape, documenting, via a user interface of the computing system, in an index, an extent to which policy proposals benefit small, specialized constituencies, or broad and diverse segments of society. Method 1200 also includes, at step 1204, for mapping policies on the we-me and conservative-progressive landscape, measuring, by the computing system, policies after implementation to evaluate whether they delivered the benefits expected, and to lock in the post-hoc analysis of a policy's performance. Method 1200 also includes, at step 1206, for mapping policies on the we-me and conservative-progressive landscape, documenting, via the user interface of the computing system, in an index, an extent to which a policy seeks to make progress by pushing boundaries forward toward a liberal pluralistic society or seeks to return to past policies and known outcomes. Method 1200 also includes, at step 1208, for mapping policies on the we-me and conservative-progressive landscape, measuring, by the computing system, policies after implementation to evaluate the extent to which they achieved their stated goal, and to what extent, to lock in the post-hoc analysis of a policy's performance. Method 1200 also includes, at step 1210, for mapping policies on the we-me and conservative-progressive landscape, measuring, by the computing system, language used to promote proposed policies to determine whether they echo past campaigns and messaging strategies, or they use new language patterns to describe progressive thinking.

Figure 13:
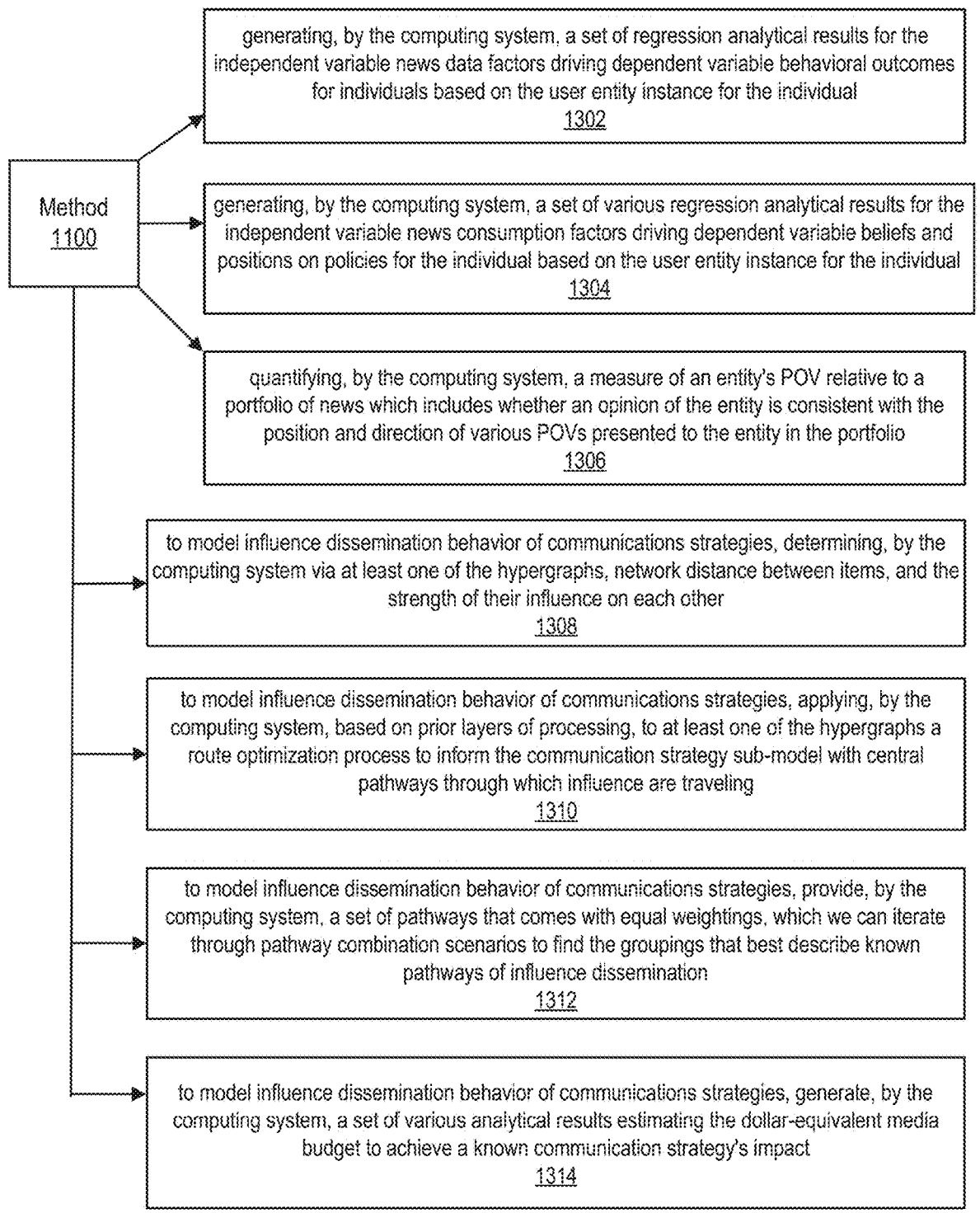

In some examples of methods 1100 or 1200, each one of the entities is generated to have at least one belief and behavior based on a belief and behavior sub-model of one or more of the models (such as the second model processor associated with being a basis for generating citizens hypergraphs). For example, as shown in FIG. 13, which depicts method 1300 for hypergraph model processors. Method 13 is implemented by the computing system and includes, at step 1302, generating, by the computing system, a set of regression analytical results for the independent variable news data factors driving dependent variable behavioral outcomes for individuals based on the user entity instance for the individual. Furthermore, method 1300 can be combined with any one or more of the methods disclosed herein (such as method 1100, as shown). Also, although aspects of method 1300 relate to the processing and enhancement of news information, it is to be understood that the technologies disclosed by the method 1300 can also be applied to other applications and implemented for other purposes, such as applications related to big data (e.g., applications for social media systems, targeted marketing systems, traffic control systems, automated driving systems, weather prediction and warning systems, financial analysis systems, drug discovery systems, etc.).

Method 1300 also includes, at step 1304, generating, by the computing system, a set of various regression analytical results for the independent variable news consumption factors driving dependent variable beliefs and positions on policies for the individual based on the user entity instance for the individual. Method 1300 also includes, at step 1306, quantifying, by the computing system, a measure of an entity's point of view (POV) relative to a portfolio of news which includes whether an opinion of the entity is consistent with the position and direction of various POVs presented to the entity in the portfolio.

In some examples (such as examples of method 1300), each one of the entities linked to phrases in news, social media, or marketing content is generated to have at least one communication strategy based on a communication strategy sub-model of one or more of the models (such as the first model processor associated with influence and the second model processor associated with motive). For instance, method 1300 also includes, at step 1308, to model influence dissemination behavior of communications strategies, determining, by the computing system via at least one of the hypergraphs, network distance between items within a dimension and the strength of their influence on each other. In some examples, at least one of the hypergraphs includes multiple layers or dimensions of node and edge relationships, with a special class of edges linking nodes between layers or dimensions, thereby allowing measurement of network distance and other characteristics of the hypergraph between items across dimensions, and the strength and nature of their influences on each other (e.g., one layer or dimension can contain articles and phrases as nodes, and a second layer or dimension can contain policies and positions, with the special class of edge between a phrase in one layer and a policy in another layer being called 'a mention' and the edge having characteristics and weightings like sentiment, accuracy, and bias).

Also, method 1300 includes, at step 1310, applying, by the computing system, based on prior layers of processing, at least one of the hypergraphs a route enhancement process to inform the communication strategy sub-model with central pathways through which influence are traveling within one dimension and across dimensions to model influence dissemination behavior of communications strategies. Step 1310 is performed to model influence dissemination behavior of communications strategies. Also, method 1300 includes, at step 1312, to model influence dissemination behavior of communications strategies, providing, by the computing system, a linear processing application that generates a set of pathways between entities and article, social media, and marketing content that begins with equal weightings—which the computing system iterates through pathway combination scenarios to find the groupings that best describe known pathways of influence dissemination. In some embodiments, the linear processing application is implemented using applications that have mapping functionality. The applications that provide such functionality can also plot latitude and longitude coordinates and connect to spatial files to display custom geography. The built-in geocoding allows for administrative places (country, state/province, county/district), postal codes, US Congressional Districts, US CBSA/MSA, Area Codes, Airports, and European Union statistical areas (NUTS codes) to be mapped automatically. Geographies can be grouped to create custom territories or custom geocoding used to extend existing geographic roles in the applications. In some examples, a result of providing the set of pathways is a mathematical model of influence which the computing system uses to reverse engineer communications strategies from news and marketing messaging. Further, method 1300 includes, at step 1314, to model influence dissemination behavior of communications strategies, generating, by the computing system, a set of various analytical results estimating the dollar-equivalent media budget to achieve a known communication strategy's impact.

Figure 14:
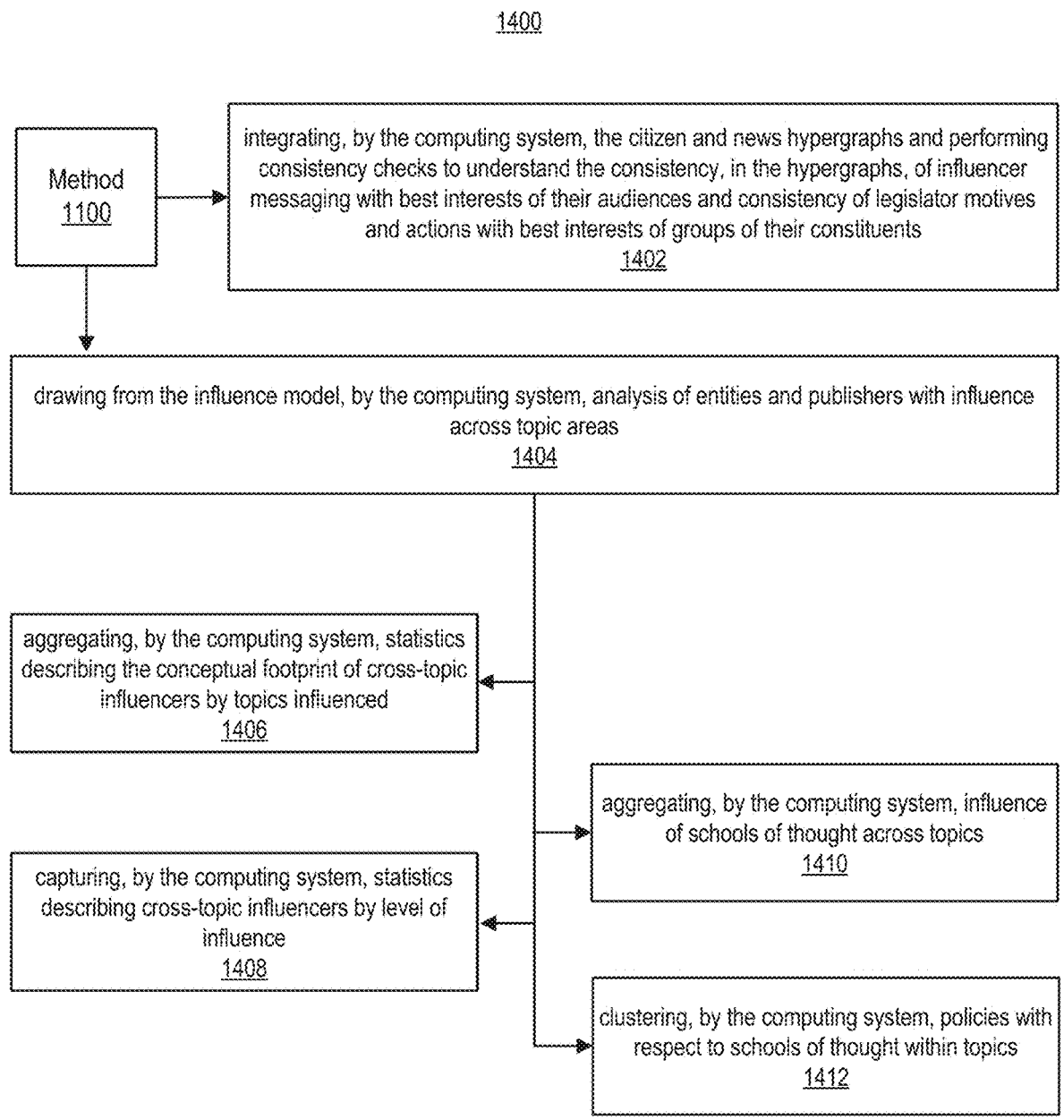

FIG. 14 shows method 1400 for hypergraph model processors, implemented by a computing system (such as the computing system 200). In some examples, method 1400 can be combined with any one or more of the methods disclosed herein (such as method 1100, as shown). Also, although aspects of method 1400 relate to the processing and enhancement of news information, it is to be understood that the technologies disclosed by the method 1400 can also be applied to other applications and implemented for other purposes, such as applications related to big data (e.g., applications for social media systems, targeted marketing systems, traffic control systems, automated driving systems, weather prediction and warning systems, financial analysis systems, drug discovery systems, etc.).

Method 1400 includes, at step 1402, integrating, by the computing system, the citizen and news hypergraphs and performing consistency checks to understand the consistency, in the hypergraphs, of influencer messaging with best interests of their audiences and consistency of legislator motives and actions with best interests of groups of their constituents (such as shown as a range from −1 to 1 with 0 being neutral). Also, method 1400 includes, at step 1404, drawing from the influence model, by the computing system, analysis of entities and publishers with influence across topic areas. Also, method 1400 includes, at step 1406, aggregating, by the computing system, statistics describing the conceptual footprint of cross-topic influencers by topics influenced. Furthermore, method 1400 includes, at step 1408, capturing, by the computing system, statistics describing cross-topic influencers by level of influence. The method also includes, at step 1410, aggregating, by the computing system, influence of schools of thought across topics. The method further includes, at step 1412, clustering, by the computing system, policies for schools of thought within topics.

Figure 15:
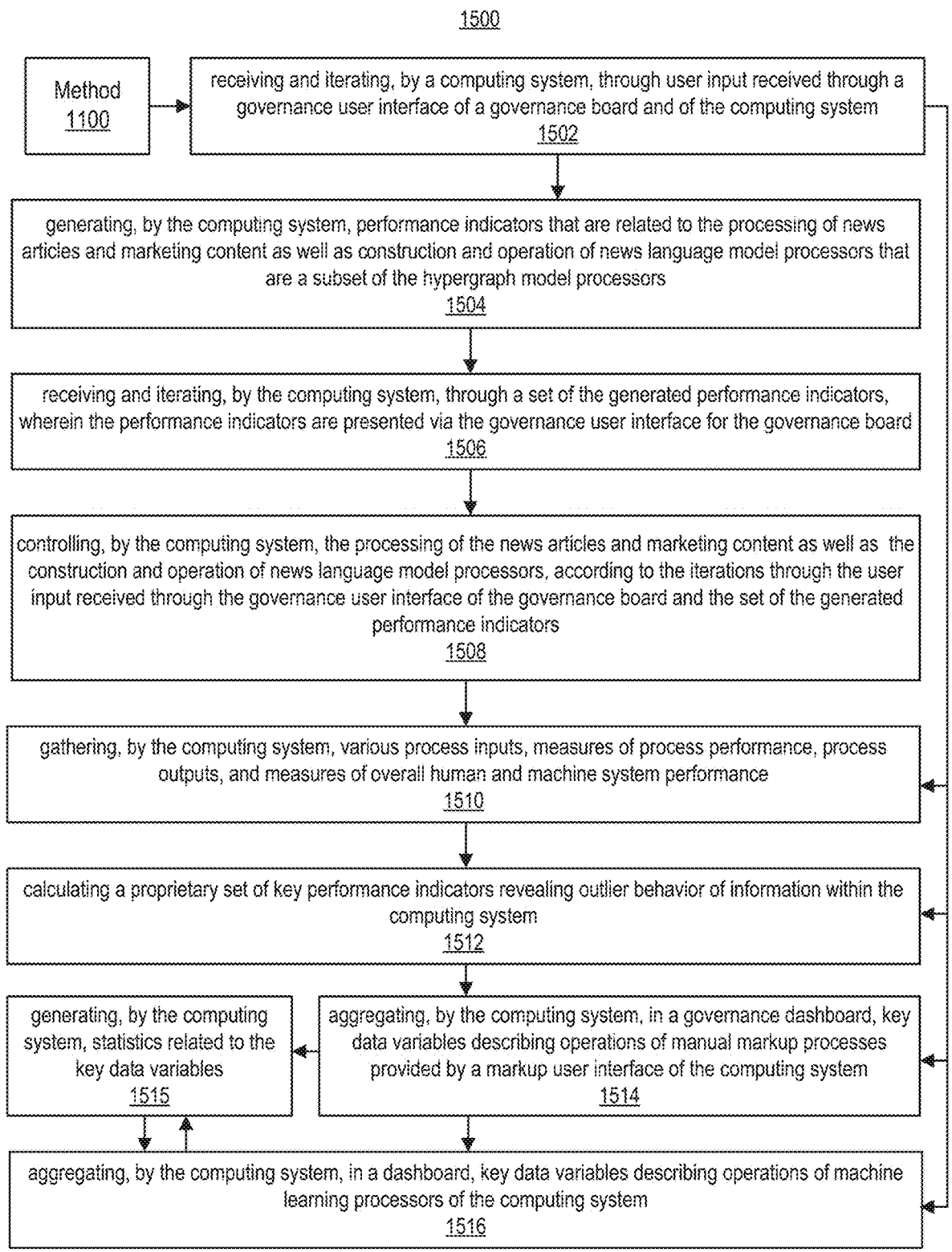

FIG. 15 shows method 1500 for hypergraph governance (which can, for example, be combined with methods for hypergraph model processors), implemented by a computing system (such as the computing system 200). In some examples, method 1500 can be combined with any one or more of the methods disclosed herein (such as method 1100, as shown). Also, although aspects of method 1500 can be applied to the governance of processing and enhancement of news information, it is to be understood that the technologies disclosed by the method 1500 can also be applied to other applications and implemented for other purposes, such as the governance of processing and enhancement of information associated with big data systems (e.g., social media systems, targeted marketing systems, traffic control systems, automated driving systems, weather prediction and warning systems, financial analysis systems, drug discovery systems, etc.).

Method 1500 includes, at step 1502, receiving and iterating, by a computing system (such as the computing system 200), through user input received through a governance user interface of a governance board and of the computing system. At step 1504, the method includes generating, by the computing system, performance indicators that are related to the processing of information (such as news articles, social media, and marketing content in some news content processing use cases) as well as construction and operation of the hypergraph model processors (e.g., news language model processors which are a subset of the hypergraph model processors in some news content processing use cases). At step 1506, the method includes receiving and iterating, by the computing system, through a set of the generated performance indicators. The performance indicators are presented via the governance user interface for the governance board.

Also, at step 1508, the method 1500 includes controlling, by the computing system, the processing of the information (such as the news articles and marketing content in some news content processing use cases) as well as the construction and operation of model processors (such as the news language model processors in some news content processing use cases), according to the iterations through the user input received through the governance user interface of the governance board and the set of the generated performance indicators. The method 1500 also includes, at step 1510, gathering, by the computing system, various process inputs, measures of process performance, process outputs, and measures of overall human and machine system performance. Also, the method 1500 includes, at step 1512, calculating a proprietary set of key performance indicators revealing outlier behavior of information within the computing system. In some examples, the key performance indicators include bias of inputs, bias of process operation, or bias of outputs of the computing system. In some examples, the key performance indicators include data related to sensitivity of the computing system to variables that imbalance the outputs of the computing system at certain value ranges.

Also, the method 1500 includes, at step 1514, aggregating, by the computing system, in a governance dashboard (which is a part of the governance user interface), key data variables describing operations of manual markup processes provided by a markup user interface (which, in some embodiments, is a part of the governance user interface) of the computing system. In some cases, the markup user interface operates in conjunction with the reference computing system (which can include a reference database version of the news hypergraph), such that the markup user interface shows changes to output of news statistical analytics and at least one of the model processors disclosed herein as well as receives input to control variables of the model processor to update the output of the model processor.

Also, the method 1500 includes, at step 1515, generating, by the computing system, statistics related to the key data variables. In some examples of the method 1500 or other appropriate methods disclosed herein, such as in some news content processing use cases, the key data variables include information related to users of the computing system, such as demographics, influence, motives for bias, action history, examples of bias and a record of news articles, social media posts, and marketing content consumed. In some examples, the key data variables include information related to article data stored within the computing system, such as distributions of drop-down variables selected by each user for each article that participates in marking up an article. In some examples, the key data variables include information related to article data stored within the computing system, such as evidence of incompleteness of markups to accelerate markup piecework. In some examples, the key data variables include information related to article data stored within the computing system, such as evidence of bad entries to accelerate markup piecework or introduce bias to information, In some examples, the key data variables include analytics of the human sources of bias in information stored within the computing system, such as heuristics used. In some examples, the key data variables include analytics of the human sources of bias in information stored within the computing system, such as limitations on ranges of drop-down selections. In some examples, the key data variables include analytics of the human sources of bias in information stored within the computing system, such as patterns found in drop-down selections. In some examples, the key data variables include analytics of the human sources of bias in information stored within the computing system, such as intentional disruption of normal markup processes. In some examples, the key data variables include analytics of the human sources of bias in information stored within the computing system, such as distributions of entries based on demographics.

Also, in some examples, as shown, the method 1500 includes, at step 1516, aggregating, by the computing system, in a dashboard, key data variables describing operations of machine learning processors of the computing system. In some examples, the key data variables include processor statistics. In some examples, processor statistics include statistics of articles or other information items processed, driving variables for each processor, or confidence levels for each processor.

Figure 16:
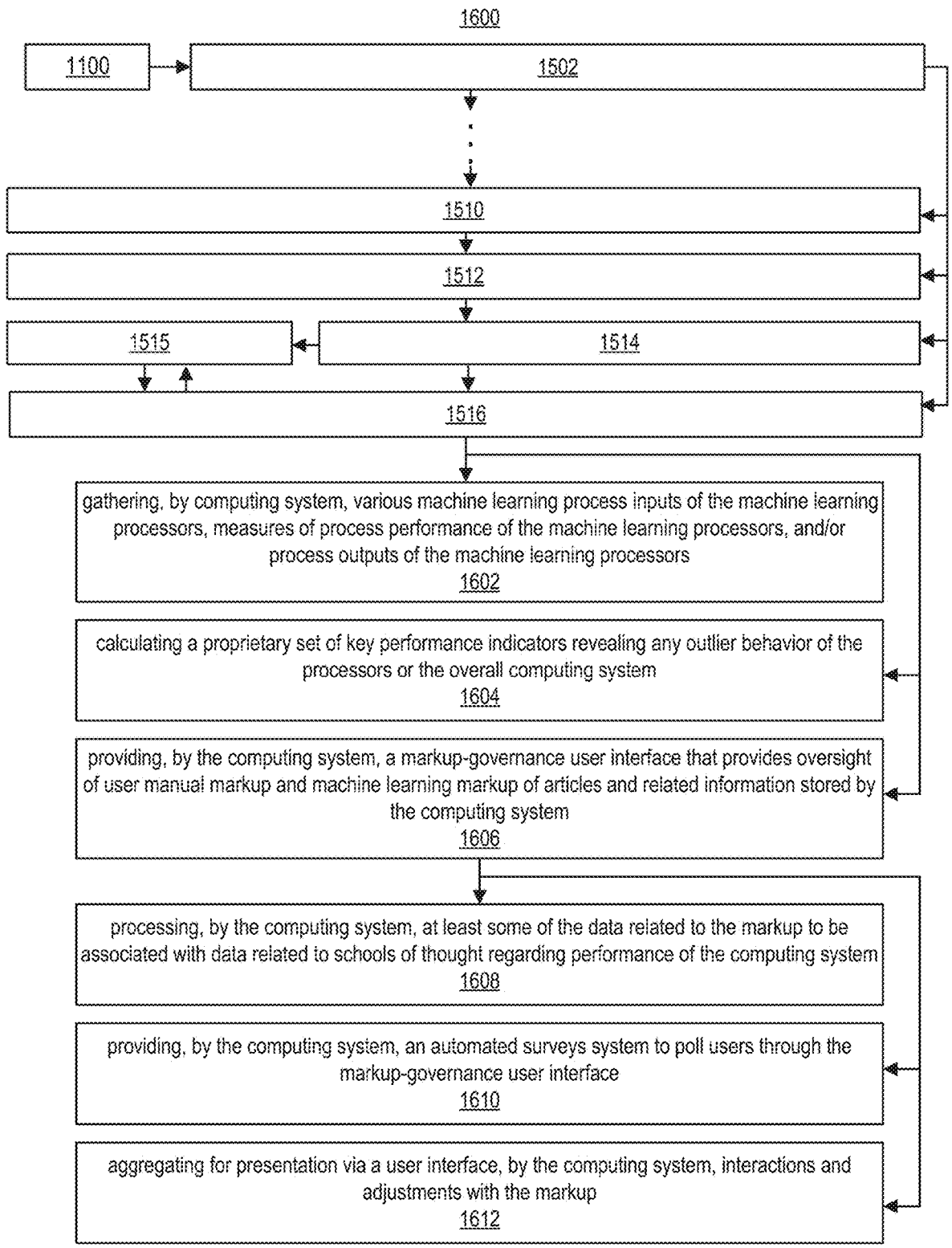

FIG. 16 shows method 1600 for hypergraph governance, implemented by a computing system (such as the computing system 200). In some examples, method 1600 can be combined with any one or more of the methods disclosed herein (such as method 1100, as shown). Also, the method 1600 includes the steps of method 1500. Furthermore, although aspects of method 1600 can be applied to the governance of processing and enhancement of news information, it is to be understood that the technologies disclosed by the method 1600 can also be applied to other applications and implemented for other purposes, such as the governance of processing and enhancement of information associated with big data systems (e.g., social media systems, targeted marketing systems, traffic control systems, automated driving systems, weather prediction and warning systems, financial analysis systems, drug discovery systems, etc.).

Also, at step 1602, the method 1600 includes gathering, by a computing system, various machine learning process inputs of the machine learning processors, measures of process performance of the machine learning processors, or process outputs of the machine learning processors. In some examples, the gathered information includes statistics of markup processors of the computing system, statistics of articles marked up, and analytics of the machine and data sources of bias in the computing system.

At step 1604, the method 1600 includes calculating a proprietary set of key performance indicators revealing any outlier behavior of the processors or the overall computing system. In some cases, the key performance indicators include evidence of bias within inputs, process operations, or outputs of the computing system. In some cases, the key performance indicators include sensitivity of the computing system to variables that could imbalance outputs for certain value ranges. At step 1606, the method includes providing, by the computing system, a markup-governance user interface (which is a part of the governance user interface) that provides oversight of user manual markup and machine learning markup of articles and related information stored by the computing system. In some cases, the markup-governance user interface is part of the dashboard. In some cases, at least some of the data related to the markup is stored and organized by databases such as NoSQL databases) of the computing system.

At step 1608, the method 1600 includes processing, by the computing system, at least some of the data related to the markup (such as data related to interpretations and insights of the governance board of the computing system) to be associated with data related to schools of thought regarding performance of the computing system. At step 1610, the method includes providing, by the computing system, an automated surveys system to poll users (such as governance board members) through the markup-governance user interface regarding their positions on possible solutions to address performance issues or bias within the computing system. At step 1612, the method includes aggregating for presentation via a user interface (such as the markup-governance user interface), by the computing system, interactions and adjustments with the markup.

Figure 17:
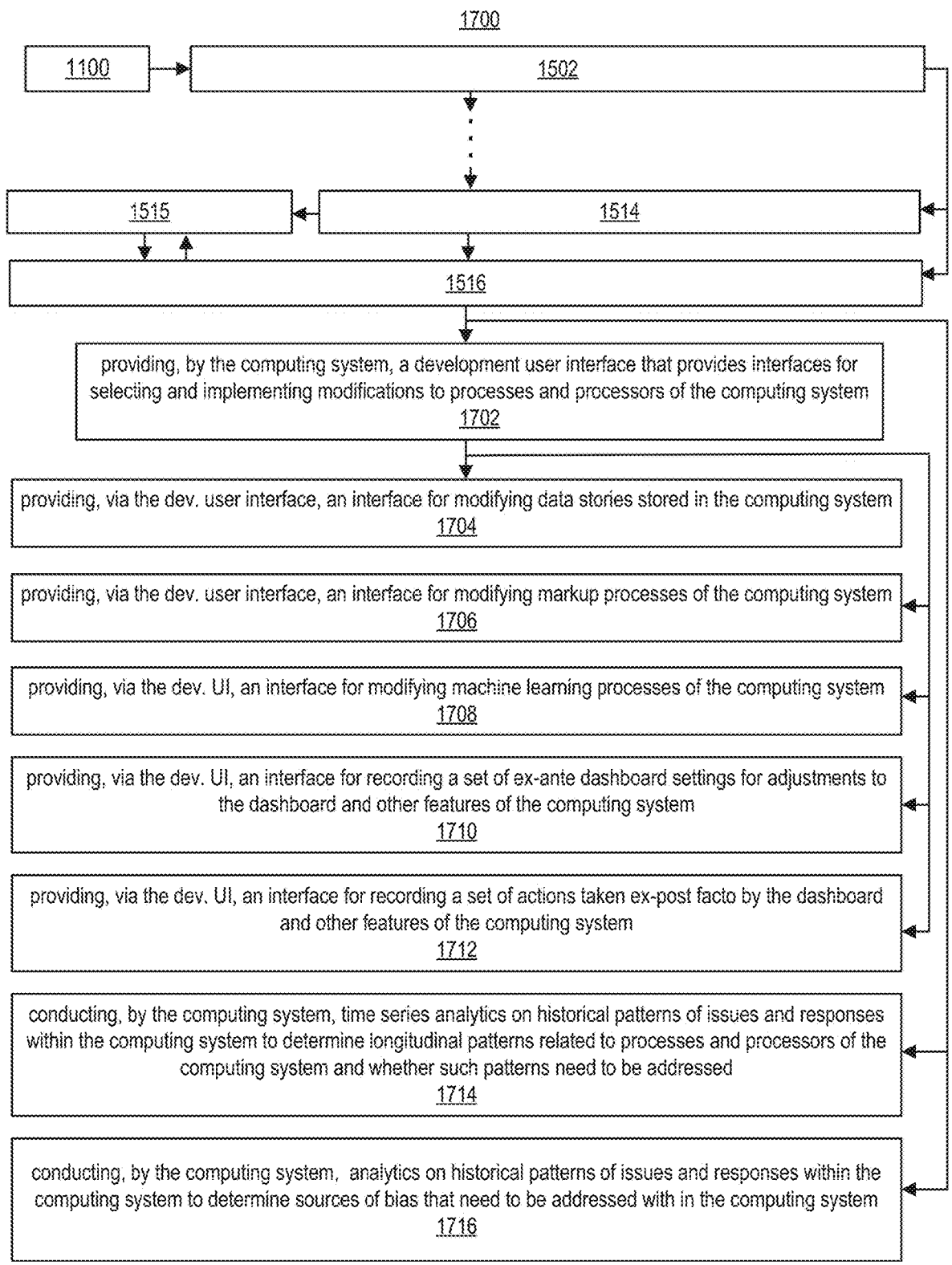

FIG. 17 shows method 1700 for hypergraph governance, implemented by a computing system (such as the computing system 200). In some examples, method 1700 can be combined with any one or more of the methods disclosed herein (such as method 1100, as shown). Also, the method 1700 can include the steps of method 1500. Furthermore, although aspects of method 1700 can be applied to the governance of processing and enhancement of news information, it is to be understood that the technologies disclosed by the method 1700 can also be applied to other applications and implemented for other purposes, such as the governance of processing and enhancement of information associated with big data systems (e.g., social media systems, targeted marketing systems, traffic control systems, automated driving systems, weather prediction and warning systems, financial analysis systems, drug discovery systems, etc.).

Also, the method 1700 includes, at step 1702, providing, by the computing system, a development user interface (which, in some embodiments, is a part of the governance user interface) that provides interfaces for selecting and implementing modifications to processes and processors of the computing system. At step 1704, the method includes providing, via the development user interface, an interface for modifying data stories stored in the computing system. At step 1706, the method includes providing, via the development user interface, an interface for modifying markup processes of the computing system. At step 1708, the method includes providing, via the development user interface, an interface for modifying machine learning processes of the computing system. At step 1710, the method includes providing, via the development user interface, an interface for recording a set of ex-ante dashboard settings for adjustments to the dashboard and other features of the computing system. At step 1712, the method includes providing, via the development user interface, an interface for recording a set of actions taken ex-post facto by the dashboard and other features of the computing system.

At step 1714, the method 1700 includes conducting, by the computing system, time series analytics on historical patterns of issues and responses within the computing system (such as through the dashboard) to determine longitudinal patterns related to processes and processors of the computing system and whether such patterns need to be addressed. In some cases, when a pattern needs to be addressed, the computing system runs longitudinal observations through the dashboard. At step 1716, the method includes conducting, by the computing system, analytics on historical patterns of issues and responses within the computing system (such as through the dashboard) to determine sources of bias that need to be addressed within the computing system. In some cases, when a source of bias needs to be addressed, the computing system runs examples of sources of bias through the dashboard.

Figure 18:
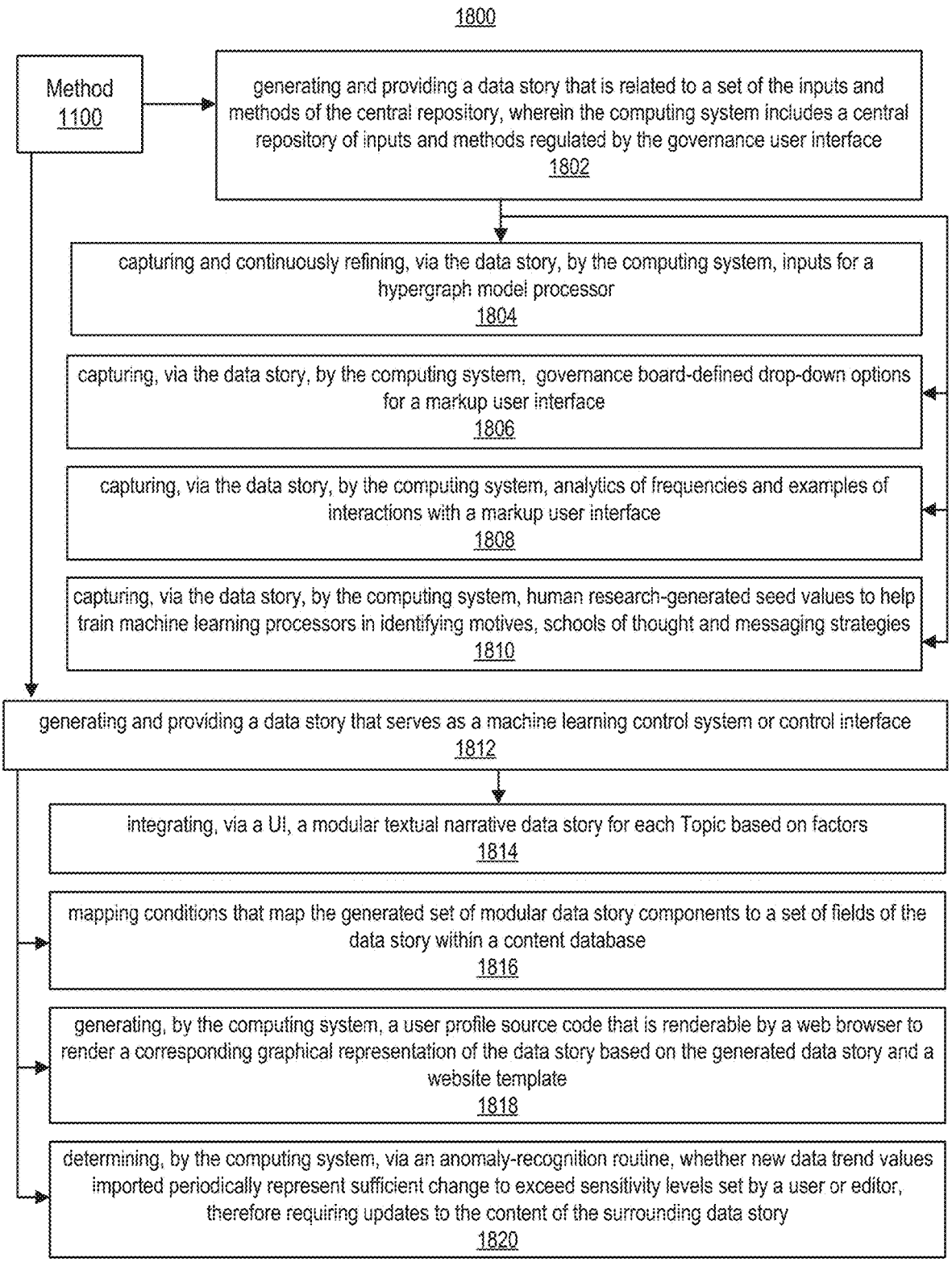

FIG. 18 shows method 1800 for hypergraph governance, implemented by a computing system (such as the computing system 200). In some examples, method 1800 can be combined with any one or more of the methods disclosed herein (such as method 1100, as shown). Also, although aspects of method 1800 can be applied to the governance of processing and enhancement of news information, it is to be understood that the technologies disclosed by the method 1800 can also be applied to other applications and implemented for other purposes, such as the governance of processing and enhancement of information associated with big data systems (e.g., social media systems, targeted marketing systems, traffic control systems, automated driving systems, weather prediction and warning systems, financial analysis systems, drug discovery systems, etc.).

Method 1800 includes, at step 1802, generating and providing a topic data story that transparently documents the inputs and methods of the central repository, wherein the computing system includes a central repository of inputs and methods regulated by the governance user interface. Also, in some examples, the topic data story includes a collection of coverage, entities, data trends, and schools of thought within the topic (which, in some embodiments, are database entries that serve several roles and are stored within the computing system).

The method 1800 also includes, at step 1804, capturing and continuously refining, via the topic data story, by the computing system, inputs for a hypergraph model processor (such as one of the hypergraph model processors disclosed herein). In some examples, the inputs are unique to one or more topic areas. The method also includes, at step 1806, capturing, via the topic data story, by the computing system, governance board-defined drop-down options for a markup user interface (such as any markup user interface disclosed herein). The method also includes, at step 1808, capturing, via the topic data story, by the computing system, analytics of frequencies and examples of interactions with a markup user interface (such as any markup user interface disclosed herein). The method also includes, at step 1810, capturing, via the topic data story, by the computing system, human research-generated seed values to help train machine learning processors in identifying motives, schools of thought and messaging strategies. In some examples, such as examples related to news content processing use cases, output of the capturing of the human research-generated seed values also serves as a hub of topic-centric news coverage in a newsreader user interface of the computing system.

The method 1800 also includes, at step 1812, generating and providing a topic data story that serves as a machine learning control system or control interface. In some examples, input for the machine learning includes manual research and editor identification of seed policies, positions, phrases, and schools of thought in each topic area. In some examples, the method includes using the topic data story, by the computing system, to identify and store key longitudinal historical data trends representing the main variables behind issues in the topic area (not depicted). In some examples, the trends are used in regression analytics as independent and dependent variables paired with analytic trends of news phrase usage and patterns of influence. In some examples, the trends include computing system-generated sets of analytical results from analytical processes. In some examples, the trends include modeling results from modeling processes (such as any modeling processes disclosed herein).

The method 1800 also includes, at step 1814, integrating, via a UI (such as a journalist UI in news content processing use cases), a modular textual narrative data story for each topic based on multiple factors. The method also includes, at step 1816, mapping conditions that map the generated set of modular data story components to a set of fields of the data story within a content database (which can be implemented by a NoSQL database in some embodiments). In some examples, such as examples related to news content processing use cases, the mapping conditions are associated with: Coverage, Topic Overview, Economic and Political Influences, Communications Strategies, SPI Societal Performance Indicators, Data Sources, Schools of Thought, Policy Proposals, or Citizen POVs. The method also includes, at step 1818, generating, by the computing system, a user profile source code that is renderable by a web browser to render a corresponding graphical representation of the data story based on the generated data story and a website template. In some embodiments, the method 1800 can further include providing a process for retrieving anonymous user profile information or generating an anonymous user profile for engaging anonymously with the user interface (e.g., see FIGS. 21 and 28 and related text herein). In such examples, the user profile source code can include anonymous user profile source code.

The method also includes, at step 1820, determining, by the computing system, via an anomaly-recognition routine, whether new data trend values imported periodically represent a sufficient change to exceed sensitivity levels set by a user or editor, therefore requiring updates to the content of the surrounding data story. In some examples, when a sensitivity level is determined to have been exceeded, notations are placed in the relevant sections of the data story, by the computing system, to notify other users that additional information is being integrated (such as to notify readers that new information is being integrated into some news content processing use cases). In some examples, the notations remain until editors update, via a user interface of the computing system, the relevant portions of the data story and select a flag in the database taking responsibility for the data story updates and for removing the notations.

Figure 19:
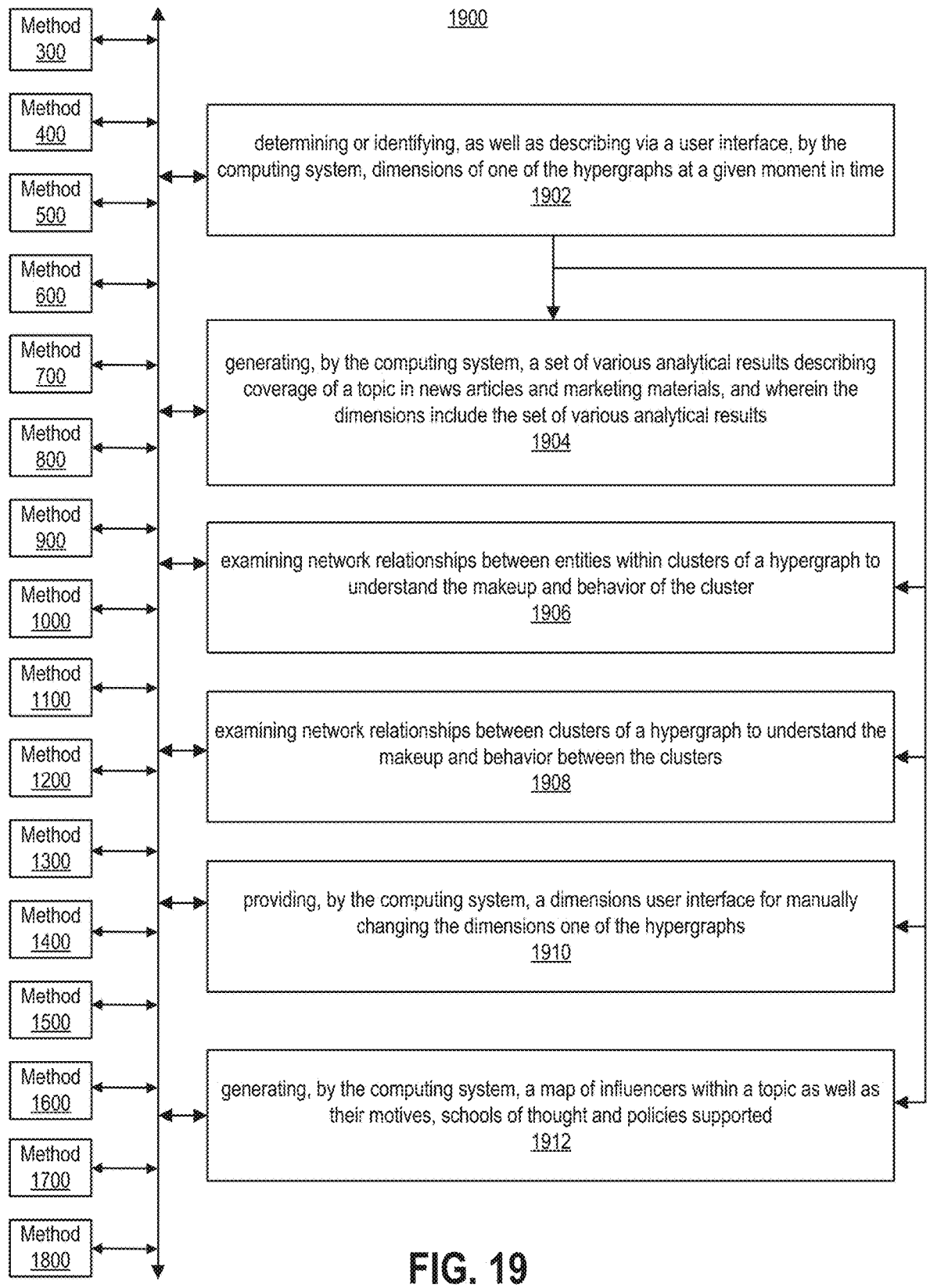

FIG. 19 shows a method 1900 for hypergraph statistical analysis, implemented by a computing system (such as the computing system 200). In some examples, method 1900 can be combined with any one or more of the methods disclosed herein. Also, although aspects of method 1900 can be applied to the hypergraph statistical analysis of news information, it is to be understood that the technologies disclosed by the method 1900 can also be applied to other applications and implemented for other purposes, such as the hypergraph statistical analysis of information associated with big data systems (e.g., social media systems, targeted marketing systems, traffic control systems, automated driving systems, weather prediction and warning systems, financial analysis systems, drug discovery systems, etc.).

Method 1900 includes, at step 1902, determining or identifying, as well as describing via a user interface, by the computing system, dimensions of one of the hypergraphs at a given moment in time. In some examples, the dimensions include quantifications of influencers (such as stack-ranked Influencers in a topic area). In some examples, the dimensions include a strength or an evolution of influence of influencers, in general, and over different individuals, specifically. In some embodiments, the method 1900 can further include providing a process for retrieving anonymous user profile information or generating an anonymous user profile for engaging anonymously with the user interface (e.g., see FIGS. 21 and 28 and related text herein). In some examples of the method 1900 and other methods disclosed herein, analytic methods are applied, by the computing system, to content and extracted elements of content (entities, events, places, etc.) provided by the method 300, and at least some of the output of the analytic methods are included in the dimensions. In some examples, the content and extracted elements of content are mentioned in multiple topic areas of news coverage, independent of user interaction with the content stored in the computing system.

Also, method 1900 includes, at step 1904, generating, by the computing system, a set of various analytical results (such as a set of various analytical results describing coverage of a topic in news articles and marketing materials), and the dimensions include sets of various groups of inputs and the derived analytical results. In some examples, the dimensions include statistics describing influencers whose messaging is influential in a given topic area. In some examples, the dimensions include statistics describing a distribution of articles on the given topic area across publishers and the relative influence of the articles. In some examples, the dimensions include statistics describing policies in the given topic area and distributions of influencers and individuals for and against each policy.

Also, method 1900 includes, at step 1906, examining network relationships between entities within clusters of a hypergraph to understand the makeup and behavior of the cluster, as well as, at step 1908, examining network relationships between clusters of a hypergraph to understand the makeup and behavior between the clusters.

Also, concerning three user interfaces disclosed herein, method 1900 includes, at step 1910, providing, by the computing system, a dimensions user interface for manually changing the dimensions of one of the hypergraphs. In some examples, the dimensions user interface includes or is linked to a data stories governance user interface or a data stories input/output interface. The dimensions user interface includes or is linked to a machine learning governance user interface or a machine learning input/output interface. For instance, in some embodiments, the machine learning governance user interface or the machine learning input/output interface includes or is a part of the data stories governance user interface or the data stories input/output interface, respectively. In some examples, one of the governance user interfaces of or linked to the dimensions user interface is configured to permit fine-tuning of a cycle of operations to create and operate a hypergraph by refining weightings of edges and threshold criteria definitions of nodes in the hypergraph. In some examples, one of the governance user interfaces of or linked to the dimensions user interface is configured to permit calibration of a hypergraph modeling engine or models derived from the hypergraph modeling engine.

In some examples, the language models derived from the hypergraph modeling engine are derived in part from seed phrases, schools of thought, or policies within the topic area as researched and entered by user-editors. In some examples, one of the governance user interfaces of or linked to the dimensions user interface is configured to provide a topic context portion of a citizen's overall context. A citizen's topic context is measured as the intersection of their personal context variables within the citizen hypergraph, and the topic news variables as represented within the news hypergraph. In this view, other people's positions are measured as network distances from the citizen's position in the overall context hypergraph.

Furthermore, concerning the three user interfaces disclosed herein, method 1900 includes, at step 1912, generating, by the computing system, a map of influencers within a topic as well as their motives, schools of thought, and policies supported. And, in some embodiments, one of the governance user interfaces of or linked to the dimensions user interface is configured to provide the map of influencers within a topic as well as their motives, schools of thought, and policies supported.

In some examples, such as examples related to news content processing, the dimensions user interface includes or is linked to a citizen user interface, and the citizen user interface includes or is a part of or is linked to a multi-publisher newsreader. In some examples, the dimensions user interface includes or is linked to a surveys user interface, and the surveys user interface includes or is a part of or is linked to a multi-publisher newsreader.

In some examples, such as examples related to news content processing, the citizen user interface or the surveys user interface is configured to permit individuals (such as citizens) to rate their weighting of the importance of different schools of thought and policies supported (such as within a topic context). In some examples, the citizen user interface or the surveys user interface is configured to permit individuals to indicate their positions on policies, and the schools of thought to which they subscribe (such as within a personal context). In some examples, the citizen user interface or the surveys user interface is configured to permit individuals to indicate influencers most influential in their opinion (such as within an influence context).

In some examples, the dimensions user interface includes or is linked to a markup and editorial governance user interface. In some examples, the markup and editorial governance user interface is configured to permit editor-users to markup and edit survey elements such as questions and answer options and to select variables with which to target the surveys to specific user-members or groups of user-members. In some examples, the markup and editorial governance user interface is configured to permit machine learning trainers or users to markup and edit hypergraph elements such as nodes and edges and parameters of the nodes and edges (such as markup and edit definitions of nodes and edges within the computing system). In some examples, such as examples related to news content processing, the markup and editorial governance user interface is configured to permit marking up and editing of hypergraph elements including articles and their component phrases and entities. In some examples, the markup and editorial governance user interface is configured to permit marking up and editing of hypergraph elements including databases (such as NoSQL databases) and their component extractions and enhancements. In some examples, the markup and editorial governance user interface is configured to permit marking up and editing of hypergraph elements including seed phrases for schools of thought, motives, and communications strategies. In some examples, such as examples related to news content processing, the markup and editorial governance user interface is configured to permit marking up and editing of hypergraph elements including linking between articles, phrases, metadata, and extractions. In some examples, the markup and editorial governance user interface is configured to permit the marking up and editing of hypergraph elements including a way to normalize data sources when the data sources present conflicting values or formats for a variable.

Figure 21:
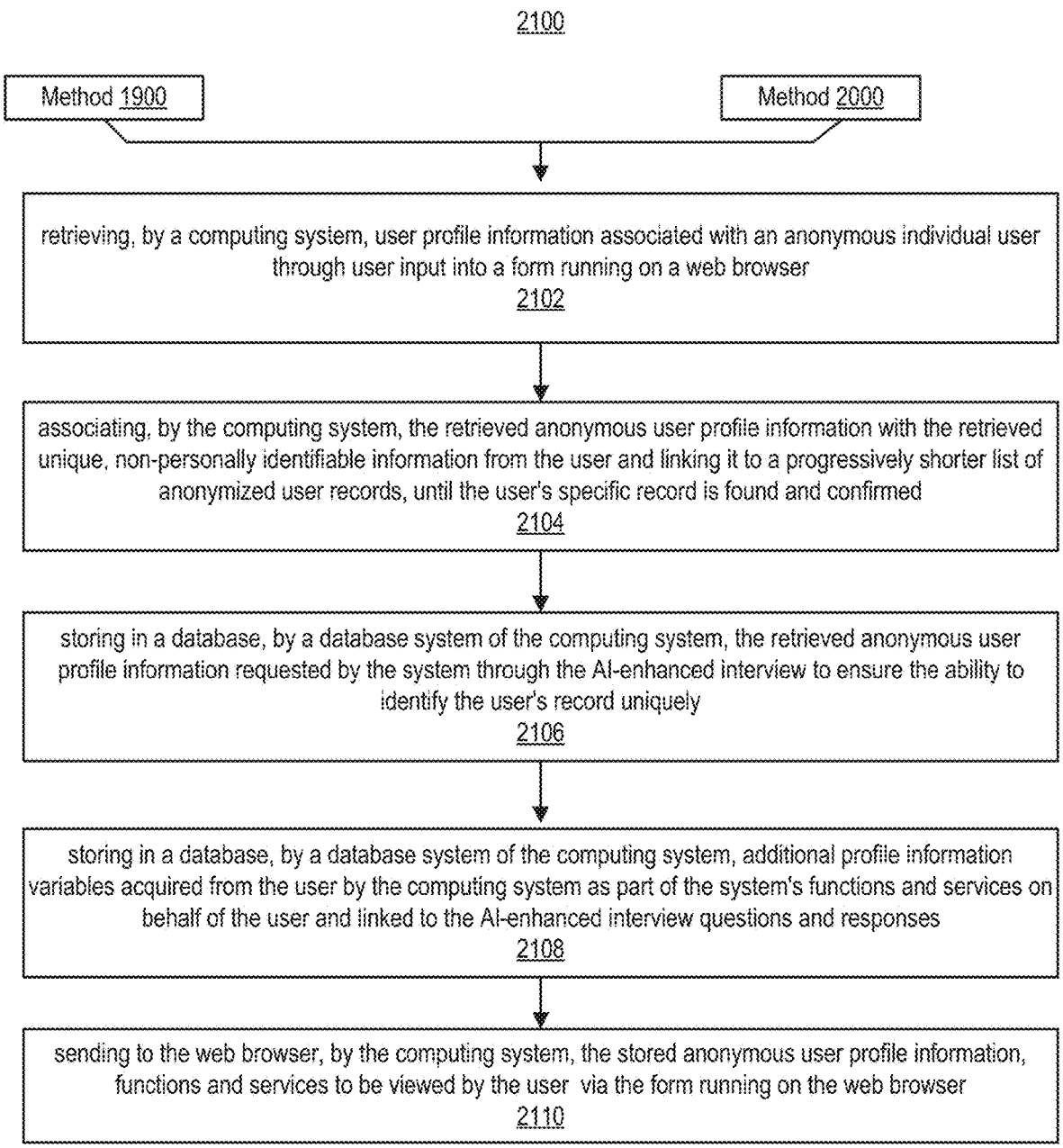
Figure 28:
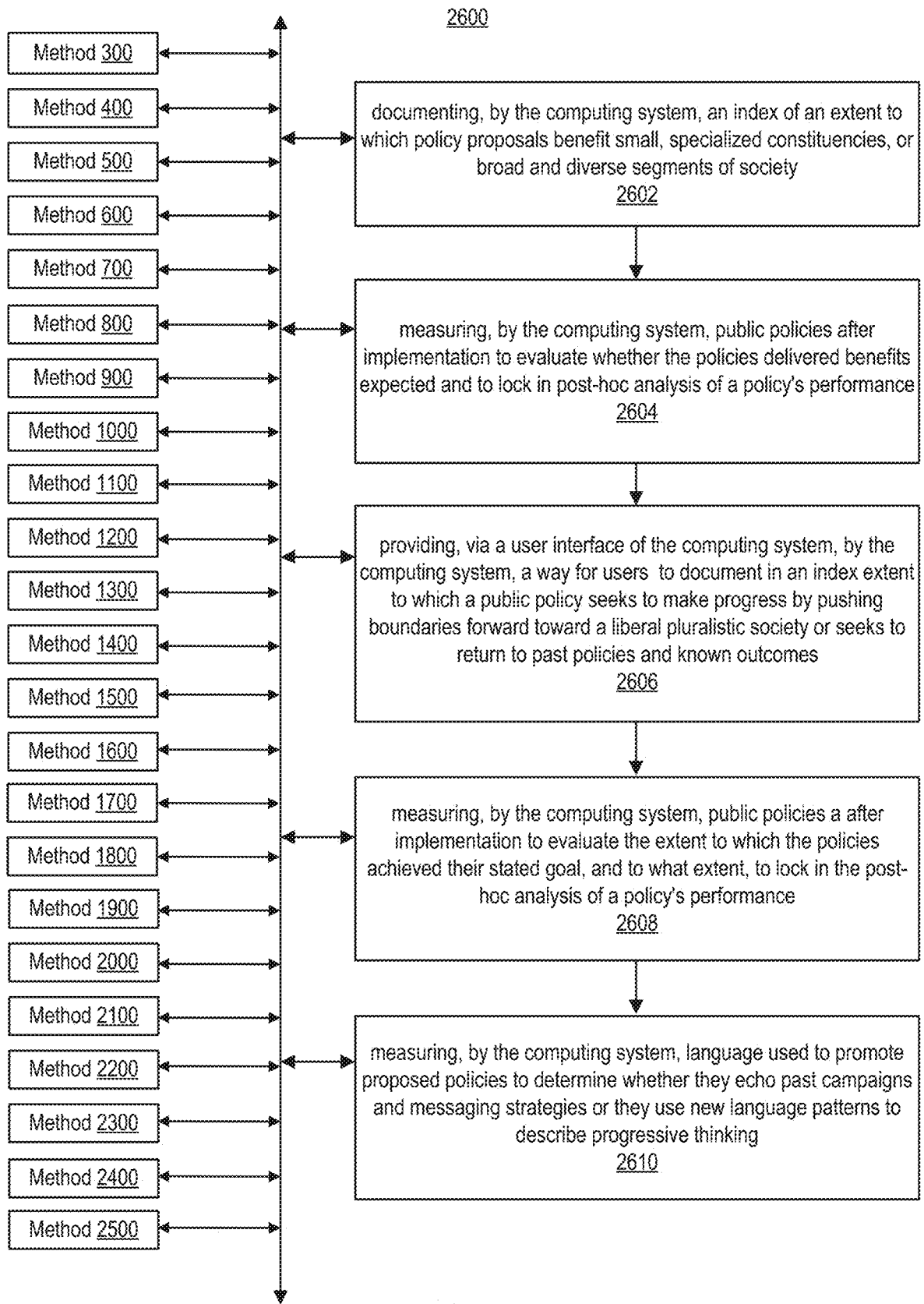

In some embodiments, a process for retrieving anonymous user profile information or generating an anonymous user profile can be provided for engaging anonymously with any one of the aforementioned user interfaces (e.g., see FIGS. 21 and 28 and related text herein).

Figure 20:
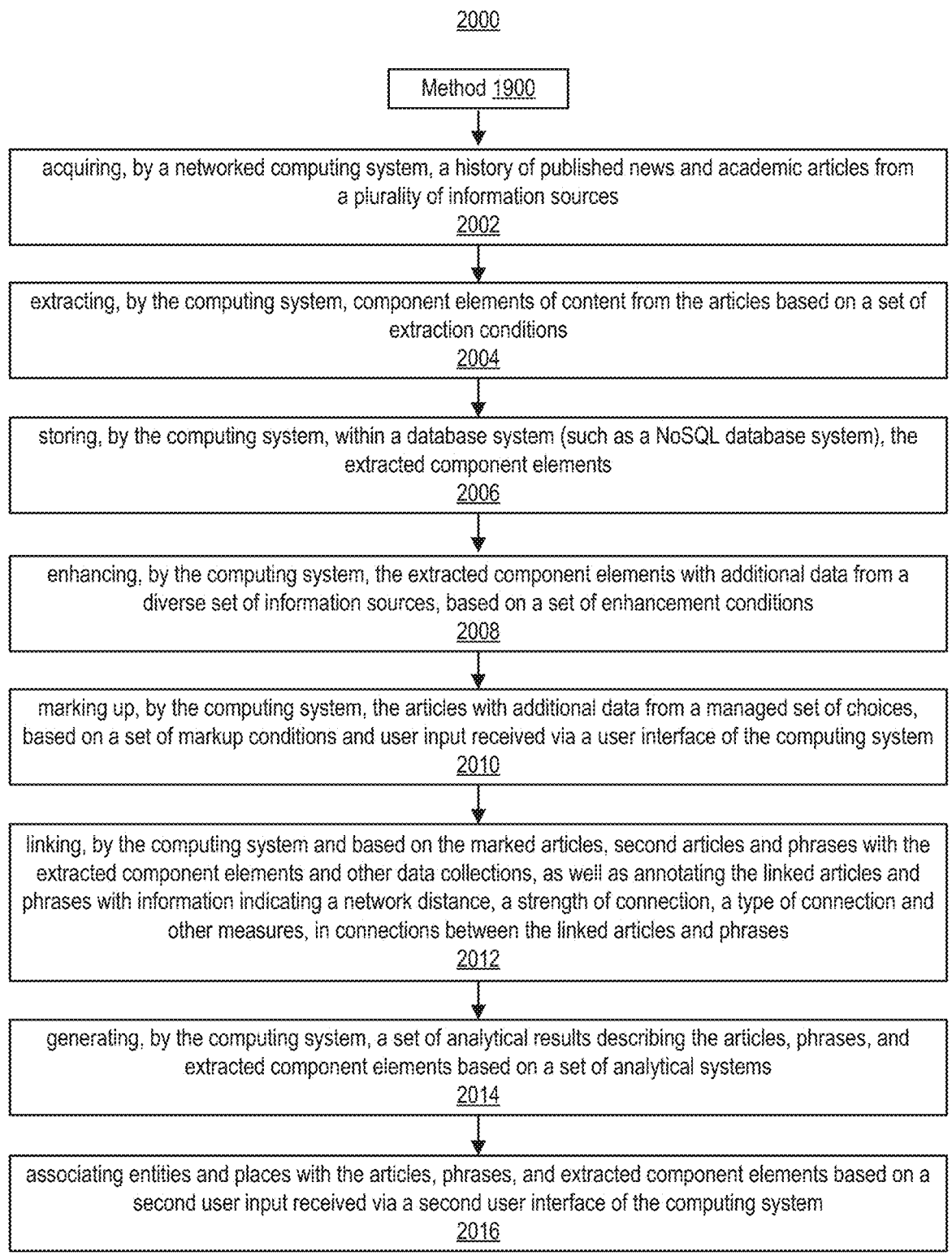

FIG. 20 shows method 2000 for news topic content processing, implemented by a computing system (such as the computing system 200). In some examples, method 2000 can be combined with any one or more of the methods disclosed herein (such as method 1900, as shown). Also, although aspects of method 2000 relate to the processing and enhancement of news information, it is to be understood that the technologies disclosed by the method 2000 can also be applied to other applications and implemented for other purposes, such as applications related to big data (e.g., applications for social media systems, targeted marketing systems, traffic control systems, automated driving systems, weather prediction and warning systems, financial analysis systems, drug discovery systems, etc.).

Method 2000 includes, at step 2002, acquiring, by a networked computing system, a history (such as a nearly complete history) of published news and academic articles from a plurality of information sources. In some cases, the computing system includes a least one server-side computing device. At step 2004, the method includes extracting, by the computing system, component elements of content from the articles based on a set of extraction conditions. At step 2006, the method includes storing, by the computing system, within a database system (such as a NoSQL database system), the extracted component elements. At step 2008, the method includes enhancing, by the computing system, the extracted component elements with additional data from a diverse set of information sources, based on a set of enhancement conditions. At step 2010, the method includes marking up, by the computing system, the articles with additional data from a managed set of choices, based on a set of markup conditions and user input received via a user interface of the computing system. In some embodiments, the method 2000 can further include providing a process for retrieving anonymous user profile information or generating an anonymous user profile for engaging anonymously with the user interface (e.g., see FIGS. 21 and 28 and related text herein).

At step 2012, the method 2000 includes linking, by the computing system and based on the marked articles, second articles and phrases with the extracted component elements and other data collections, as well as annotating the linked articles and phrases with information indicating a network distance, a strength of connection, a type of connection and other measures, in connections between the linked articles and phrases. At step 2014, the method includes generating, by the computing system, a set of analytical results describing the articles, phrases, and extracted component elements based on a set of analytical systems. In some examples, at step 2016, the method includes associating entities, e.g., individuals, groups, organizations (such as companies, non-profits, organized political bodies), places (such as states, countries, cities, etc.), with the articles, phrases, and extracted component elements based on second user input received via a second user interface of the computing system.

In some examples, for entities, where they are people, their influence is based on their career path and level, their media and social media exposure and sentiment, and a model for the proportion of national GDP for which they are accountable. In some examples, for entities, their motives are based on gender, race, family structure, employment industry, career path, investments, family, and political beliefs and are inputs to the second model processor calculating the entity's motives, and presenting them in the citizen newsreader interface. In some examples, for entities, their positions on policies are based on direct entry via surveys when the user is a member, via NLP methods for newsmaker entities based on interpretation of the sentiment of their statements about the policy (instead of a direct statement), and are a part of the citizen hypergraph and presented in the citizen newsreader interface.

In some examples, for entities, the schools of thought to which they subscribe are based on direct entry via surveys when the user is a member, and statistical correlation of their phrases with the phrase cluster linked to that school of thought in the news hypergraph, and are a part of the citizen hypergraph and presented in the citizen newsreader interface. In some examples, for entities, their policies, their we-me and conservative-progressive landscape or positioning is based on two axes describing each topic space, which are managed by editor-users who calibrate the relative positioning of policy proposals in each of the two dimensions (e.g., policies which push the envelope in changing the status quo are to the progressive right of the horizontal conservative-progressive scale, and policies which move the country toward a more equitable distribution of society's assets are upward toward a we-centric society on the vertical we-me axis). The aforesaid matrix forms the intersection of real-world policies and the context hypergraph (which is a merger of the news and citizen hypergraphs)—which is used by the editor-users to control the spatial positionings of the multi-dimensional context hypergraph's tangible dimension. In some examples, for events, the second input associated with events is related to the second input regarding their sponsors, participants, and attendees.

FIG. 21 shows a method 2100 for anonymized engagement, implemented by a computing system (such as the computing system 200). In some examples, method 2100 can be combined with any one or more of the methods disclosed herein (such as method 1900 or method 2000, as shown). Also, although aspects of method 2100 can be applied to the anonymized engagement with news information, it is to be understood that the technologies disclosed by the method 2100 can also be applied to other applications and implemented for other purposes, such as the anonymized engagement with information associated with information systems in general and big data systems (e.g., social media systems, targeted marketing systems, traffic control systems, automated driving systems, weather prediction and warning systems, financial analysis systems, drug discovery systems, etc.).

Method 2100 includes, at step 2102, retrieving, by a computing system (such as the computing system 200), user profile information associated with an anonymous individual user through user input into a form running on a web browser. The form can be provided by the computing system prior to initial retrieval of the anonymous user profile information, and the user input is received via an artificial intelligence enhanced query narrowing interview provided by the form in which the query ultimately locates the user's anonymized record without ever requiring a username, password or personally identifiable information. In some cases, the linkage of the user to their anonymized record is accomplished without use of cookies, machine or browser identification numbers, or any other artifact which could link the anonymized record to a specific individual's identity, though a user's browser or the website may use cookies for other purposes, like maintaining a session.

At step 2104, the method 2100 includes associating, by the computing system, the retrieved anonymous user profile information with the retrieved unique, non-personally identifiable information from the user and linking it to a progressively shorter list of anonymized user records, until the user's specific record is found and confirmed. At step 2106, the method includes storing in a database, by a database system of the computing system, the retrieved anonymous user profile information requested by the system through the AI-enhanced interview to ensure the ability to identify the user's record uniquely.

At step 2108, the method 2100 includes storing in a database, by a database system of the computing system, additional profile information variables acquired from the user by the computing system as part of the system's functions and services on behalf of the user and linked to the AI-enhanced interview questions and responses. In some cases, the computing system cannot uniquely identify the user via the AI-enhanced interview questions and responses (for example, because another user has created matching responses to the AI-enhanced interview questions). In such cases, the computing system can additionally employ the other profile information related to providing the application's functions and services to complete the identification of the individual user. And, in some cases, the computing system cannot uniquely identify the user, so the system can offer the user unclaimed records; generic to the user's geography, demographics, and other variables from which the user can select the closest fit to their specific profile and claim the record as their own for future interactions with the system.

At step 2110, the method 2100 includes sending to the web browser, by the computing system, the stored anonymous user profile information, functions and services to be viewed by the user via the form running on the web browser. In some cases, the database is a NoSQL database. In some cases, the web browser is generated by the computing system. In some cases, the web browser is a customized application built for the computing system exclusively. In some cases, in response to an initial use of the web browser, the computing system associates the anonymous user profile information with an installation of the browser in a client computing device, with the prior approval of the user. In some cases, the unique identification of the web browser includes an installation identification related to the installation of the browser. In some cases, no username or password is required to retrieve or generate the unique identification of the cookieless web browser (and in some embodiments, no Personally-Identifiable Information (PII) is retrieved or handled by the computing system). In some cases, the web browser is a common web browser running normally, or in an anonymous mode prohibiting use of cookies. In some cases, the form includes user profile fields that request no Personally-Identifiable Information (PII) from the user, and which are, on first use, filled in with approximated entries based on information available to the browser such as the IP address of the Internet connection and the browser itself and embedded cookies if such information exists upon use of the form. In some cases, the user profile fields include a zip code field that can look up a zip code of the location of the browser via an IP address retrieved by the form.

In some cases, the user profile fields include additional fields, such as demographic fields, which are updated according to the retrieved IP address. In some cases, the additional fields include an income field that is updated with the average income of a zip code according to the retrieved IP address and marital tax status of the user, which can be entered into the form anonymously. In some cases, the form includes user profile fields that maintain anonymity of the user and are filled in, automatically, with approximated entries based on information available to the form.

In some cases, the form is configured to permit manual user input to change data within the fields, including fields that were automatically populated by the computing system or the browser. In some cases, the computing system increases its confidence in the anonymous user profile information of the anonymous user being a particular individual as more fields in the form are filled in by the anonymous user. In some cases, an amount of automation used to fill in the form, by the computing system or the browser, is based on the confidence in the anonymous user profile information.

In some cases, the computing system, via the browser, presents information in survey question fields to confirm a user's identity, and where fields or graphics are provided with the survey questions configured to permit a user to verify the accuracy of data within the fields. In some cases, if it is a first-time user of the browser, the unique identification can be associated with a new anonymized user profile upon the user's request. In some cases, for existing users of the browser and the system, if a progression of gathering profile information leads to the system not being able to match user input with a stored anonymized user profile, then the browser provides an option for the user to adopt a new anonymized user profile.

In some cases, the browser provides an option for the user to create a second anonymized user profile, and more than one anonymized user profile can be associated with an actual individual so that the user can receive the functions and services from the context of that or those other profiles. In some cases, the computing system provides an option for the user to create a username and password associated with their anonymized record to take advantage of faster login methods, like traditional login or facial and other biometric identification.

Figure 22:
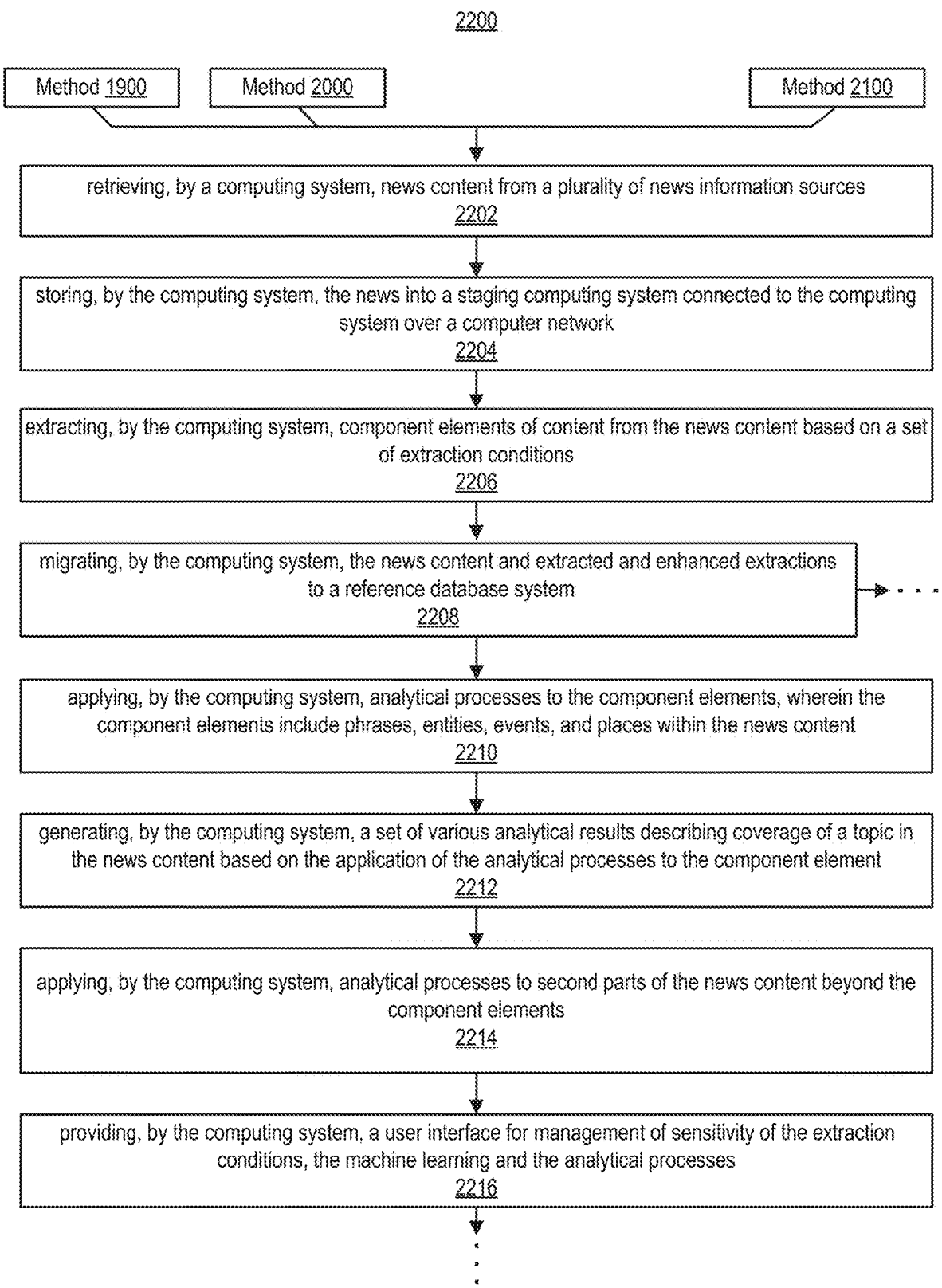
Figure 23:
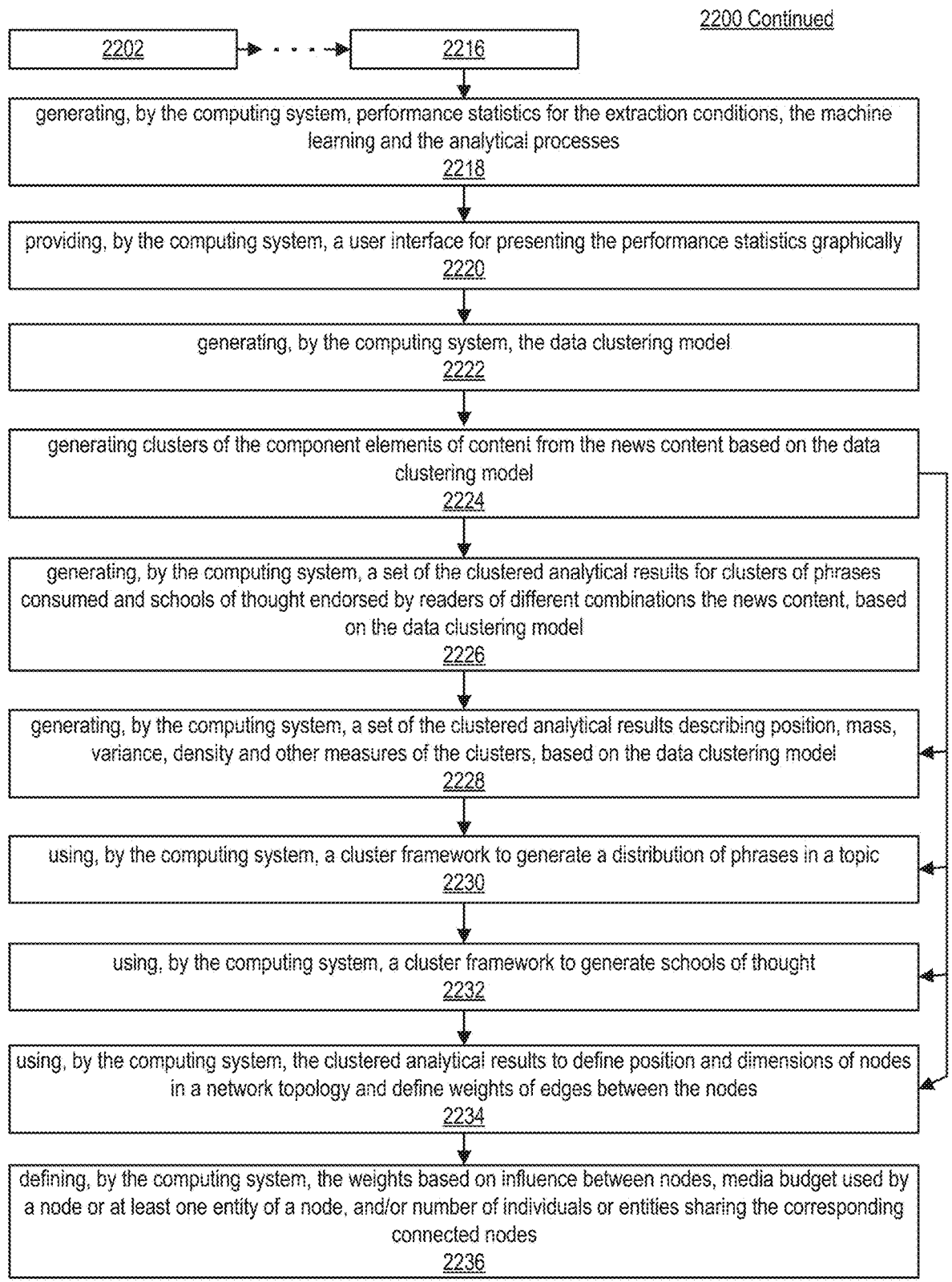
Figure 24:
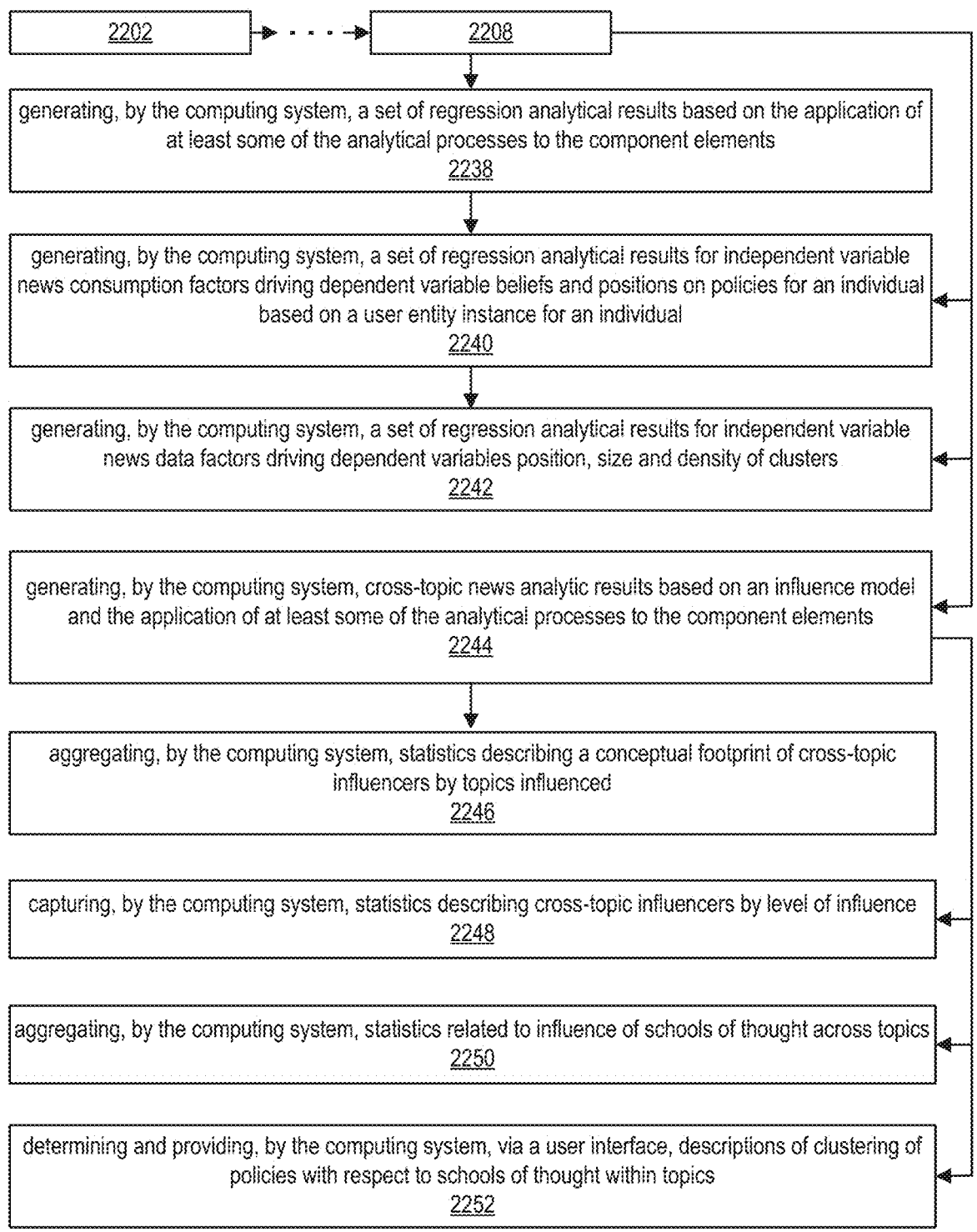

FIGS. 22, 23, and 24 show a method 2200 for news topic statistical analytics, machine learning, cluster analytics, network topology analytics, news regression analytics, and cross-topic analytics, implemented by a computing system (such as the computing system 200). In some examples, method 2200 can be combined with any one or more of the methods disclosed herein (such as method 1900, 2000, or 2100, as shown). Also, although aspects of method 2200 relate to the processing and enhancement of news information, it is to be understood that the technologies disclosed by the method 2200 can also be applied to other applications and implemented for other purposes, such as applications related to big data (e.g., applications for social media systems, targeted marketing systems, traffic control systems, automated driving systems, weather prediction and warning systems, financial analysis systems, drug discovery systems, etc.).

Method 2200 includes, at step 2202, retrieving, by a computing system (such as the computing system 200), news content from a plurality of news information sources. In some cases, the computing system includes a least one server-side computing device.

At step 2204, the method 2200 includes storing, by the computing system, the news into a staging computing system connected to the computing system over a computer network. At step 2206, the method includes extracting, by the computing system, component elements of content from the news content based on a set of extraction conditions. At step 2208, the method includes migrating, by the computing system, the news content and extracted and enhanced extractions to a reference database system. At step 2210, the method includes applying, by the computing system, analytical processes to the component elements. In some cases, the component elements include phrases, entities, events, and places within the news content.

The method 2200 also includes, at step 2212, generating, by the computing system, a set of various analytical results describing coverage of a topic in the news content based on the application of the analytical processes to the component elements (and in some examples, it is based on machine learning as well and the component elements are used as input for the machine learning). In some examples, the machine learning includes natural language processing. In some examples, the natural language processing is applied to the component elements or other parts of the news content to classify articles according to multiple taxonomies. In some examples, the multiple taxonomies include taxonomies of the Interactive Advertising Bureau (IAB) or the International Press Telecommunications Council (IPTC). In some examples, the multiple taxonomies include taxonomies derived from the North American Industry Classification System (NAICS) or the International Press Telecommunications Council (IPTC) by the computing system via a data structure (such as a lookup table).

In some examples, parts of the news content include article metadata. In some examples, the generating of the set of various analytical results includes further generating such results based on an influence model. In some examples, a corresponding part of the influence model is generated, by the computing system, based on a set of analytical results estimating a dollar-equivalent media budget to achieve a known communication strategy's impact on the topic in the news content. In some examples, a corresponding part of the influence model is generated, by the computing system, based on a set of analytical results describing influencers whose messaging is influential in the topic. In some examples, the generating of the set of various analytical results includes generating such results based on statistics describing public policies on the topic. In some examples, the generating of the set of various analytical results further includes generating such results based on distributions of influencers for and against each public policy in the topic.

At step 2214, the method 2200 includes applying, by the computing system, analytical processes to second parts of the news content beyond the component elements. In some examples, the component elements and the second parts of the news content are independent of user interaction with the content through the system. In some examples, the computing system organizes the component elements and the second parts of the news content in a database independent of user interaction with the content through the system. In some examples, the extracting of the component elements of content from the news content is further based on machine learning. In some examples, the machine learning includes natural language processing. In some examples, output of the machine learning, including the component elements of content from the news content, is used as input, by the computing system, to enhance a database system of the computing system. In some examples, output of the machine learning, including the component elements of content from the news content, is used as input, by the computing system, to interlink articles, extractions, and news data in network topologies. In some examples, the network topologies include at least one hypergraph.

At step 2216, the method 2200 includes providing, by the computing system, a user interface for management of sensitivity of the extraction conditions, the machine learning, and the analytical processes. In some embodiments, the method 2200 can further include providing a process for retrieving anonymous user profile information or generating an anonymous user profile for engaging anonymously with the user interface (e.g., see FIGS. 21 and 28 and related text herein).

At step 2218, the method 2200 includes generating, by the computing system, performance statistics for the extraction conditions, the machine learning, and the analytical processes. At step 2220, the method includes providing, by the computing system, a user interface for presenting the performance statistics graphically. In some cases, the generating of the set of various analytical results includes further generating at least part of the results as clustered analytical results based on a data clustering model.

At step 2222, the method 2200 includes generating, by the computing system, the data clustering model. At step 2224, the method 2200 includes generating clusters of the component elements of content from the news content based on the data clustering model. At step 2226, the method 2200 includes generating, by the computing system, a set of the clustered analytical results for clusters of phrases consumed and schools of thought endorsed by readers of different combinations of the news content, based on the data clustering model. In some cases, a computerized echo chamber index is calculated based on the news, marketing and social media content, and phrases consumed.

At step 2228, the method 2200 includes generating, by the computing system, a set of the clustered analytical results describing position, mass, variance, density, and other measures of the clusters, based on the data clustering model. In some cases, clusters exist in a statistical relativistic space (such as with belief groupings or with public policy groupings). In some cases, clusters exist in structured spaces (such as a computerized x/y we-me and conservative-progressive landscape).

At step 2230, the method 2200 includes using, by the computing system, a cluster framework to generate a distribution of phrases in a topic. At step 2232, the method 2200 includes using, by the computing system, a cluster framework to generate schools of thought (in some embodiments according to the distribution of phrases as well). In some cases, the schools of thought are refined by the clustered analytical results. In some cases, the distribution of phrases and the schools of thought are variables examined by regression analytics.

At step 2234, the method 2200 includes using, by the computing system, the clustered analytical results to define position and dimensions of nodes in a network topology and define weights of edges between the nodes.

At step 2236, the method 2200 includes defining the weights based on influences between nodes, a media budget used by a node, or at least one entity of a node, or a number of individuals or entities sharing the corresponding connected nodes. In some cases, the computing system uses regression analytics to interpret variables affecting the clustered analytical results, definitions of the clusters, or relative positions of the clusters (such as wherein the positions are within a multi-dimensional space). In some cases, the computing system examines network relationships between entities within clusters to understand a makeup and a behavior of a cluster. In some cases, the computing system includes a user interface to zoom into clusters within a network topology to view the topology within a cluster. In some cases, the user interface provides fields for showing, within the network topology, influence, common phrases and schools of thought, motives, etc., and relationships thereof to articles and the contents of the articles.

At step 2238, the method 2200 includes generating, by the computing system, a set of regression analytical results (such as for the independent variable news data factors driving dependent variable behavioral outcomes for individuals based on a user entity instance for an individual) based on the application of at least some of the analytical processes to the component elements. At step 2240, the method includes generating, by the computing system, a set of regression analytical results for independent variable news consumption factors driving dependent variable beliefs and positions on policies for an individual based on a user entity instance for an individual. At step 2242, the method includes generating, by the computing system, a set of regression analytical results for independent variable news data factors driving dependent variables' positions, sizes, and densities of clusters. At step 2244, the method includes generating, by the computing system, cross-topic news analytic results based on an influence model (e.g., see the economic influence sub-model or the belief influence sub-model disclosed herein) and the application of at least some of the analytical processes to the component elements. In some cases, the generated results include an analysis of entities and publishers with influence across topics and topic areas.

At step 2246, the method 2200 includes aggregating, by the computing system, statistics describing a conceptual footprint of cross-topic influencers by topics influenced. At step 2248, the method includes capturing, by the computing system, statistics describing cross-topic influencers by level of influence. At step 2250, the method 2200 includes aggregating, by the computing system, statistics related to influence of schools of thought across topics. At step 2252, the method 2200 includes determining and providing, by the computing system, via a user interface, descriptions of clustering of policies for schools of thought within topics.

FIG. 25 shows a method 2300 for data stories to govern the analytics and machine learning, implemented by a computing system (such as the computing system 200). In some examples, method 2300 can be combined with any one or more of the methods disclosed herein (such as method 1800, as shown). Also, although aspects of method 2300 can be for data stories to govern the analytics and machine learning associated, with news information, it is to be understood that the technologies disclosed by the method 2300 can also be applied to other applications and implemented for other purposes, such as for data stories to govern the analytics and machine learning associated with big data systems (e.g., social media systems, targeted marketing systems, traffic control systems, automated driving systems, weather prediction and warning systems, financial analysis systems, drug discovery systems, etc.).

Method 2300 includes, at step 2302, providing, by the computing system, a user interface for integrating, by a user (such as a journalist in some news content processing use cases), a modular and textual narrative data story for each topic based on (1) manual research and identification of seed policies, positions, phrases and schools of thought (wherein such information can be used for input into machine learning processes and models), (2) any one or more of the analytics disclosed herein (such the analytics disclosed herein), and (3) results of modeling (such as the results of modeling disclosed herein). In some cases, the data story (e.g., described in method 1800) is viewable through a user interface of the computing system and is configured to be used by the computing system to manage inputs and data views to govern machine learning systems of the computing system as well as calibrate the machine learning systems. In some embodiments, the method 2300 can further include providing a process for retrieving anonymous user profile information or generating an anonymous user profile for engaging anonymously with the user interface (e.g., see FIGS. 21 and 28 and related text herein).

In some cases, the data story describes a topic context portion of an individual's overall context for entities, messaging strategies, data references, and influences. At step 2304, the method 2300 includes generating, by the computing system, mapping conditions that map generated sets of modular components for the data story to a set of fields of the data story within a content database. At step 2306, the method includes generating, by the computing system, a user profile source code that is renderable by a web browser to render a corresponding graphical representation of the data story based on the data story and the mapping conditions. In some cases, the generation of the user profile source code is further based on a webpage template.

Figure 26:
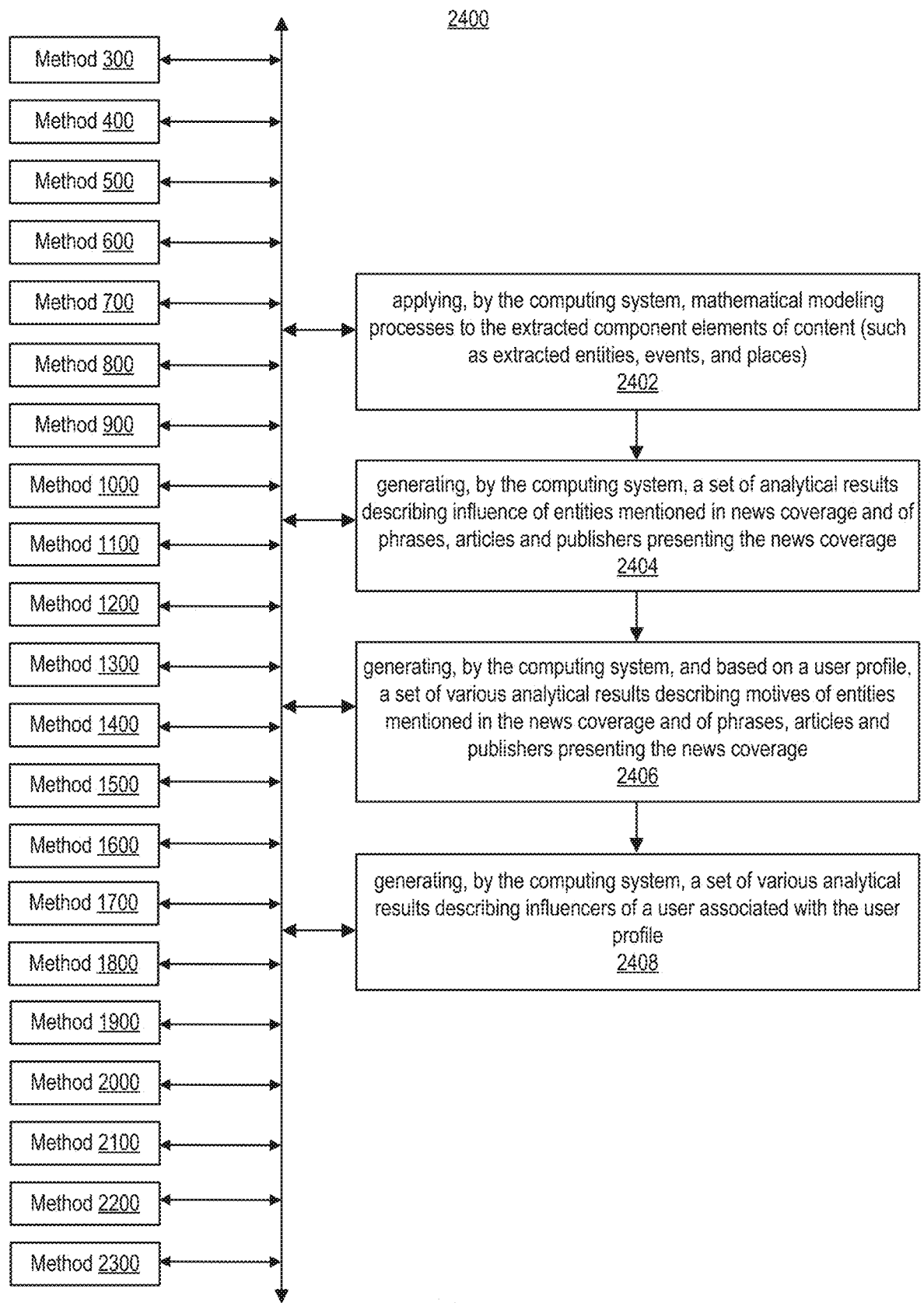

FIG. 26 shows a method 2400 for modeling influence, motive and media value, implemented by a computing system (such as the computing system 200). In some examples, method 2400 can be combined with any one or more of the methods disclosed herein (such as method 300 to method 2300, as shown). Also, although aspects of method 2400 relate to the processing and enhancement of news information, it is to be understood that the technologies disclosed by the method 2400 can also be applied to other applications and implemented for other purposes, such as applications related to big data (e.g., applications for social media systems, targeted marketing systems, traffic control systems, automated driving systems, weather prediction and warning systems, financial analysis systems, drug discovery systems, etc.).

Method 2400 includes, at step 2402, applying, by the computing system, mathematical modeling processes to the extracted component elements of content (such as extracted entities, events, and places). At step 2404, the method includes generating, by the computing system, a set of analytical results describing the influence of entities mentioned in news coverage and of phrases, articles, and publishers presenting the news coverage. At step 2406, the method includes generating, by the computing system and based on a user profile, a set of various analytical results describing motives of entities mentioned in the news coverage and of phrases, articles, and publishers presenting the news coverage. And, at step 2408, the method includes generating, by the computing system, a set of various analytical results describing influencers of a user associated with the user profile.

Figure 27:
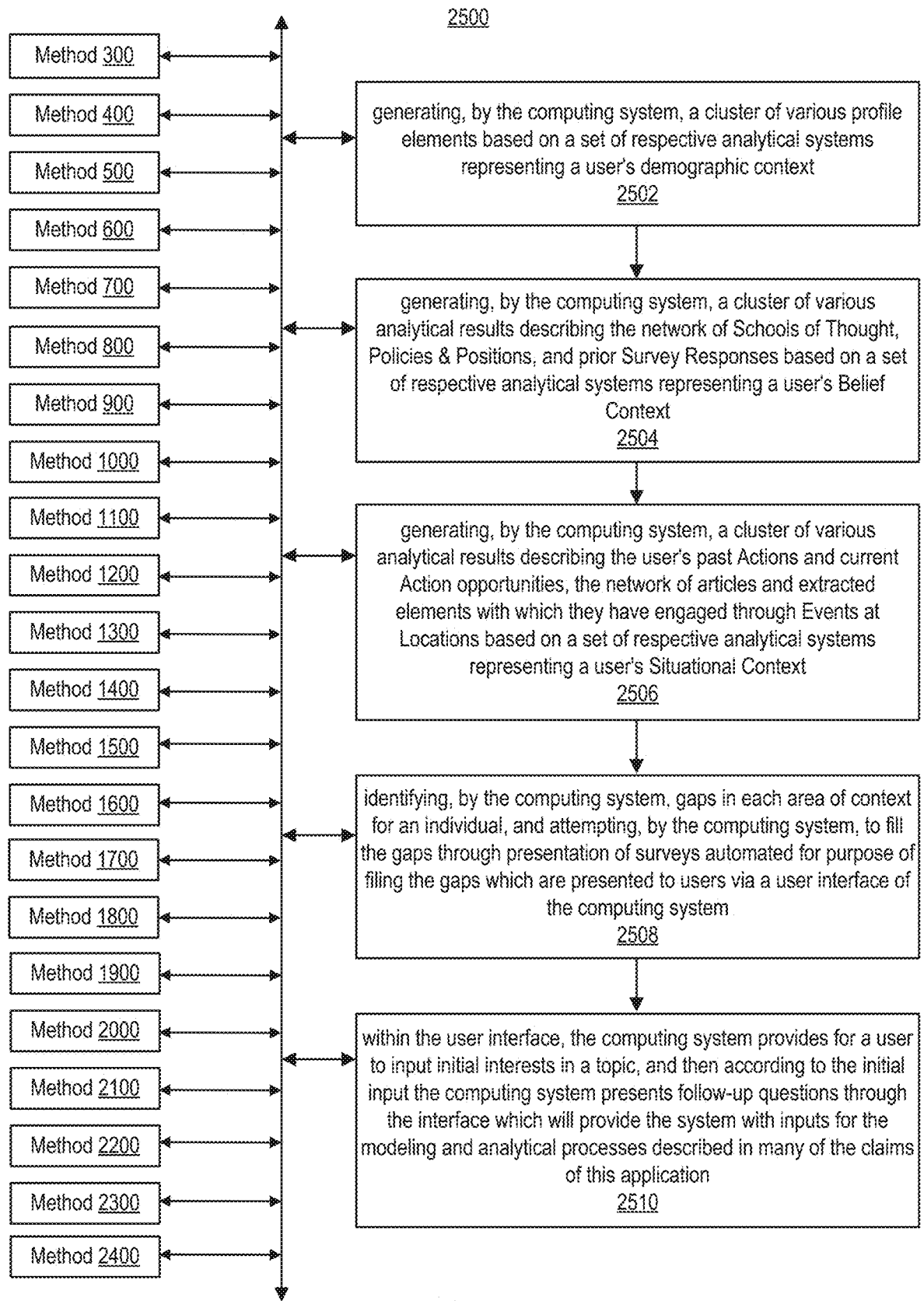

FIG. 27 shows a method 2500 for contextual surveys, implemented by a computing system (such as the computing system 200). In some examples, method 2500 can be combined with any one or more of the methods disclosed herein (such as method 300 to method 2400, as shown). Also, although aspects of method 2500 can be for contextual surveys associated with news information, it is to be understood that the technologies disclosed by the method 2500 can also be applied to other applications and implemented for other purposes, such as for contextual surveys associated with big data systems (e.g., social media systems, targeted marketing systems, traffic control systems, automated driving systems, weather prediction and warning systems, financial analysis systems, drug discovery systems, etc.).

Method 2500 includes, at step 2502, generating, by the computing system, a cluster of various profile elements based on a set of respective analytical systems representing a user's demographic context. At step 2504, the method includes generating, by the computing system, a cluster of various analytical results describing the network of schools of thought, policies and positions, and prior survey responses based on a set of respective analytical systems representing a user's belief context. At step 2506, the method includes generating, by the computing system, a cluster of various analytical results describing the user's past actions and current action opportunities, the network of articles, and extracted elements with which they have engaged through events at locations based on a set of respective analytical systems representing a user's situational context. In some cases, dimensions of context are used to generate a user's confidence score in dealing with new events.

At step 2508, the method 2500 includes identifying, by the computing system, gaps in each area of context for an individual, and attempting, by the computing system, to fill the gaps through a presentation of surveys automated for purpose of filing the gaps which are presented to users via a user interface of the computing system. At step 2510, the method includes, within the user interface, the computing system providing for a user to input initial interests in a topic, and then, according to the initial input, the computing system presents follow-up questions through the interface that will provide the system with inputs for the modeling and analytical processes. In some embodiments, the method 2500 can further include providing a process for retrieving anonymous user profile information or generating an anonymous user profile for engaging anonymously with the user interface (e.g., see FIGS. 21 and 28 and related text herein).

FIG. 28 shows a method 2600 for a we-me and conservative-progressive landscape, implemented by a computing system (such as the computing system 200). In some examples, method 2600 can be combined with any one or more of the methods disclosed herein (such as method 300 to method 2500, as shown). Also, although aspects of method 2600 relate to the processing and enhancement of news information, it is to be understood that the technologies disclosed by the method 2600 can also be applied to other applications and implemented for other purposes, such as applications related to big data (e.g., applications for social media systems, targeted marketing systems, traffic control systems, automated driving systems, weather prediction and warning systems, financial analysis systems, drug discovery systems, etc.).

Method 2600 includes, at step 2602, documenting, by the computing system, user positioning of the we-me and conservative-progressive landscape based on two axes describing each topic space, which are managed by editor-users who calibrate the relative positioning of policy proposals in each of the two dimensions (e.g., policies which push the envelope in changing the status quo are to the progressive right of the horizontal conservative-progressive scale, and policies which move the country toward a more equitable distribution of society's assets are upward toward a we-centric society on the vertical we-me axis), and this matrix forms the intersection of real-world policies and the context hypergraph (which is a merger of the news and citizen hypergraphs) which is used by the editor-users to control the spatial positionings of the multi-dimensional context hypergraph's only tangible dimension.

Method 2600 also includes, at step 2604, measuring, by the computing system, public policies after implementation to evaluate whether the policies delivered benefits expected and to lock in a post-hoc analysis of a policy's performance. The method includes, at step 2606, providing, via a user interface of the computing system, by the computing system, a way for users to document in an index extent to which a public policy seeks to make progress by pushing boundaries forward toward a liberal pluralistic society or seeks to return to past policies and known outcomes. In some embodiments, the method 2600 can further include providing a process for retrieving anonymous user profile information or generating an anonymous user profile for engaging anonymously with the user interface (e.g., see FIGS. 21 and 28 and related text herein).

Method 2600 also includes, at step 2608, measuring, by the computing system, public policies after implementation to evaluate the extent to which the policies achieved their stated goal, and to what extent, to lock in the post-hoc analysis of a policy's performance. The method also includes, at step 2610, measuring, by the computing system, language used to promote proposed policies to determine whether they echo past campaigns and messaging strategies or they use new language patterns to describe progressive thinking.

Figure 29:
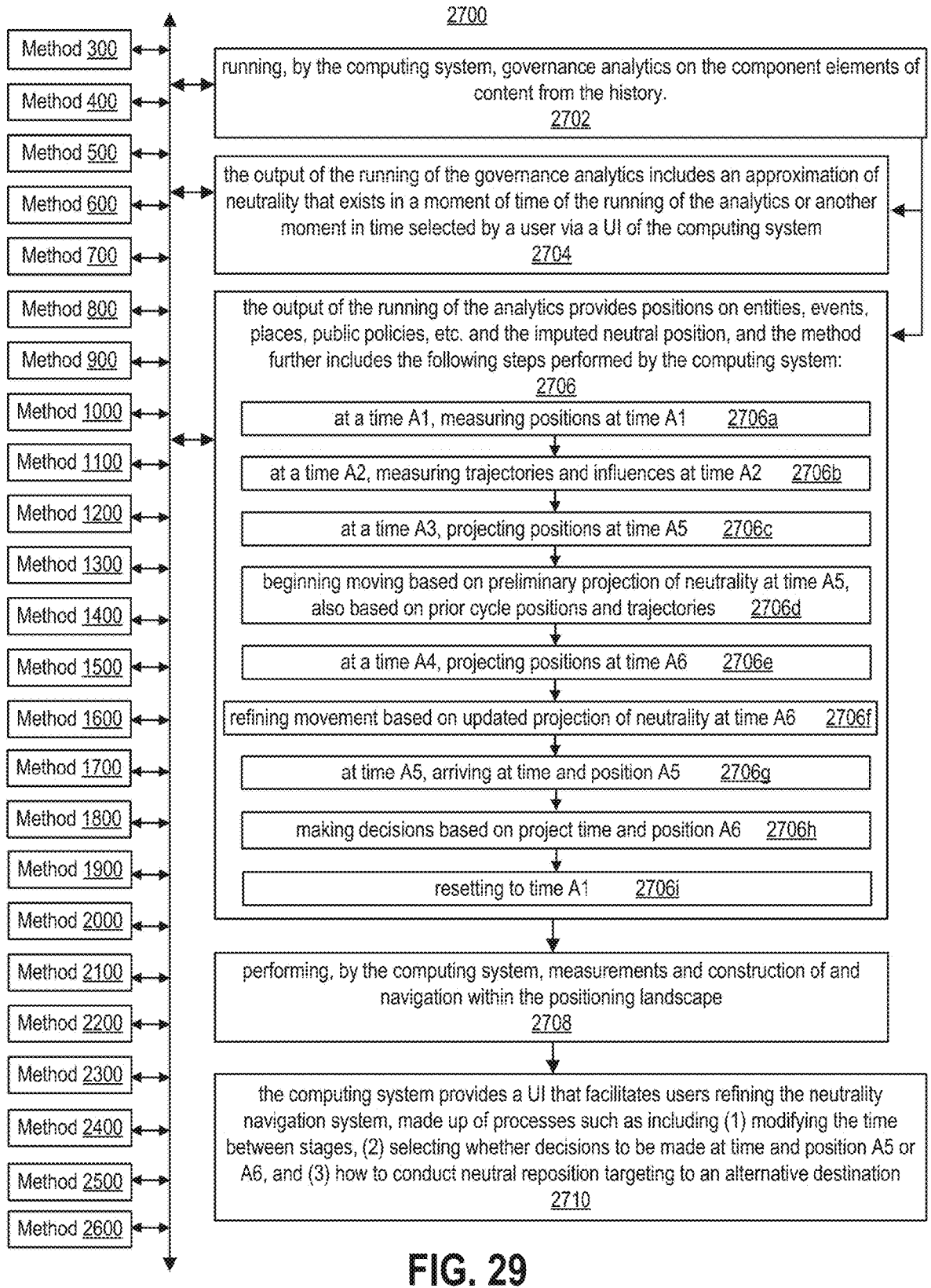

FIG. 29 shows a method 2700 for a neutrality algorithm, implemented by a computing system (such as the computing system 200). In some examples, method 2700 can be combined with any one or more of the methods disclosed herein (such as method 300 to method 2600, as shown). Also, although aspects of method 2700 can be for a neutrality algorithm associated with news information, it is to be understood that the technologies disclosed by the method 2700 can also be applied to other applications and implemented for other purposes, such as for a neutrality algorithm associated with big data systems (e.g., social media systems, targeted marketing systems, traffic control systems, automated driving systems, weather prediction and warning systems, financial analysis systems, drug discovery systems, etc.).

Method 2700 includes, at step 2702, running, by the computing system, governance analytics on the component elements of content from the history or more generally speaking from the retrieved information. The method also includes, at step 2704, the output of the running of the governance analytics includes an approximation of neutrality that exists in a moment of time of the running of the analytics or another moment in time selected by a user via a user interface of the computing system.

In some cases, such as examples related to news content processing use cases, the governance analytics use any one of the topic-based news hypergraphs disclosed herein as an input basis. In some cases, the approximation of neutrality is applied to a language system by the computing system and outputted by the computing system accordingly via a user interface of the computing system. In some cases, the output of the running of the topic-based governance analytics is mapped on the we-me and conservative-progressive landscape allowing calculation of a statistical midpoint between policies which is presented to editors in a user interface of the computing system, supporting consciously neutral editorial positioning within a complex and dynamic topic language system represented by the topic news hypergraph.

In some embodiments, the method 2700 can further include providing a process for retrieving anonymous user profile information or generating an anonymous user profile for engaging anonymously with the user interface (e.g., see FIGS. 21 and 28 and related text herein).

The method 2700 also includes, at step 2706, the output of the running of the analytics provides measured positions on entities, events, places, public policies, etc. as well as the imputed neutral position, and the method further includes the following steps performed by the computing system to forecast future positions of these elements in the dynamic hypergraph: at a time A1, measuring positions at time A1 (step 2706a); at a time A2, measuring trajectories and influences at time A2 (2706b); at a time A3, projecting positions at time A5 (step 2706c); beginning moving based on preliminary projection of neutrality at time A5, also based on prior cycle positions and trajectories (step 2706d); at a time A4, projecting positions at time A6 (step 2706e); refining movement based on updated projection of neutrality at time A6 (step 2706f); at time A5, arriving at time and position A5 (step 2706g); making decisions based on project time and position A6 (step 2706h); and finally resetting to time A1 (step 2706i).

Method 2700 also includes, at step 2708, performing, by the computing system, measurements and construction of and navigation within the positioning landscape (such as related to one of the hypergraphs mentioned herein). In some cases, decisions at time A5 are editorial decisions about adjustments to analysis algorithms of the system used to process content into stored and maintained variables in the system or one of its hypergraphs.

Method 2700 also includes, at step 2710, the computing system provides a user interface that facilitates users refining the neutrality navigation system, made up of processes such as those disclosed herein, such as through (1) modifying the time between stages, (2) selecting whether decisions to be made at time and position A5 or A6, and (3) how to conduct neutral reposition targeting to an alternative destination.

Figure 30:
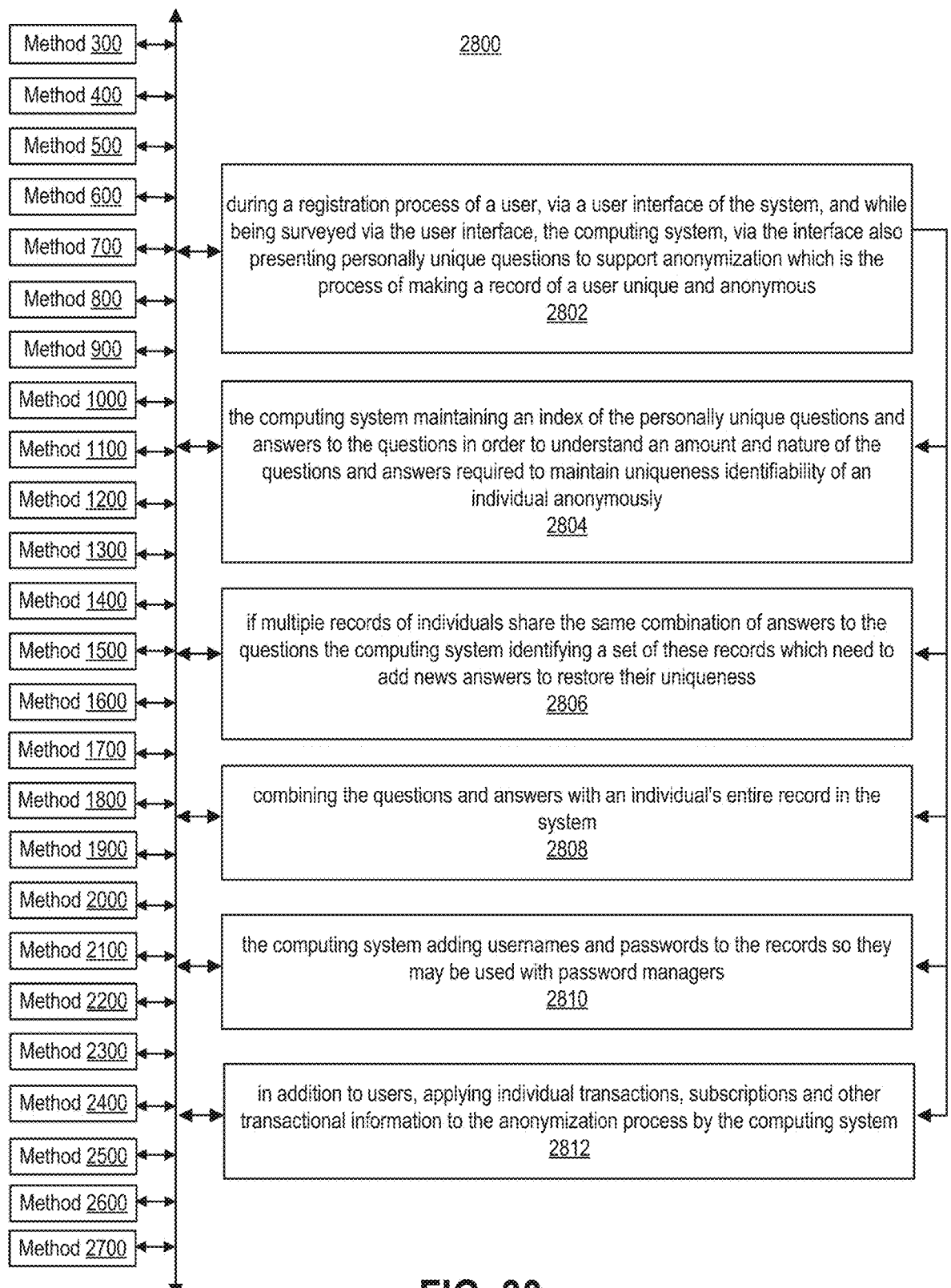

FIG. 30 shows method 2800 for anonymized engagement, implemented by a computing system (such as the computing system 200). In some examples, method 2800 can be combined with any one or more of the methods disclosed herein (such as method 300 to method 2700, as shown). Also, although aspects of method 2800 can be for anonymized engagement associated with news information, it is to be understood that the technologies disclosed by the method 2800 can also be applied to other applications and implemented for other purposes, such as for anonymized engagement associated with big data systems (e.g., social media systems, targeted marketing systems, traffic control systems, automated driving systems, weather prediction and warning systems, financial analysis systems, drug discovery systems, etc.).

Method 2800 includes, at step 2802, during a registration process of a user, via a user interface of the system, and while being surveyed via the user interface, the computing system, via the interface, presenting personally unique questions to support an anonymization process which is the process of making a record of a user unique and also anonymous. The method also includes, at step 2804, the computing system maintaining an index of the personally unique questions and answers to the questions to understand an amount and nature of the questions and answers required to maintain the uniqueness identifiability of an individual anonymously. The method 2800 also includes, at step 2806, if multiple records of individuals share the same combination of answers to the questions, identifying, by the computing system, a set of these records—which need to add new answers to the system to restore their uniqueness.

In some cases, the anonymization process is enhanced to create a matrix of unique records across the system. In some cases, for some users, such as upon their approval, the anonymization process includes unique identifiers like AppID, MachineID, and BrowserID which converts the algorithm to one that confirms a known ID, rather than detecting an unknown ID. In some cases, for scenarios where the system cannot find a unique identifier to start from, then the problem becomes a straightforward one of generating questions with variations of answers (e.g., teacher's name, dog's name, parents' first names) and managing a base of those questions for use by the anonymization process. In some cases, the anonymization process includes generation of histograms of breadth of questions and answers and the frequency patterns of specific answers to help determine which questions to add to a single record to make the record unique and anonymous.

The method 2800 also includes, at step 2808, combining the questions and answers with an individual's entire record in the system, so that the system can use things like whether an article has been read, an individual's position on a specific issue, or an individual's income as data points in the uniqueness formula. The method also includes, at step 2810, the computing system adding usernames and passwords to the records so they can be used with password managers and biometric systems. The method also includes, at step 2812, in addition to users, applying individual transactions, subscriptions, and other transactional information to the anonymization process by the computing system.

Figure 31:
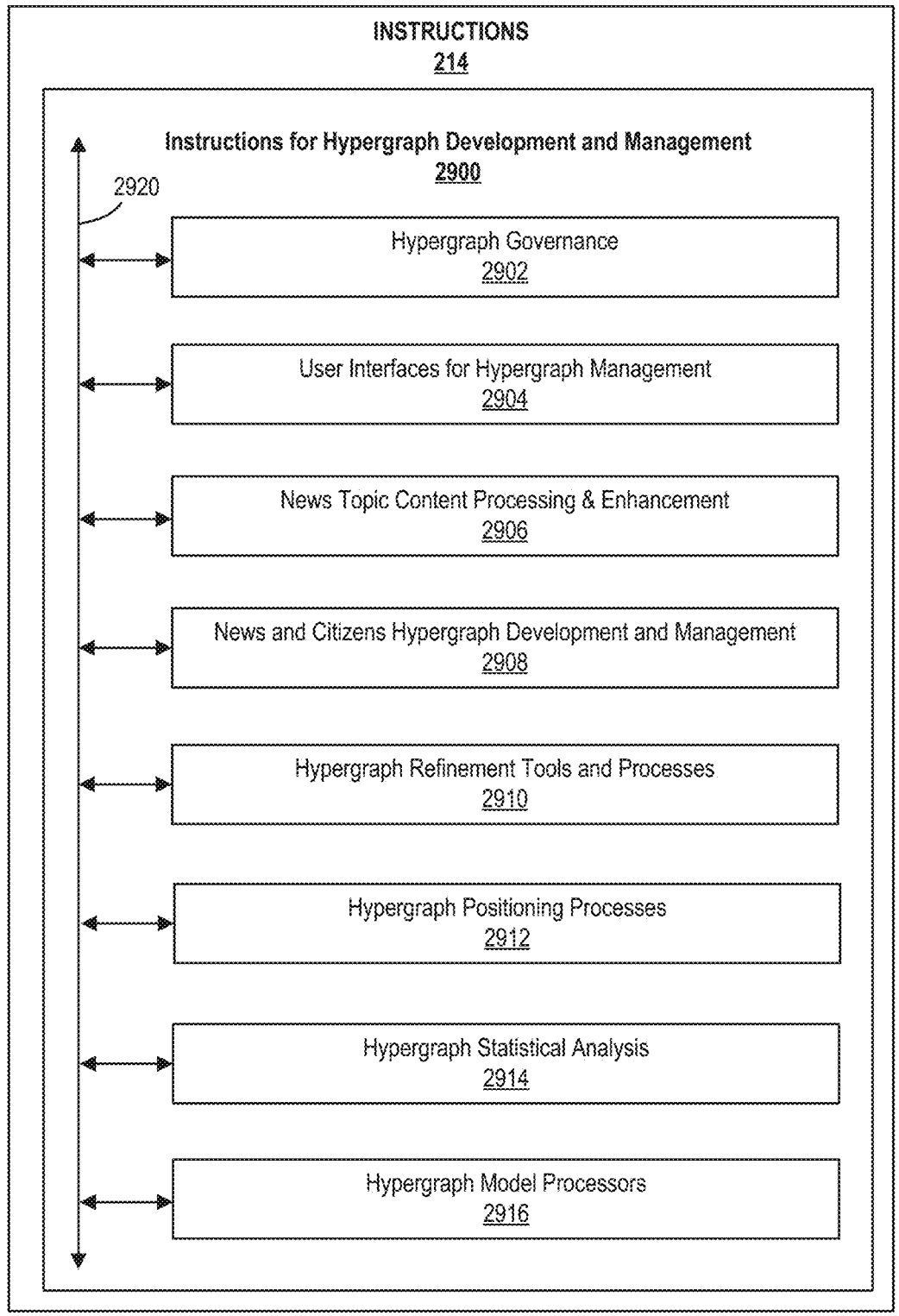
FIG. 31 illustrates instructions that are configured to provide hypergraph development and management functionality, in accordance with some embodiments of the present disclosure.

FIG. 31 shows instructions 2900 which are configured to provide hypergraph development and management functionality such as any one of the hypergraph development and management features disclosed herein. Also, FIG. 31 illustrates the instructions 2900 as a part of instructions 214 shown in FIG. 2. As a part of instructions 214, the processing device 202 is configured to execute instructions 2900 for performing the operations discussed herein related to hypergraph development and management functionality (e.g., see methods 300 to 2800 of FIGS. 3 to 30). The instructions 2900 can reside, completely or at least partially, within the main memory 204 or within the processing device 202 during execution thereof by the computing system 200, the main memory 204 and the processing device 202 also constituting machine-readable storage media. And, in some embodiments, the instructions 2900 include instructions to implement functionality corresponding to the client devices and server devices shown in FIG. 1 (e.g., see system frontend 102 and system backend 104 shown in FIG. 1). As shown, the instruction 2900 include sub-instructions 2902 to 2914, which can interact with each other through a communications bus 2920. The bus 2920 can be implemented via computer hardware or software.

Sub-instructions 2902 are configured to provide hypergraph governance functionality, such as the functionality provided by methods 1500 to 1800. Sub-instructions 2904 are configured to provide user interfaces for hypergraph management functionality (such as the dimensions user interface as well as the machine learning governance user interface and the data stories user interface, which are considered the three primary user interfaces of the system in some embodiments) as well as some of the user interface functionality disclosed herein related to anonymous user profiles and engagement with the system, e.g., see some of the functionality provided by parts of methods 500 to 1200, 1500 to 2300, and 2500 to 2800. Sub-instructions 2906 are configured to provide news content processing and enhancement functionality, such as the functionality provided by method 2200. Sub-instructions 2908 are configured to provide news and citizens hypergraph development and management functionality, such as the functionality provided by method 500. Sub-instructions 2910 are configured to provide hypergraph refinement tools and processes functionality, such as the functionality provided by methods 700 to 900. Sub-instructions 2912 are configured to provide hypergraph positioning processes functionality, such as the functionality provided by method 1000. Sub-instructions 2914 are configured to provide hypergraph statistical analysis functionality, such as the functionality provided by methods 1900 and 2200. Sub-instructions 2916 are configured to provide hypergraph model processors functionality, such as the functionality provided by methods 1100 to 1400.

Figure 32:
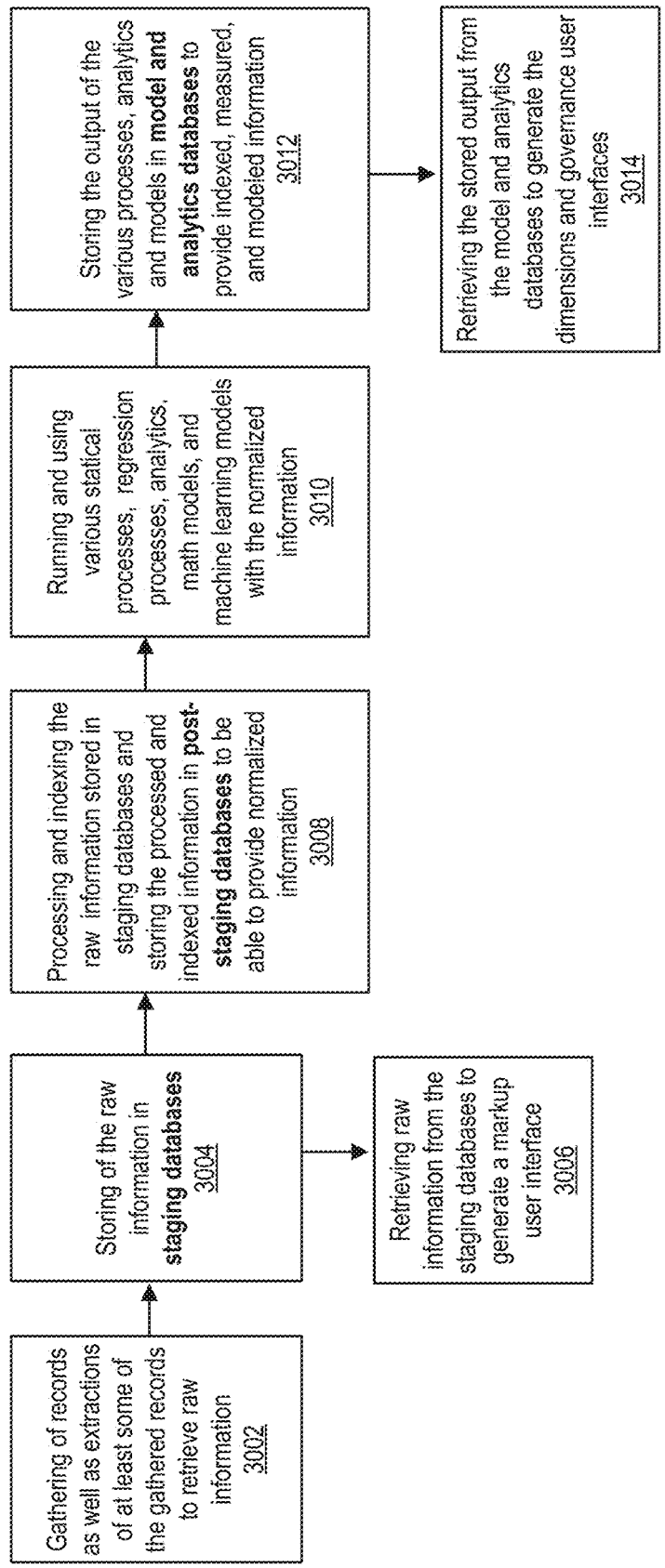
FIG. 32 illustrates an example workflow and corresponding databases used by the workflow, in accordance with some embodiments of the present disclosure.

FIG. 32 shows an example workflow 3000 and corresponding databases used by the workflow. The workflow can be implemented by computing system 200 as well as any other computing systems disclosed herein. The workflow 3000, or method, starts at step 3002, with gathering of records as well as extractions of at least some of the gathered records to retrieve raw information from various sources of information, such as various sources of news content as well as user content including content from social media sources. At step 3004, the workflow 3000 continues with storing the raw information in staging databases. Steps 3002 and 3004 can include collecting and storing information in the staging databases retrieved from articles, social media posts, advertising, academic works, and social trends, for example. Also, steps 3002 and 3004 can include text extractions from such content and migrating such information to reference databases of phrases, entities, events, places, and record positions within and across various content sources such as news articles, social media posts, advertising, academic works, and social trends, etc.

At step 3006, the workflow 3000 continues with retrieving the raw information from the staging databases to generate a markup user interface as well as any user interface that makes use of raw information collected from information sources remote to the computing system. At step 3008, the workflow 3000 continues with processing and indexing the raw information stored in the staging databases as well as storing the processed and indexed information in post-staging databases to be able to provide normalized information to processes disclosed herein or elsewhere that can benefit from normalized information. Steps 3006 and 3008 can include markup, enhancement, and normalization of metadata linked to the contents and database elements of the staging databases as well as the post-staging databases.

At step 3010, the workflow 3000 continues with using the stored normalized information (and in some cases, a combination of normalized and non-normalized information) of the post-staging databases as input for running and using various statical processes, regression processes, analytics, math models, and machine learning models. At step 3012, the workflow 3000 continues with storing the output of the various processes, analytics, and models in model and analytics databases to provide indexed, measured, and modeled information to processes disclosed herein or elsewhere that can benefit from such information. At step 3014, the workflow 3000 continues with retrieving the stored output stored in the model and analytics databases to generate the dimensions and governance user interfaces as well as other user interfaces that can benefit from the indexed, measured, and modeled information. The steps 3010 to 3014 can support creation of data stories as well as data stories as editorial governance dashboards presenting hypergraph analytics and statistics and other types of user interfaces for receiving adjustment input for corresponding data, metadata, and hypergraph models. The steps 3010 to 3014 can also support operations related to hypergraph analytics and models that can detect and quantify hypergraph patterns such as detection of clusters in hypergraphs. Such operations supported by steps 3010 to 3014 can also provide evidence of correlation and causation within clusters and other elements of or derived from hypergraphs. The steps 3010 to 3014 can also support capturing hypergraph model outputs and calculations of governance metrics for presentation in the governance user interfaces. And, the aforesaid steps can also support presenting citizen, news, and context-focused user interfaces that are derived from the citizens hypergraph, the news hypergraph, the context hypergraph, or a combination thereof. And, such user interfaces can be configured to receive user inputs of belief and policy position variables as well as other variables and parameters related to the aforementioned hypergraphs.

There are three primary data environments represented in FIG. 32. Firstly, the staging databases can be configured for storing raw data related to news, academic content, social media, and advertising as well as societal trend data and demographics and psychographics information. Secondly, processes related to the reference databases or post-staging databases support the receiving of staging content (or raw data) and such information after metadata has been linked to the information as well as after the information has been normalized. The staging databases can also include such information as well and be integrated with the post-staging databases. Thirdly, the production databases, such as the model and analytics databases, receive content and data from the aforementioned databases that are transformed to be consumed by production user interfaces such as the governance user interfaces and the dimensions user interface or some of the dashboards mentioned herein. Additionally, in some embodiments, backup databases are provided and managed by the system for each of the three primary data environments.

Figure 33:
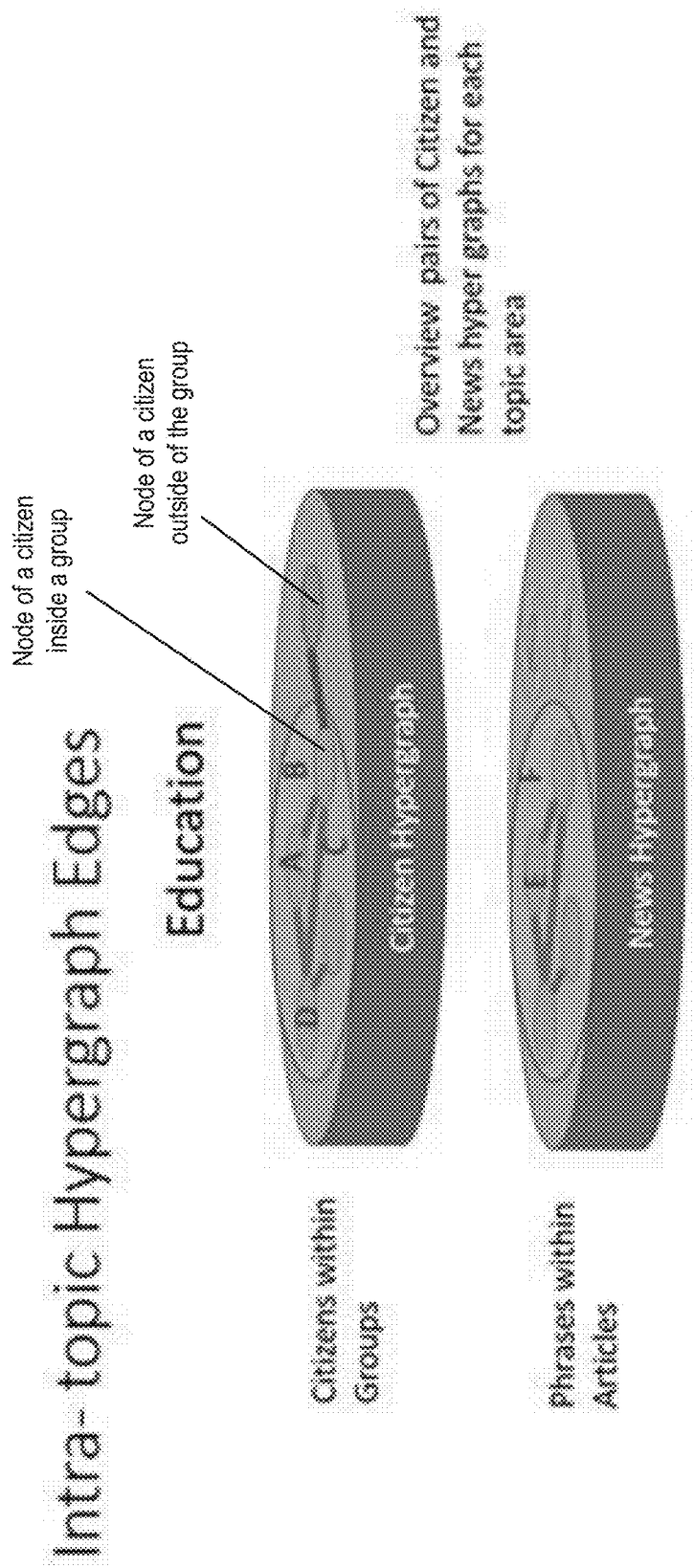
FIGS. 33 and 34 illustrate nodes within partial portrayals of citizens and news hypergraphs, in accordance with some embodiments of the present disclosure.

Focusing on the citizens, news, and context hypergraphs, FIGS. 33 to 43 depict uses of the hypergraphs as well as relationships between the hypergraphs and nodes of the graphs. Specifically, FIG. 33 shows nodes within partial depictions of the citizens and news hypergraphs. In other words, FIG. 33 depicts intra-topic or intra-nodal hypergraph edges. As illustrated, individual citizens exist within multiple different groups within the citizens hypergraph, and as depicted a node representative of a citizen in a group is shown connected to a citizen outside of the group. Groups can be defined as formal groups like political parties or informal groups such as groups having a common belief or political position. In general, groups can include citizens sharing a psychographic. Or, for example, Groups can be defined by a demographic parameter, such as age, gender, race, nationality, etc. The two aforementioned nodes, labeled in FIG. 33, are connected via an edge and are part of a group not depicted and the node that is part of the group in the citizen hypergraph is included in the group with three other citizens or nodes. In general, there can be any number of links or edges connecting citizens within groups and across groups. Below the citizens hypergraph is the news hypergraph. And, in the news hypergraph, each node represents a news topic. Similarly, there can be any number of links or edges connecting topics within groups of topics or across groups of topics. Topics can be linked by a commonality rating or a commonality score between topics. Topics can be defined by phrases within articles or news content of another type.

Figure 34:
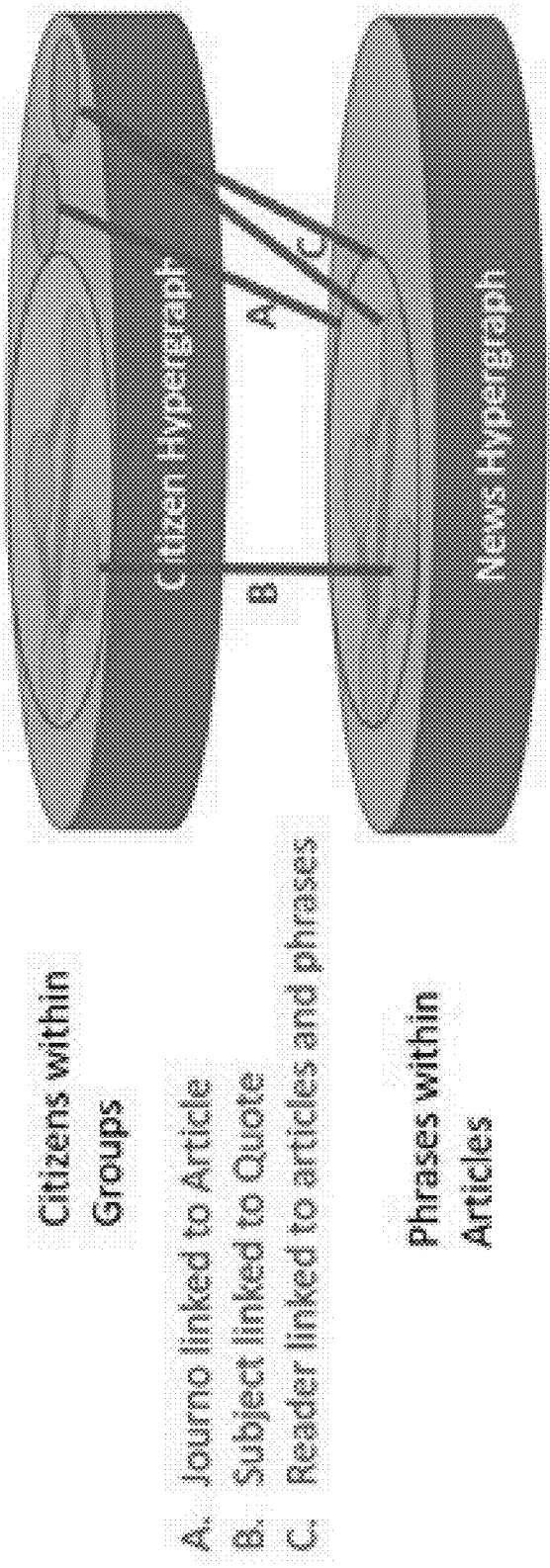

FIG. 34 shows nodes within partial depictions of the citizens and news hypergraphs wherein some of the nodes from one hypergraph are linked to respective nodes of the other hypergraph via inter-hypergraph edges. As shown in FIG. 34, the edges are linked to three nodes or topics within a group of nodes of the news hypergraph (see edges labeled "A", "B", and "C"), whereas only one of the linked nodes of the citizens hypergraph that is in the depicted group is connected by one of the shown edges (see edge labeled "B"). The edge labeled "A" is linking a journalist to an article (e.g., an author of the article), wherein the article is designated by the depicted group of the news hypergraph. The edge labeled "B" is linking a quoted citizen that is quoted in the article, and thus is linked to a node of the news hypergraph within the group shown. The edge labeled "C" is linking a reader, who is not part of the shown group of the citizen hypergraph, but who may have posted content that fits into the group shown in the news hypergraph which can show that the reader is influenced by the article represented by the group in the news hypergraph. In general, citizens can read any number of articles in the news hypergraph and be influenced by phrases from those articles and thus inter-hypergraph edges are generated to represent such influence (as shown by FIG. 34).

Figure 35:
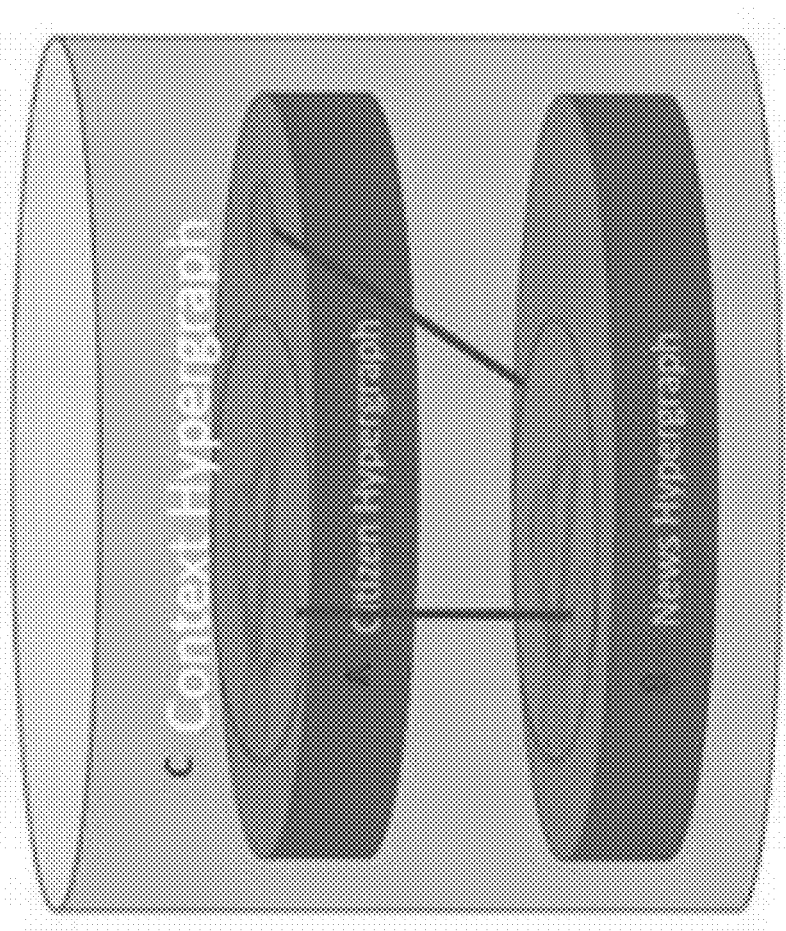
FIG. 35 illustrates nodes within partial portrayals of citizens and news hypergraphs as well as a context hypergraph derived from the citizens and news hypergraphs, in accordance with some embodiments of the present disclosure.

FIG. 35 shows nodes within the citizens and news hypergraphs as well as the context hypergraph derived from the citizens and news hypergraphs. As mentioned herein, context hypergraphs are formed based on integrating citizen and news hypergraphs. In general, the computing system disclosed herein can manage multiple layers of hypergraphs to support various functions provided by the user interfaces of the system. For example, citizens and news hypergraphs are integrated to form a layered hypergraph or the context hypergraph, wherein each of the citizens and news hypergraph represents a layer of the context hypergraph. In this specific example, the news citizens hypergraph provides a citizens' context related to interpretations and positions on news content or an article, and the news hypergraph provides the context of markets and strategies within which articles, posts, and advertising are based on. The context hypergraph integrates the two different contexts from the perspective of the context hypergraph's broad topic or category.

Figure 36:
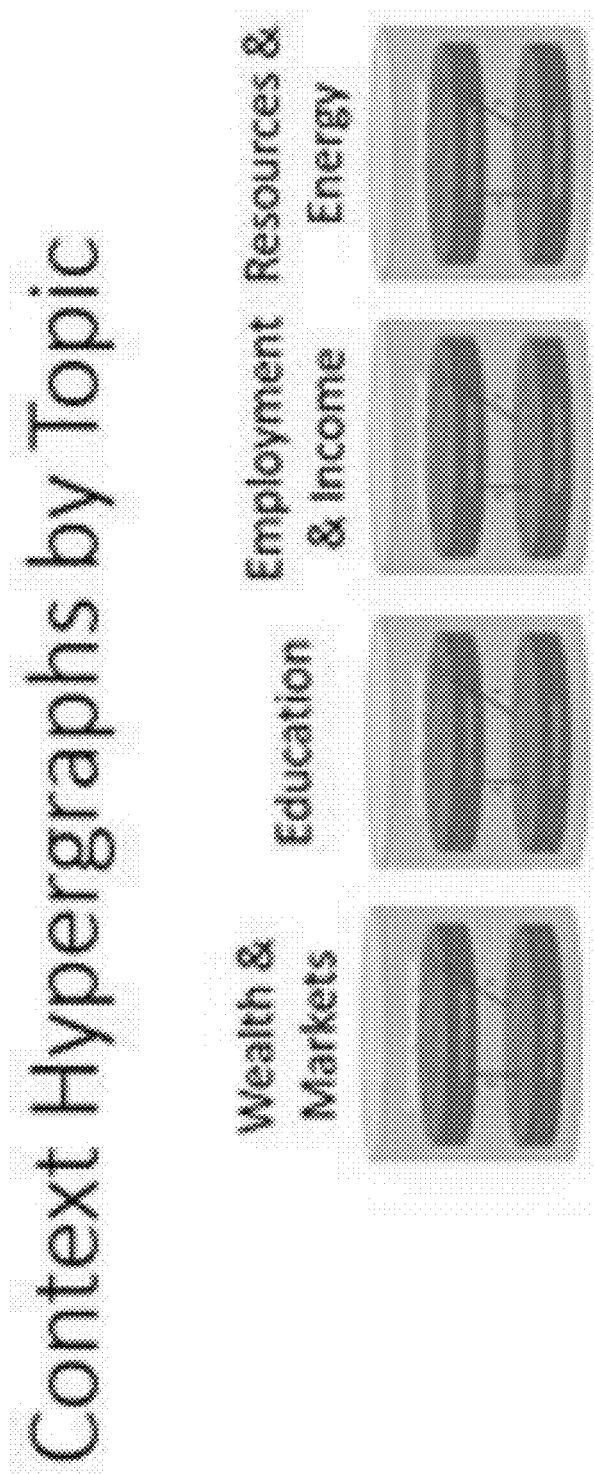
FIGS. 36 and 37 illustrate example context hypergraphs, in accordance with some embodiments of the present disclosure.

FIG. 36 depicts example context hypergraphs for broader topics or categories. The broader topic selected for each hypergraph can be determined by cluster analytics in some embodiments. Also, the computing system can apply pattern recognition or regression analysis to continuously measure the overall news landscape to confirm or adjust the system's categorization of news topics. The definition of a topic can be redefined continuously or periodically by the system via cluster or regression analytics.

Figure 37:
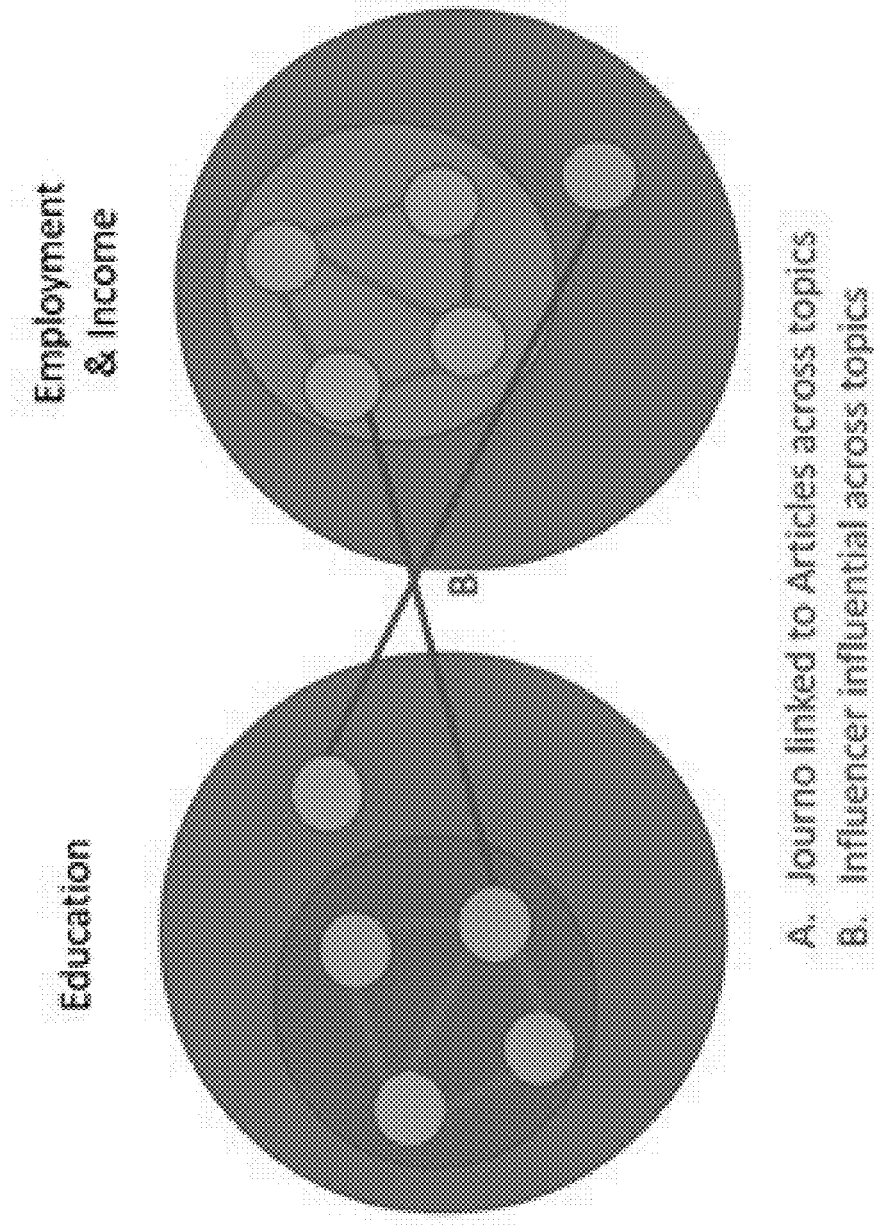
Figure 38:
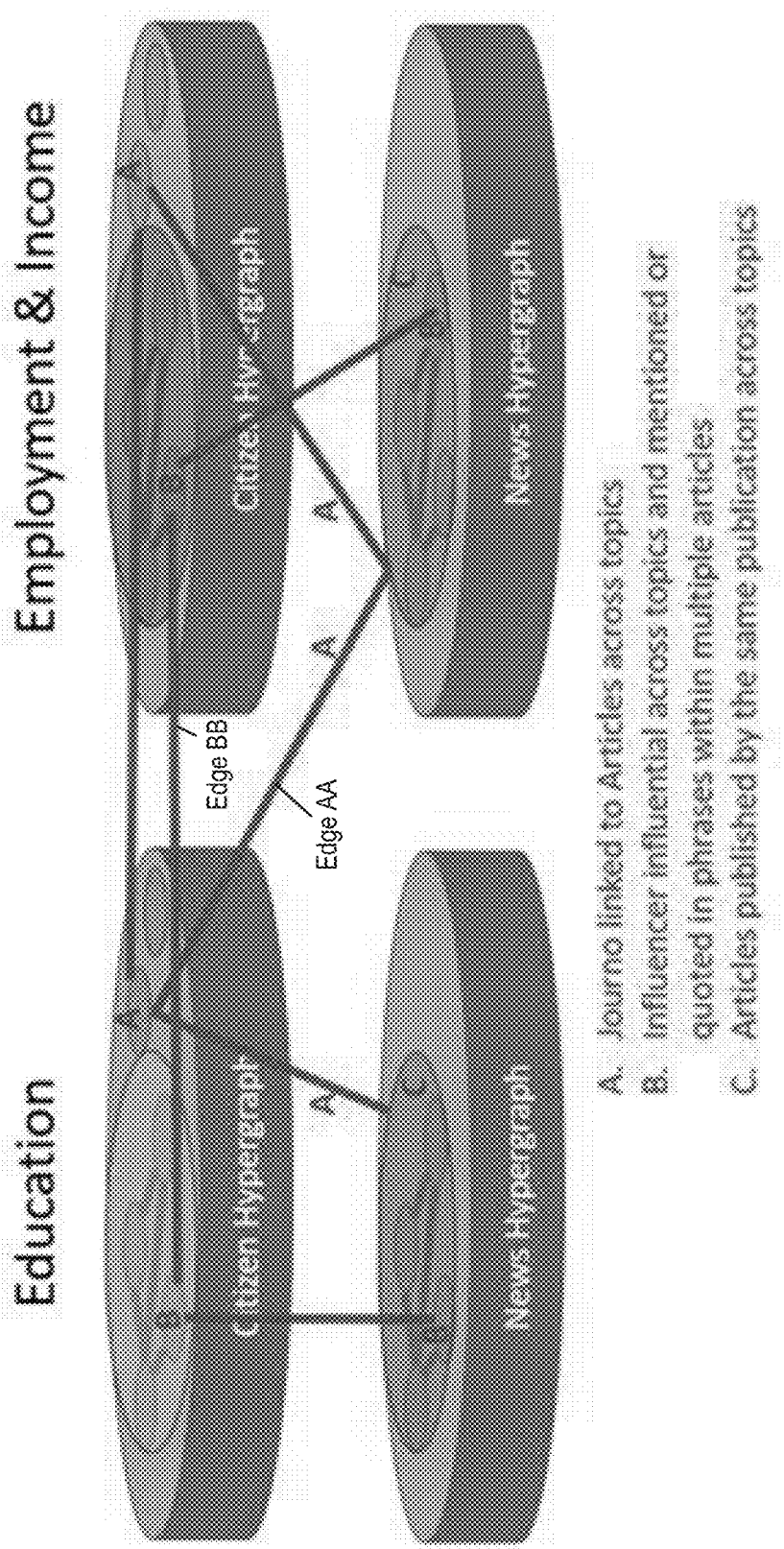
FIG. 38 illustrates deconstructed context hypergraphs showing the respective citizens and news hypergraphs that were integrated to construct each of the context hypergraphs, in accordance with some embodiments of the present disclosure.

FIG. 37 depicts example context hypergraphs for broader topics or categories that are linked via inter-topic hypergraph edges. FIG. 38 depicts deconstructed context hypergraphs showing the respective citizens and news hypergraphs that were integrated to construct each of the context hypergraphs. As shown, multiple layers of the hypergraph can extend across topics or context hypergraphs. For instance, a node of a first layer of a first combined hypergraph, made of two hypergraphs (wherein each layer of a combined hypergraph represents a separate hypergraph), can be linked via an edge to a node of a second layer of a second combine hypergraph, made of two hypergraphs. For instance, see the edge labeled "Edge AA". Also, as shown, a node of a first layer of the first combined hypergraph can link to a node of a first layer of the second combined hypergraph. For instance, see the edge labeled "Edge BB". The edges labeled "Edge AA" and "Edge BB" can represent a journalist, influencer, or publisher linked to articles across topics, for example.

Figure 39:
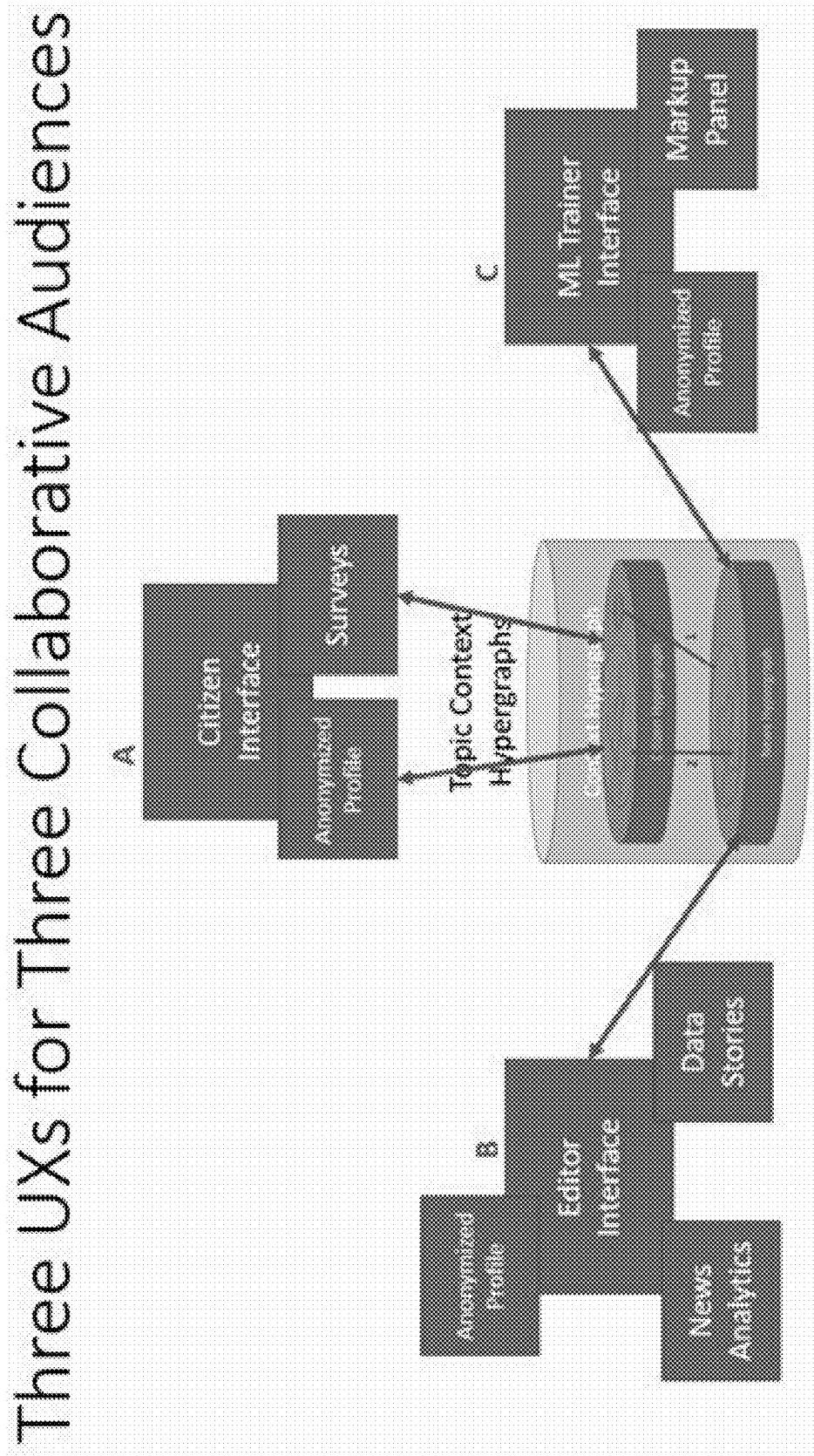
FIG. 39 illustrates three different groups of features provided by the system that use the context hypergraphs in different ways, in accordance with some embodiments of the present disclosure.

FIG. 39 shows three different groups of features provided by the system that use the context hypergraphs in different ways. In some embodiments, each one of the three different groups of features can be represented by a respective user interface (as shown in FIG. 39). Specifically, FIG. 39 shows three different user interfaces for collaborative audiences of news content. The three different user interfaces can frame an ecosystem of three different types of audiences that work together to build and maintain the contextual framework of each context hypergraph and the relationships between multiple context hypergraphs. In some other embodiments, there may be more or fewer types of audiences or groups of user interfaces or groups of features of the system. In one embodiment, each group of features or each user interface is dedicated to a separate audience. In such an embodiment and others, one audience can include citizens, a second audience can include editors and journalists, and a third audience can include machine learning trainers, which can include journalists, academics, and editors. As shown in FIG. 39, group A features are configured for an audience of citizens, group B features are configured for an audience of editors and journalists, and group C features are configured for an audience of machine learning trainers. As depicted in FIG. 39, Group A features include the citizen user interface, the anonymized profile functionality, and the functionality of the survey disclosed herein, for example. Group B features include the editor user interface, the anonymized profile functionality, the data stories user interface, and the news analytics functionality. Group C features include the machine learning trainer user interface, the markup functionality, and the anonymized profile functionality.

Figure 40:
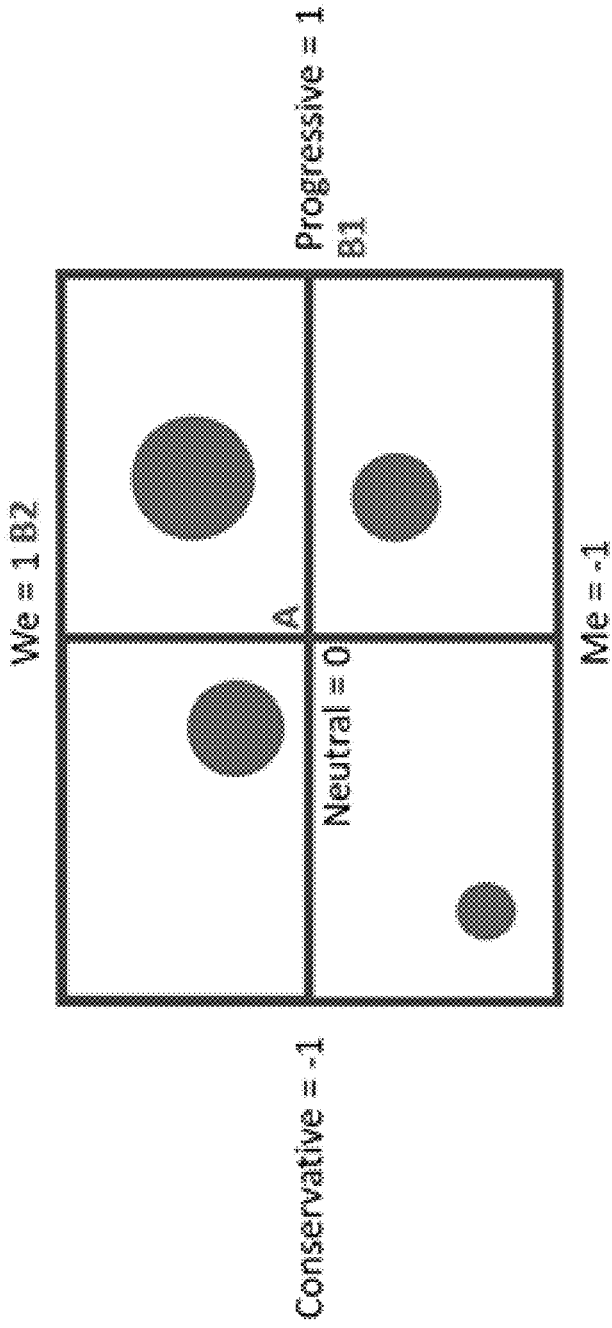
FIG. 40 illustrates an example instance of the we-me and conservative-progressive landscape disclosed herein, in accordance with some embodiments of the present disclosure.

FIG. 40 depicts an example instance of the we-me and conservative-progressive landscape disclosed herein. As shown, in some embodiments, the ecosystem can use data from hypergraphs to replace one-dimensional left-right spectrums with multi-dimensional spectrums made up of at least two axes for each topic's policy matrix. The calibration of such axes can be managed by editors who can adjust the relative positioning of policy proposals in each of the multiple dimensions of a landscape. In the illustrated example, editors can adjust a landscape for a topic's policies (specifically, education policies) and the alignment of policies concerning conservative-progressive and we-me spectrums.

Figure 41:
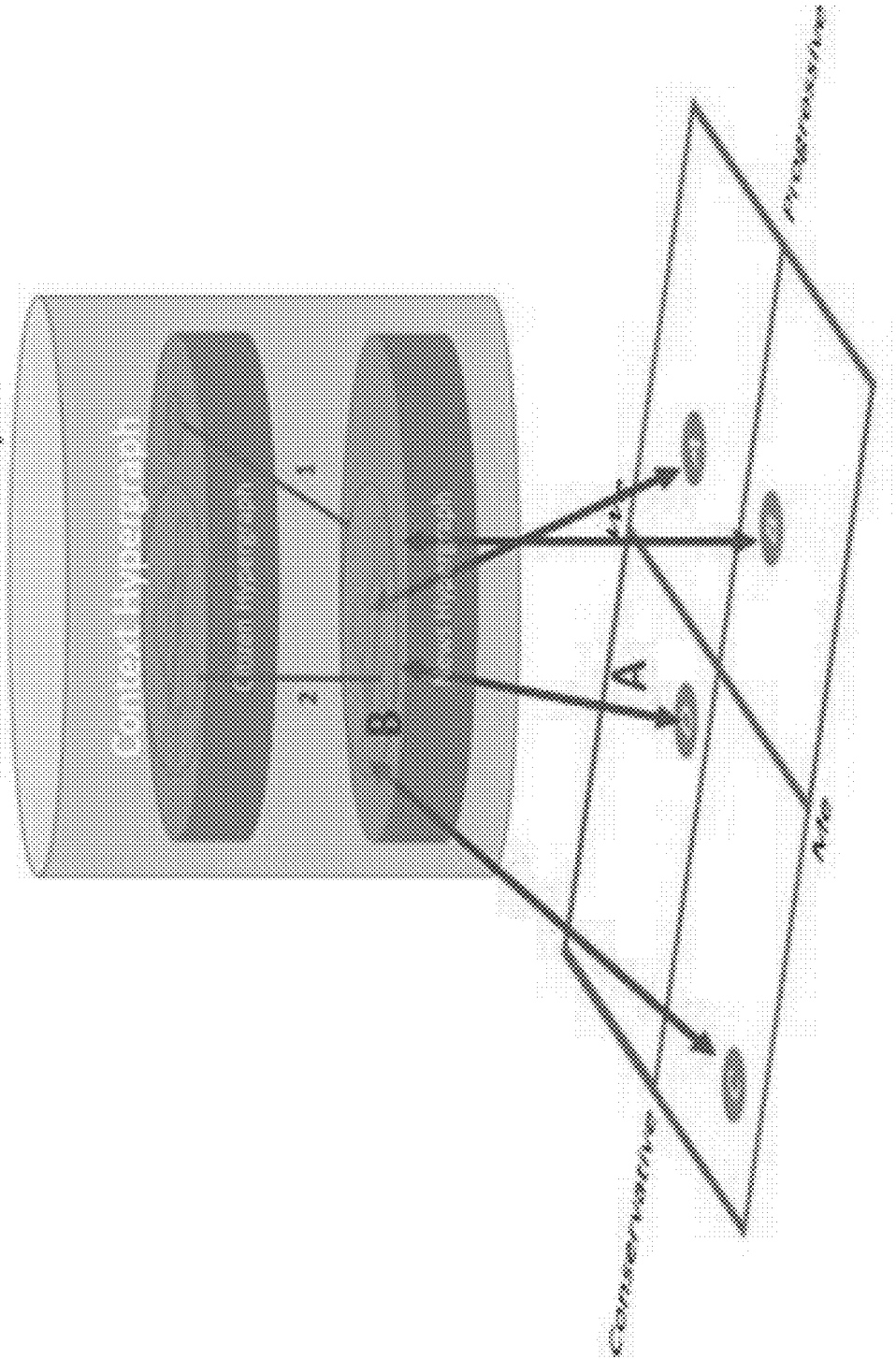
FIG. 41 illustrates the landscape shown in FIG. 40 and its relationship to a corresponding contextual hypergraph, in accordance with some embodiments of the present disclosure.

FIG. 41 illustrates the landscape shown in FIG. 40 and its relationship to the corresponding contextual hypergraph. The system can adjust the relative measures of policies in the topic policy matrix of the landscape under instruction from editors using the editor user interface, which can adjust the nodes and the makeup of the corresponding context hypergraph.

Figure 42:
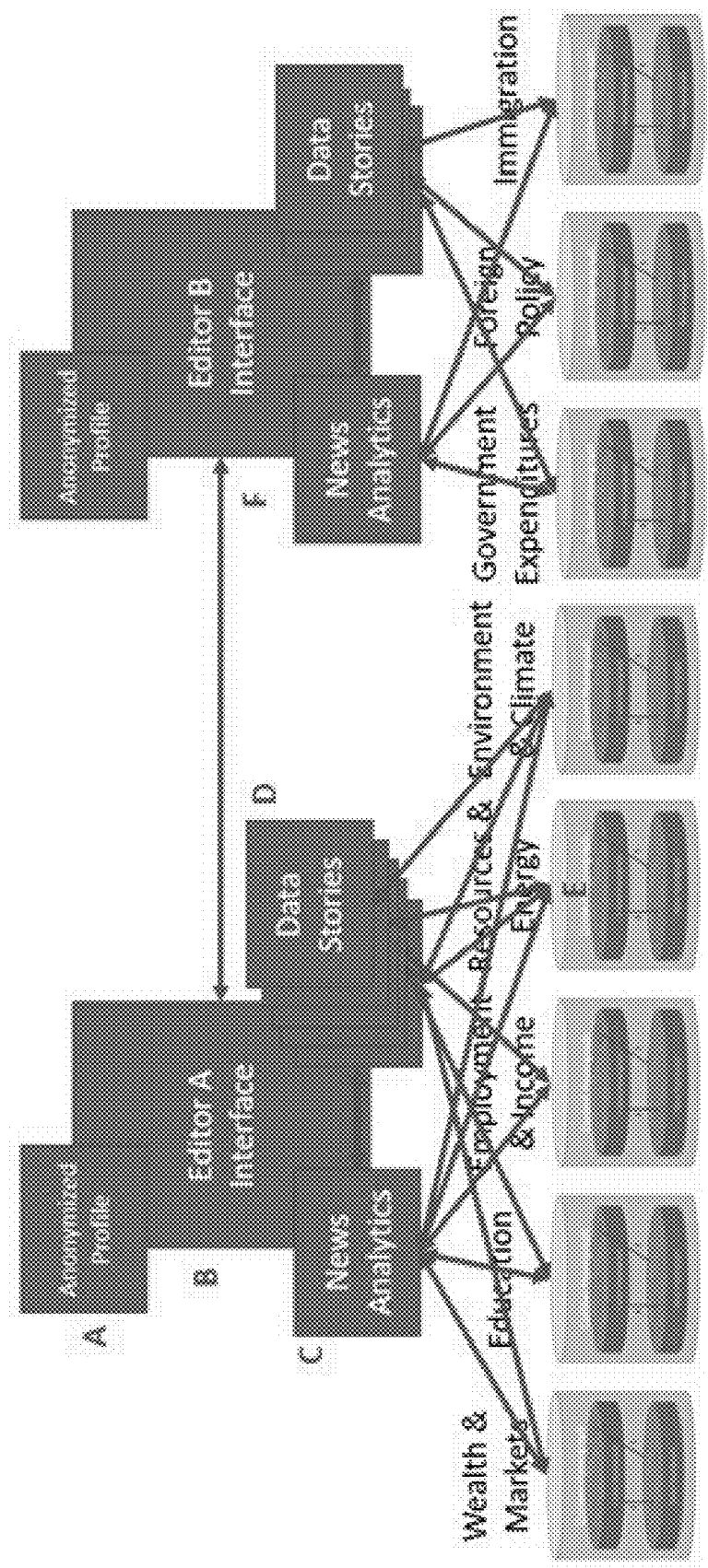
FIG. 42 illustrates the editorial governance features across different topics represented by respective context hypergraphs, in accordance with some embodiments of the present disclosure.

FIG. 42 shows the editorial governance features across different topics represented by respective context hypergraphs. Through such features, editor actions can be tracked to profiles of the editors. Such profiling can provide a basis for bias analytics that can provide editorial information to editors as well as feedback into the system for enhancing the accuracy of the system. Also, through such features, editors can review, manipulate or change the hypergraphs, review corresponding analytics such as to investigate patterns in communications strategies amongst news sources and content feeds, review or manipulate setting for the generation of the hypergraphs as well as the corresponding analytics, and communicate and collaborate with each other by assignment to different news content domains.

Figure 43:
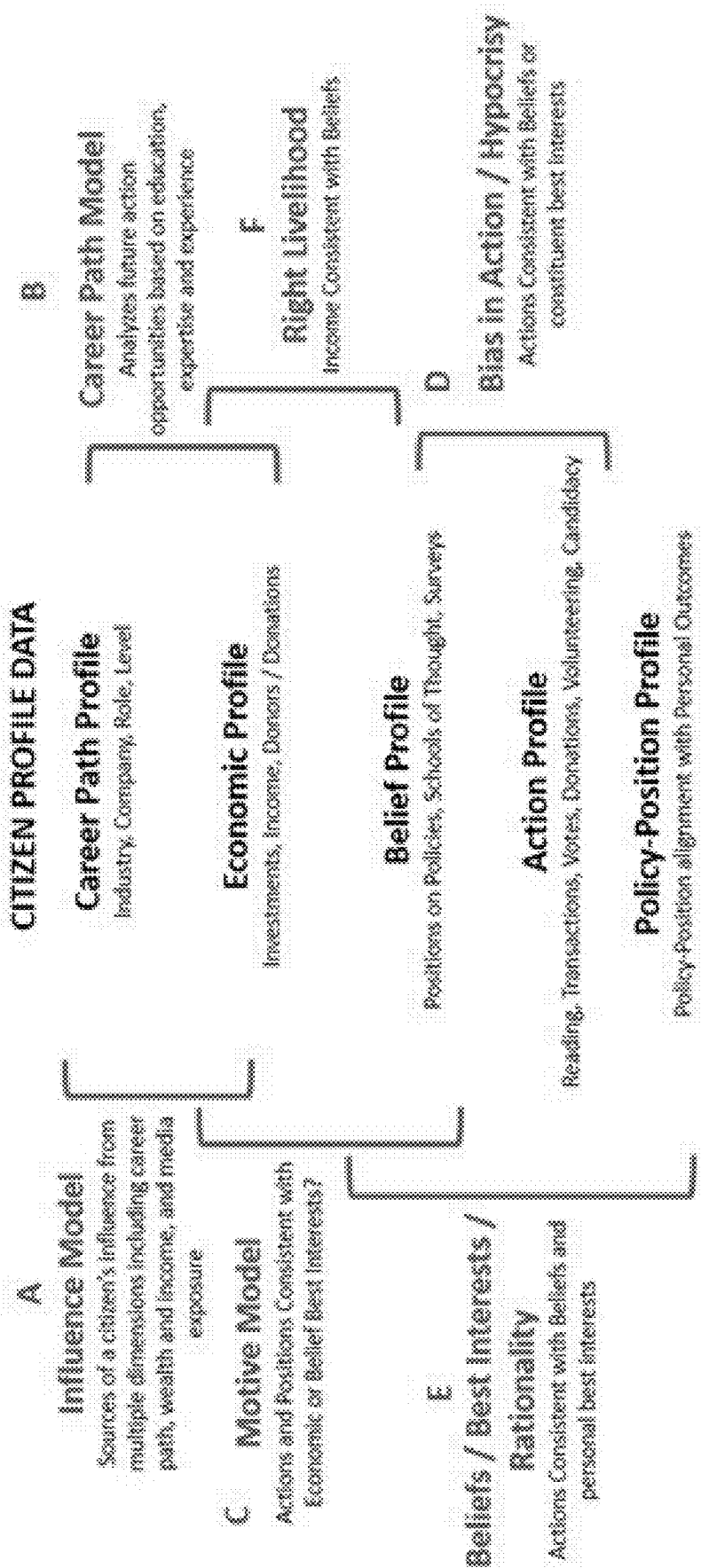
FIG. 43 illustrates examples of the hypergraph model processors disclosed herein, in accordance with some embodiments of the present disclosure.

FIG. 43 shows examples of the hypergraph model processors disclosed herein. As shown, the system can include an influence model describing a citizen's latent influence which they can employ in support of their motives based on a career path model and a motive model. The career path model evaluates and maps the potential sources of influence and motive coming from a citizen's education and employment. The motive model provides the likely factors a citizen may employ when deciding on a civic responsibility or policy position. The system can also include a model to estimate the actual bias a citizen has employed in applying their motives to an act of civic engagement. Also, the system can include a model to evaluate whether a citizen's actions represent their own best interests considering an investment, career path, beliefs, etc. The system can also include a model which can evaluate the extent to which a citizen's livelihood and its societal impacts are consistent with a citizen's beliefs, motivations, etc.

As mentioned in the Summary of this disclosure, although many of the examples disclosed herein relate to use cases corresponding to news content and journalism as well as civic engagement with such content, other use cases and applications can utilize the technologies disclosed herein. For example, many other use cases that require the processing and enhancement of large bodies of data (such as use cases related to traffic control, automated driving, weather prediction and warning systems, financial analysis, drug discovery, etc.) can benefit from the use of hypergraphs as well as the contextual hypergraph system. Such use cases can also benefit from the technologies disclosed herein for data processing and enhancement as well as for user engagement with the processed and enhanced data as well as computing systems disclosed herein that leverage hypergraphs and the combination or linking of hypergraphs to process data and enhance it for user engagement with the processed and enhanced data.

Also, as mentioned in the Summary, the computing systems and technologies disclosed herein can provide specific technical solutions to at least overcome the technical problems mentioned in the background section and other parts of the application as well as other technical problems not disclosed herein but recognized by those skilled in the art, such as technical solutions to overcome technical problems in the processing and enhancement of data retrieved from sources of big data (e.g., sources of data for news and social media systems, targeted marketing systems, traffic control systems, automated driving systems, weather prediction and warning systems, financial analysis systems, drug discovery systems, etc.).

Additionally, as mentioned in the Summary, disclosed herein are more generic methods for hypergraph development and management in general as well as for anonymized user engagement with websites and more specifically with websites that manage hypergraphs of information, whether or not that information includes news content.

Figure 44:
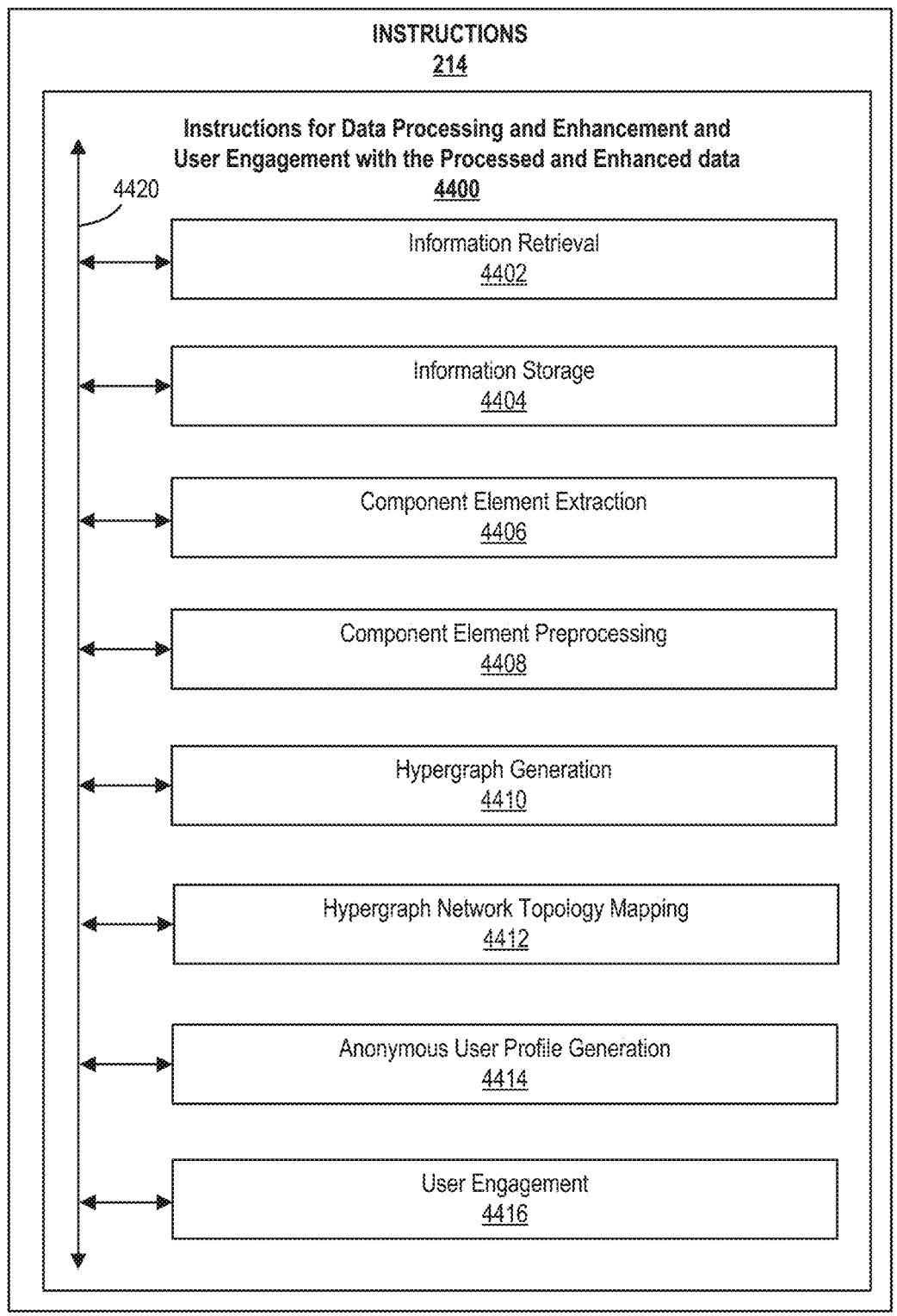
FIG. 44 illustrates instructions that are configured to provide data processing and enhancement as well as to provide user engagement with the processed and enhanced data by leveraging the use of hypergraphs and combined hypergraphs as well as anonymized user engagement with such hypergraphs, in accordance with some embodiments of the present disclosure.

For example, FIG. 44 shows instructions 4400 which are configured to provide, in general, data processing and enhancement as well as to provide user engagement with the processed and enhanced data by leveraging the use of hypergraphs and combined hypergraphs as well as anonymized user engagement with such hypergraphs. Also, FIG. 44 illustrates the instructions 4400 as a part of instructions 214 shown in FIG. 2. As a part of instructions 214, the processing device 202 is configured to execute instructions 4400 for performing the operations discussed herein related to data processing and enhancement as well as to user engagement with the processed and enhanced data, and specifically, related to utilizing hypergraphs and the combination or linking of hypergraphs to process data and enhance it for user engagement (such as anonymized user engagement) with the processed and enhanced data (e.g., see methods 4500 to 4700 of FIGS. 45 to 47). Also, with respect to use cases related to news content processing and as a part of instructions 214, the processing device 202 is configured to execute instructions 4400 as well as instructions 2900 for performing the operations discussed herein related to hypergraph development and management functionality (e.g., see methods 300 to 2800 of FIGS. 3 to 30). The instructions 4400 can reside, completely or at least partially, within the main memory 204 or within the processing device 202 during execution thereof by the computing system 200, the main memory 204 and the processing device 202 also constituting machine-readable storage media. And, in some embodiments, the instructions 4400 include instructions to implement functionality corresponding to the client devices and server devices shown in FIG. 1 (e.g., see system frontend 102 and system backend 104 shown in FIG. 1). As shown, the instruction 4400 include sub-instructions 4402 to 4416, which can interact with each other through a communications bus 4420. The bus 4420 can be implemented via computer hardware or software.

Sub-instructions 4402 are configured to retrieve information from a plurality of information sources. In some embodiments, sub-instructions 4402 retrieve the information via online feeds, application programming interfaces, or data entry, or some combination thereof.

Sub-instructions 4404 are configured to store the information in data storage of the computing system 200 or data storage of a remote computing system connected to the computing system 200 over one or more communications networks (such as network(s) 116). In some embodiments, the data storage is implemented at least in part by a data lake or any other system or repository for storing data in its initial format. 11. In some embodiments, sub-instructions 4404 are configured to store the extracted component elements in a database system (such as a database system that includes a NoSQL database system). In some cases, the database system is included within the data storage of the computing system 200 or data storage of a remote computing system.

Sub-instructions 4406 are configured to extract component elements of content from the stored information based on a set of extraction conditions (such as subsequent to the storing of the information in the data storage. In some embodiments, the sub-instructions 4406 are also configured to use natural language processing (NLP) or text extraction models to identify insights and connections in text of the information. In some embodiments, the NLP and the models are enhanced by machine learning. Also, in some examples, sub-instructions 4406 are enhanced by machine learning.

Sub-instructions 4408 are configured to apply a machine learning system to the extracted component elements to preprocess the extracted component elements. In some embodiments, the application of the machine learning system includes translating a first taxonomy derived from the extracted component elements to a second taxonomy. In some cases, the application of the machine learning system includes parsing metadata in the extracted component elements.

Sub-instructions 4410 are configured to generate a hypergraph by at least interlinking and organizing the preprocessed component elements or a derivative thereof as nodes in the hypergraph. In some cases, sub-instructions 4408 or sub-instructions 4410 or another part of instructions 4400 use the preprocessed component elements as input for hypergraph analytics.

In some embodiments, the nodes of the generated hypergraph are interconnected by multiple dimensions of edges representing nature and strength of connections. In some examples, the generated hypergraph includes a graph in which an edge of the graph joins any number of vertices of the graph. In some examples, each one of the nodes of the generated hypergraph includes at least one computing device and the generated hypergraph is implemented as a computer network and is representative of a network topology of the computer network.

Sub-instructions 4412 are configured to apply hypergraph network topology mapping to information components of the generated hypergraph. The information components include nodes and edges of the hypergraph. In some embodiments, the application of the hypergraph network topology mapping includes generating a first separate hypergraph based on iterating over the generated hypergraph according to a first criteria and generating a second separate hypergraph based on iterating over the generated hypergraph according to a second criteria. In some examples, the first separate hypergraph includes a news hypergraph generated based on news-based criteria included in the first criteria, and the second separate hypergraph includes a citizens hypergraph generated based on citizens-based criteria included in the second criteria. Also, sub-instructions 4412 are configured to apply network topology mapping functions to link parts of the first separate hypergraph and the second separate hypergraph to generate a third separate hypergraph based on the linked parts, wherein the third hypergraph includes a context hypergraph based on the linking of the first and the second separate hypergraphs and context-based criteria.

Sub-instructions 4414 are configured to generate an anonymous user profile for engaging anonymously with user interfaces provided by sub-instructions 4416 for interacting with the hypergraphs generated by sub-instructions 4410 and 4412 as well as hypergraphs generated by other methods disclosed herein. In some embodiments, generating the anonymous user profile includes retrieving user profile information associated with an anonymous individual user through user input into a form running on a web browser. The form can be generated by sub-instructions 4414 or 4416, for example. Also, in some examples, the user input is received via an interview provided by the form and based on a query that locates an anonymized record of the anonymous individual user.

Sub-instructions 4416 are configured to generate, update, and control any one of the user interfaces or graphical user interfaces disclosed herein. Also, in general, sub-instructions 4416 are configured to implement and facilitate user engagement with any instance of the processed and enhanced data described here (whether or not the data is structured in a hypergraph), such as through any one of the user interfaces or graphical user interfaces disclosed herein.

In some embodiments, the sub-instructions 4402 are configured to gather, within a reference computing system, processed information components extracted from information of various sources. In some examples, the reference computing system includes a database system (such as a NoSQL database system). In such embodiments, sub-instructions 4410 are configured to generate a hypergraph based at least on the gathering of the processed information components. In some cases, nodes of the hypergraph can be interconnected by multiple dimensions of edges representing nature and strength of connections and the hypergraph can include a graph in which an edge of the graph joins any number of vertices of the graph. Furthermore, in some embodiments, sub-instructions 4412 are configured to generate two separate hypergraphs based on iterating over the generated hypergraph, separately, according to two respective criteria. And, sub-instructions 4412 are configured to apply network topology mapping functions to link parts of the two separate hypergraphs to generate a third separate hypergraph based on the linked parts, wherein the third hypergraph includes a context hypergraph based on the linking of the two separate hypergraphs and context-based criteria.

As mentioned, in some embodiments, the sub-instructions 4402 are configured to gather, within a reference computing system, processed information components extracted from information of various sources, and the sub-instructions 4410 are configured to generate a hypergraph based at least on the gathering of the processed information components. And, nodes of the hypergraph are interconnected by multiple dimensions of edges representing nature and strength of connections. Also, the hypergraph includes a graph in which an edge of the graph joins any number of vertices of the graph. In some examples, a part of the instructions 4400 (such as sub-instructions 4416) is configured to generate and store statistical information for presentation via a GUI based on the generated hypergraph or any other of the generated hypergraphs disclosed herein.

Figure 45:
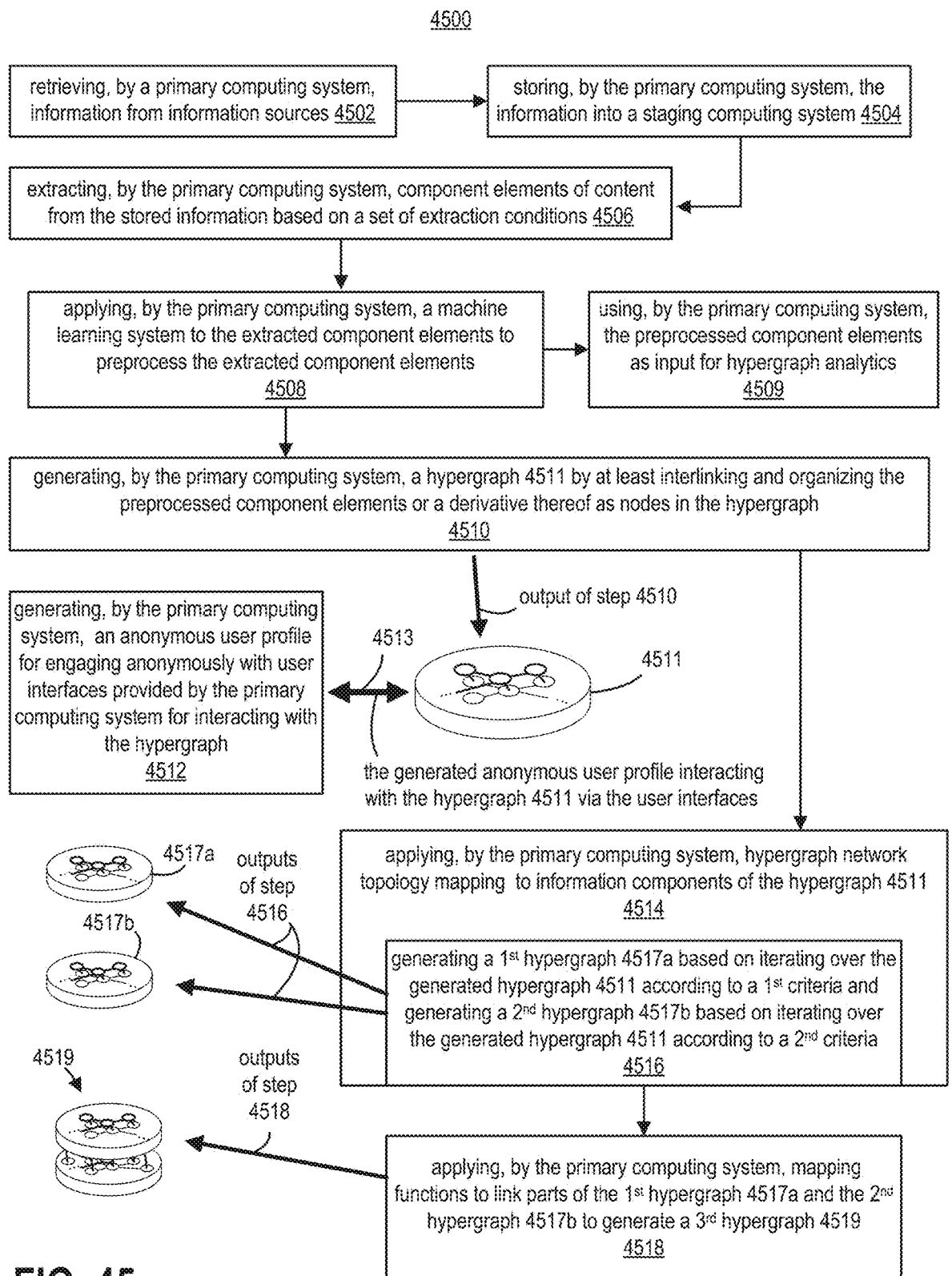
FIGS. 45 to 47 illustrate other example methods of the technologies disclosed herein, in accordance with some embodiments of the present disclosure.

FIG. 45 shows a method 4500, implemented by a computing system (such as the computing system 200), for data processing and enhancement as well as for user engagement with the processed and enhanced data by leveraging the use of hypergraphs and combined hypergraphs as well as anonymized user engagement with such hypergraphs. In some examples, method 4500 can be combined with any one or more of the methods disclosed herein. The method can start with retrieving, by a primary computing system (such as the computing system 200), information from a plurality of information sources (at step 4502). In some examples, the primary computing system includes a least one server-side computing device. In some cases, the primary computing system retrieves the information via online feeds, application programming interfaces, and data entry.

At step 4504, the method 4500 continues with storing, by the primary computing system, the information into a staging computing system (which can be a remote computing system) connected to the primary computing system over a communications network. In some embodiments, the staging computing system is implemented at least in part by a data lake or any other system or repository of data stored in its initial format.

At step 4506, subsequent to the storing of the information in the staging computing system, the method 4500 continues with extracting, by the primary computing system, component elements of content from the stored information based on a set of extraction conditions. In some examples, step 4506 includes using NLP and other types of data-processing models to identify insights and connections in text of the information. In some of such examples, the NLP and the models are enhanced by machine learning. In some examples, the step 4506 includes storing, by the primary computing system, the extracted component elements in a database system (such as wherein the database system includes a NoSQL database system). And, in some cases, the database system is included within the staging computing system.

At step 4508, the method 4500 continues with applying, by the primary computing system, a machine learning system to the extracted component elements to preprocess the extracted component elements. In some embodiments, the application of the machine learning system includes translating a first taxonomy derived from the extracted component elements to a second taxonomy. Also, in some embodiments, the application of the machine learning system includes parsing metadata in the extracted component elements. At step 4509, the method 4500 can include using, by the primary computing system, the preprocessed component elements as input for hypergraph analytics.

At step 4510, the method 4500 continues with generating, by the primary computing system, a hypergraph 4511 by at least interlinking and organizing the preprocessed component elements or a derivative thereof as nodes in the hypergraph. In some embodiments, the nodes of the generated hypergraph 4511 are interconnected by multiple dimensions of edges representing nature and strength of connections. Also, the generated hypergraph 4511 can include a graph in which an edge of the graph joins any number of vertices of the graph. Further, each one of the nodes of the generated hypergraph 4511 can include at least one computing device and the generated hypergraph is implemented as a computer network and is representative of a network topology of the computer network.

At step 4512, the method 4500 includes generating, by the primary computing system, an anonymous user profile for engaging anonymously with user interfaces provided by the primary computing system for interacting with the hypergraph 4511. And, as illustrated by the double-sided arrow 4513, the generated anonymous user profile interacts with the hypergraph 4511 via the user interfaces. In some embodiments, generating the anonymous user profile includes retrieving, by the primary computing system, user profile information associated with an anonymous individual user through user input into a form running on a web browser. And, in some examples, the user input is received via an interview provided by the form and based on a query that locates an anonymized record of the anonymous individual user.

At step 4514, the method 4500 further includes applying, by the primary computing system, hypergraph network topology mapping to information components of the generated hypergraph 4511. The information components include nodes and edges of the hypergraph 4511. At step 4516, the application of the hypergraph network topology mapping includes generating a first separate hypergraph 4517a based on iterating over the generated hypergraph 4511 according to a first criteria and generating a second separate hypergraph 4517b based on iterating over the generated hypergraph 4511 according to a second criteria. At step 4518, the method 4500 further includes applying, by the primary computing system, network topology mapping functions to link parts of the first separate hypergraph 4517a and the second separate hypergraph 4517b to generate a third separate hypergraph 4519 based on the linked parts. In some embodiments, the first separate hypergraph 4517a includes a news hypergraph generated based on news-based criteria included in the first criteria, and the second separate hypergraph 4517b includes a citizens hypergraph generated based on citizens-based criteria included in the second criteria. And, in some of such embodiments and others, the third hypergraph 4519 includes a context hypergraph based on the linking of the first and the second separate hypergraphs and context-based criteria.

Figure 46:
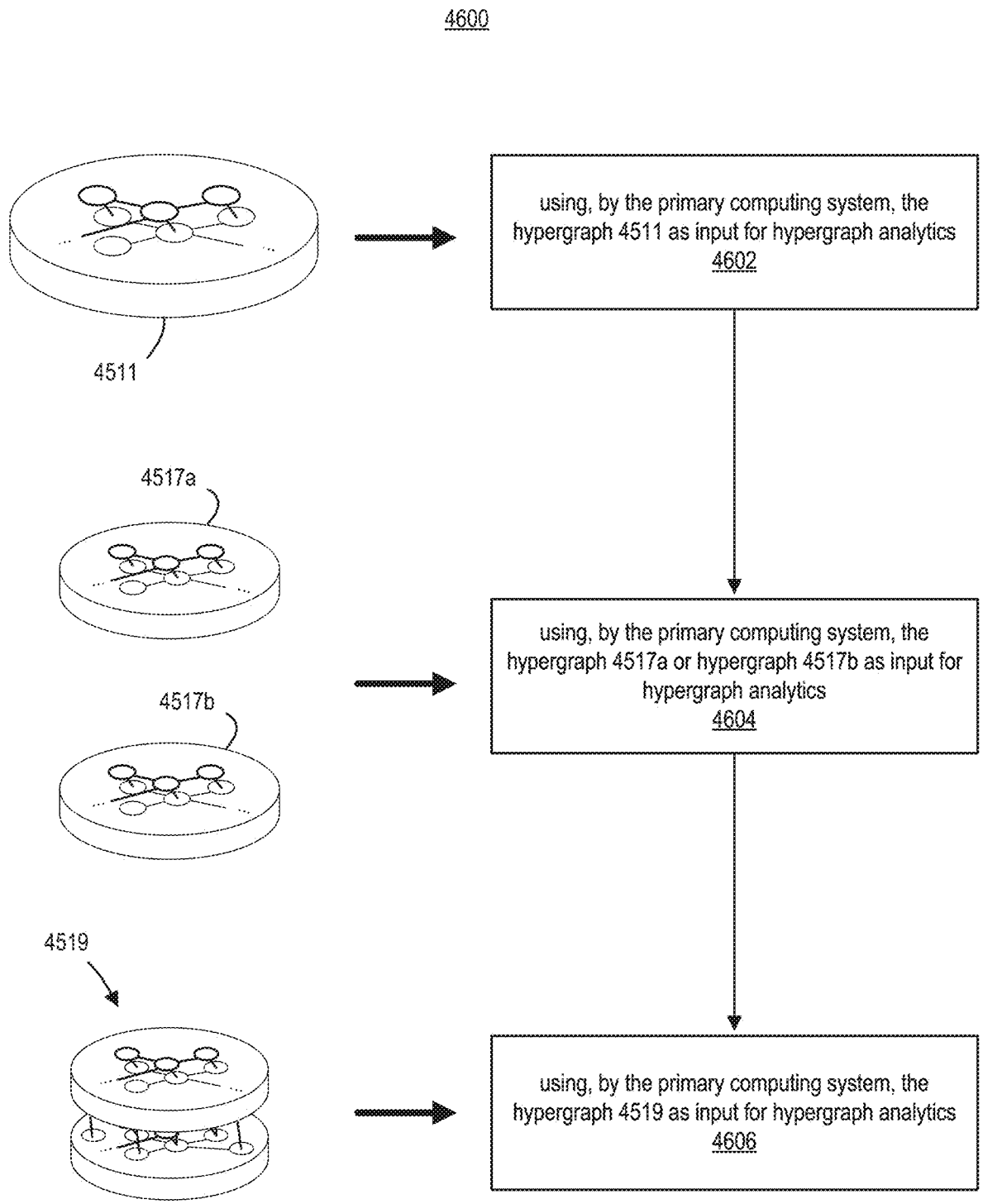

In some embodiments, any one or more of the hypergraphs disclosed herein (such as the hypergraphs outputted by method 4500) can be used as input for hypergraph analytics (such as the hypergraph analytics disclosed herein). For example, FIG. 46 shows a method 4600, implemented by a computing system (such as the computing system 200), for using the hypergraphs outputted by method 4500 as inputs for hypergraph analytics. In some examples, method 4600 can be combined with any one or more of the methods disclosed herein, wherein hypergraphs are generated. The method 4600 can start with using, by the primary computing system (such as the computing system 200), the hypergraph 4511 as input for hypergraph analytics (at step 4602). The method 4600 can continue with using, by the primary computing system, the hypergraph 4517a or hypergraph 4517b as input for hypergraph analytics. And, finally, the method 4600 can continue with using, by the primary computing system, the hypergraph 4519 as input for hypergraph analytics.

Figure 47:
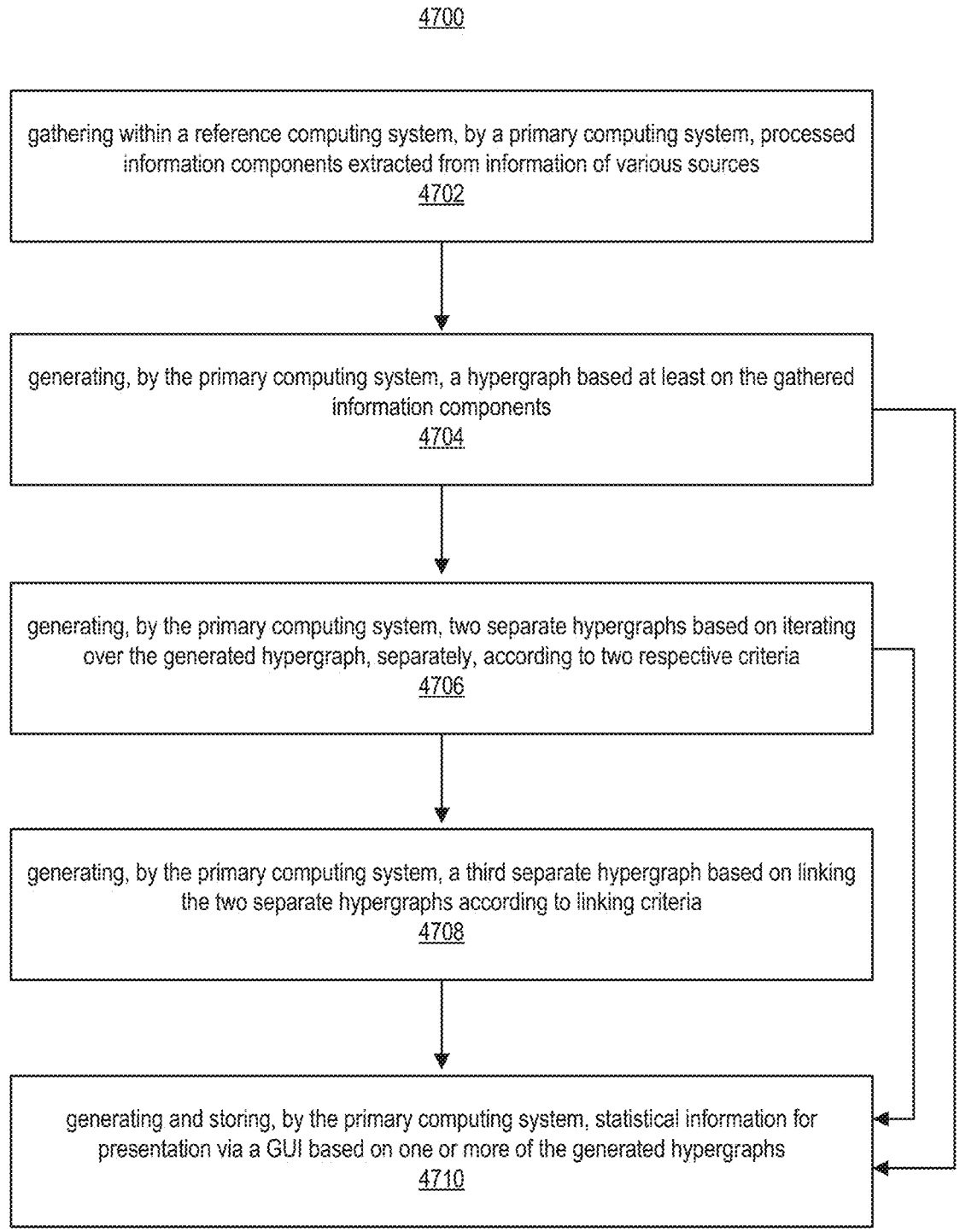

Related to methods 4500 and 4600, some embodiments can include gathering within a reference computing system, by a primary computing system, processed information components extracted from information of various sources (e.g., see step 4702 of method 4700 shown in FIG. 47). Such embodiments can also include generating, by the primary computing system, a hypergraph based at least on the gathered information components, wherein nodes of the hypergraph are interconnected by multiple dimensions of edges representing nature and strength of connections, and wherein the hypergraph includes a graph in which an edge of the graph joins any number of vertices of the graph (e.g., see step 4704 of method 4700). The nodes of the hypergraph can be interconnected by multiple dimensions of edges representing nature and strength of connections, and the hypergraph can include a graph in which an edge of the graph joins any number of vertices of the graph. Also, such embodiments can further include generating two separate hypergraphs based on iterating over the generated hypergraph, separately, according to two respective criteria (e.g., see step 4706 of method 4700). Furthermore, such embodiments can also include generating a third separate hypergraph based on linking the two separate hypergraphs according to linking criteria (e.g., see step 4708 of method 4700). Similarly, the two separate hypergraphs can include a news hypergraph and a citizens hypergraph, and the third hypergraph can include a context hypergraph. Also, in some examples, the reference computing system includes a database system, and the database system can include a NoSQL database system. Moreover, such embodiments can further include generating and storing, by the primary computing system, statistical information for presentation via a GUI based on one or more of the generated hypergraphs (e.g., see step 4710 of method 4700).

Although many of the examples disclosed herein relate to use cases corresponding to news content and journalism as well as civic engagement with such content, other use cases and applications can utilize the technologies disclosed herein. For example, many other use cases that require the processing and enhancement of large bodies of data (such as use cases related to traffic control, automated driving, weather prediction and warning systems, financial analysis, drug discovery, etc.) can benefit from the use of hypergraphs as well as the contextual hypergraph system. Also, the technologies disclosed herein can be used to process and enhance data of any type of information system including big data systems that can include systems having data sets that are too large or complex to be dealt with by traditional data-processing application software. For example, scientists, business executives, medical practitioners, advertising, and governments alike can overcome many of the difficulties with large datasets through the use of the technologies disclosed herein. And, various applications of the technologies disclosed herein can provide technical solutions to technical problems associated with Internet searches, fintech, healthcare analytics, geographic information systems, urban informatics, business informatics, e-science work (including meteorology, genomics, complex physics simulations, biology, and environmental research), traffic control, automated driving, and weather prediction and warning systems, etc.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a predetermined desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like. It should be borne in mind, however, that these and similar terms are to be associated with the appropriate physical quantities and are merely convenient labels applied to these quantities. The present disclosure can refer to the action and processes of a computer system, or similar electronic computing device, which manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general-purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and functionality presented herein are not inherently related to any particular computer or other apparatus. Various general-purpose systems can be used with programs in accordance with the teachings herein, or it can prove convenient to construct a more specialized apparatus to perform the methods disclosed herein. The structure for a variety of these systems will appear as set forth herein. In addition, the present disclosure is not described with reference to any particular programming language. It will be appreciated that a variety of programming languages can be used to implement the teachings of the disclosure as disclosed herein.

The present disclosure can be provided as a computer program product, or software, which can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A method, comprising:
retrieving, by a primary computing system, information from a plurality of information sources, wherein the primary computing system comprises a least one server-side computing device;
storing, by the primary computing system, the information into a staging computing system connected to the primary computing system over a communications network;
subsequent to the storing of the information in the staging computing system, extracting, by the primary computing system, component elements of content from the stored information based on a set of extraction conditions and using natural language processing (NLP) and models to identify insights and connections in text of the information, wherein the NLP and the models are enhanced by machine learning;
applying, by the primary computing system, a machine learning system to the extracted component elements to preprocess the extracted component elements; and
generating, by the primary computing system, a hypergraph by at least interlinking and organizing the preprocessed component elements or a derivative thereof as nodes in the hypergraph.

2. The method of claim 1, further comprising generating, by the primary computing system, an anonymous user profile for engaging anonymously with user interfaces provided by the primary computing system for interacting with the hypergraph,
wherein generating the anonymous user profile comprises retrieving, by the primary computing system, user profile information associated with an anonymous individual user through user input into a form running on a web browser, and
wherein the user input is received via an interview provided by the form and based on a query that locates an anonymized record of the anonymous individual user.

3. The method of claim 1, wherein the primary computing system retrieves the information via online feeds, application programming interfaces, and data entry.

4. The method of claim 1, wherein the staging computing system is implemented at least in part by a data lake or any other system or repository of data stored in its initial format.

5. The method of claim 1, further comprising using, by the primary computing system, the preprocessed component elements as input for hypergraph analytics.

6. The method of claim 1, wherein the application of the machine learning system comprises translating a first taxonomy derived from the extracted component elements to a second taxonomy.

7. The method of claim 1, wherein the application of the machine learning system comprises parsing metadata in the extracted component elements.

8. The method of claim 1, wherein the nodes of the generated hypergraph are interconnected by multiple dimensions of edges representing nature and strength of connections.

9. The method of claim 1, wherein the generated hypergraph comprises a graph in which an edge of the graph joins any number of vertices of the graph.

10. The method of claim 1, wherein each one of the nodes of the generated hypergraph comprises at least one computing device and the generated hypergraph is implemented as a computer network and is representative of a network topology of the computer network.

11. The method of claim 1, further comprises storing, by the primary computing system, the extracted component elements in a database system.

12. The method of claim 11, wherein the database system comprises a NoSQL database system.

13. The method of claim 11, wherein the database system is included within the staging computing system.

14. The method of claim 1, further comprising applying, by the primary computing system, hypergraph network topology mapping to information components of the generated hypergraph, wherein the information components include nodes and edges of the hypergraph.

15. The method of claim 14, wherein the application of the hypergraph network topology mapping comprises generating a first separate hypergraph based on iterating over the generated hypergraph according to a first criteria and generating a second separate hypergraph based on iterating over the generated hypergraph according to a second criteria.

16. The method of claim 15, wherein the first separate hypergraph comprises a news hypergraph generated based on news-based criteria included in the first criteria, and wherein the second separate hypergraph comprises a citizens hypergraph generated based on citizens-based criteria included in the second criteria.

17. The method of claim 16, further comprise applying, by the primary computing system, network topology mapping functions to link parts of the first separate hypergraph and the second separate hypergraph to generate a third separate hypergraph based on the linked parts, wherein the third hypergraph comprises a context hypergraph based on the linking of the first and the second separate hypergraphs and context-based criteria.

18. A method, comprising:
gathering within a reference computing system, by a primary computing system, processed information components extracted from information of various sources;
generating, by the primary computing system, a hypergraph based at least on the gathering of the processed information components,
wherein nodes of the hypergraph are interconnected by multiple dimensions of edges representing nature and strength of connections, and
wherein the hypergraph comprises a graph in which an edge of the graph joins any number of vertices of the graph; and
generating two separate hypergraphs based on iterating over the generated hypergraph, separately, according to two respective criteria.

19. The method of claim 18, wherein the reference computing system comprises a database system, and wherein the database system comprises a NoSQL database system.

20. A method, comprising:
gathering within a reference computing system, by a primary computing system, processed information components extracted from information of various sources;
generating, by the primary computing system, a hypergraph based at least on the gathering of the processed information components,
wherein nodes of the hypergraph are interconnected by multiple dimensions of edges representing nature and strength of connections, and
wherein the hypergraph comprises a graph in which an edge of the graph joins any number of vertices of the graph; and
generating and storing, by the primary computing system, statistical information for presentation via a GUI based on the generated hypergraph.

* * * * *